US010569288B2

(12) United States Patent
Holloway et al.

(10) Patent No.: US 10,569,288 B2
(45) Date of Patent: Feb. 25, 2020

(54) ROBOTIC DEVICE

(71) Applicant: Q-BOT LIMITED, Greater London (GB)

(72) Inventors: Mathew Holloway, Greater London (GB); Tom Lipinski, Greater London (GB); Kent Hamilton, Greater London (GB); Daniel Taylor, Greater London (GB)

(73) Assignee: Q-Bot Limited, Greater London (GB)

( * ) Notice: Subject to any disclaimer, the term of this patent is extended or adjusted under 35 U.S.C. 154(b) by 200 days.

(21) Appl. No.: 15/517,382

(22) PCT Filed: Oct. 22, 2015

(86) PCT No.: PCT/GB2015/053175
§ 371 (c)(1),
(2) Date: Apr. 6, 2017

(87) PCT Pub. No.: WO2016/063074
PCT Pub. Date: Apr. 28, 2016

(65) Prior Publication Data
US 2018/0264640 A1    Sep. 20, 2018

(30) Foreign Application Priority Data

Oct. 22, 2014 (GB) .................................. 1418824.7
Jul. 13, 2015 (GB) .................................. 1512225.2

(51) Int. Cl.
B05B 12/12   (2006.01)
B05B 13/00   (2006.01)
(Continued)

(52) U.S. Cl.
CPC .......... *B05B 12/122* (2013.01); *B05B 13/005* (2013.01); *B05B 13/0278* (2013.01);
(Continued)

(58) Field of Classification Search
None
See application file for complete search history.

(56) References Cited

U.S. PATENT DOCUMENTS 4,218,989 A      8/1980  Fujita
4,926,522 A  *   5/1990  Wang ...................... B25F 1/02
                                                              15/144.1
(Continued)

FOREIGN PATENT DOCUMENTS

DE   102006031294       1/2008
DE   102006031294 A1    1/2008
(Continued)

OTHER PUBLICATIONS

PCT Partial International Search Report, dated Feb. 19, 2016; 5 pages.
(Continued)

*Primary Examiner* — Michael P. Rodriguez
(74) *Attorney, Agent, or Firm* — Seyfarth Shaw LLP

(57) ABSTRACT

Apparatus for spraying a material on a surface comprises at least one elongate member having a distal end and a proximal end, at least one spray nozzle mounted at the distal end of the elongate member for spraying the material in a spray pattern, the spray nozzle being connected to a spray material input at the proximal end of the elongate member, a camera mounted at the distal end of the elongate member and connected to a camera output at the proximal end of the elongate member, the camera being arranged to capture images of the spray pattern, and a control mechanism arranged to control the operation of the spray nozzle from the proximal end of the elongate member.

7 Claims, 39 Drawing Sheets

(51) Int. Cl.
   *B05B 13/04* (2006.01)
   *B25J 19/02* (2006.01)
   *B25J 1/08* (2006.01)
   *B25J 5/00* (2006.01)
   *B05B 13/02* (2006.01)
   *B25J 1/02* (2006.01)
   *B25J 9/06* (2006.01)
   *B25J 11/00* (2006.01)

(52) U.S. Cl.
   CPC ............ *B05B 13/0431* (2013.01); *B25J 1/02* (2013.01); *B25J 1/08* (2013.01); *B25J 5/00* (2013.01); *B25J 9/06* (2013.01); *B25J 11/0075* (2013.01); *B25J 19/023* (2013.01)

(56) References Cited

U.S. PATENT DOCUMENTS

| | | | | |
|---|---|---|---|---|
| 5,108,655 | A | * | 4/1992 | Johns, Jr. ............... B01D 19/04 162/45 |
| 5,465,525 | A | * | 11/1995 | Mifune ................... A01M 7/00 180/167 |
| 6,889,920 | B2 | | 5/2005 | Nance |
| 2005/0045751 | A1 | | 3/2005 | Nance |
| 2005/0224517 | A1 | * | 10/2005 | Healy ................. A01M 1/2038 222/174 |
| 2006/0283981 | A1 | * | 12/2006 | Mead .................... B05B 15/652 239/526 |
| 2008/0159616 | A1 | * | 7/2008 | Fellinger ................ G01N 25/72 382/141 |
| 2012/0072035 | A1 | | 3/2012 | Nielsen | |

FOREIGN PATENT DOCUMENTS

| | | |
|---|---|---|
| EP | 3148752 | 4/2017 |
| WO | 2011097502 A2 | 8/2011 |
| WO | 2014188221 A2 | 11/2014 |
| WO | 2015172131 | 11/2015 |

OTHER PUBLICATIONS

PCT International Search Report and Written Opinion, dated Apr. 29, 2016; 15 pages.
Intellectual Property Office Combined Search and Examination Report, dated Apr. 8, 2015; 6 pages.
Combined Search and Examination Report for Great Britain Application No. GB1711479.4 dated Sep. 28, 2017, 4 pages.
Combined Search and Examination Report for Great Britain Application No. GB1711477.8 dated Sep. 29, 2017, 5 pages.
Examination Report for Great Britain Application No. GB1512225.2 dated Aug. 17, 2017, 4 pages.
Examination Report for Great Britain Application No. GB1418824.7 dated Oct. 5, 2017, 4 pages.

* cited by examiner

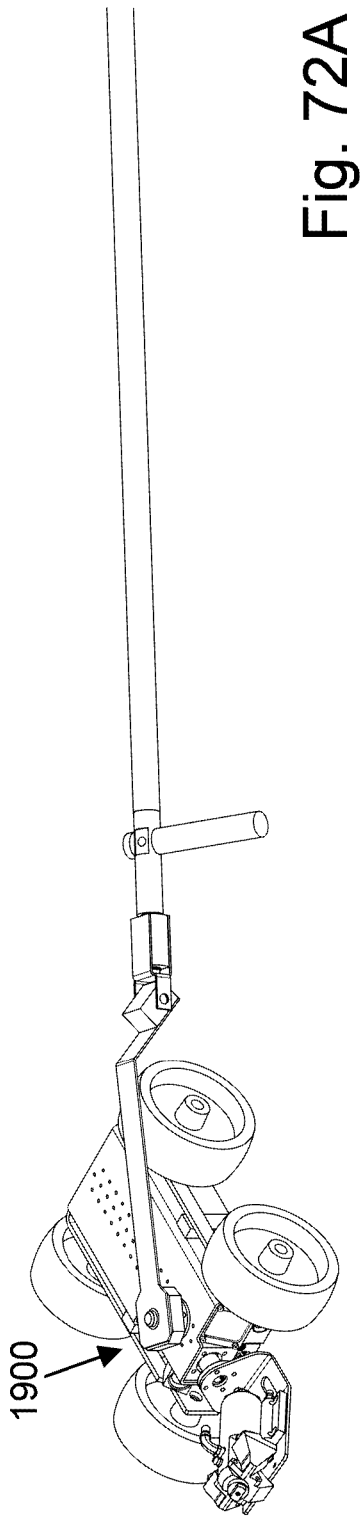
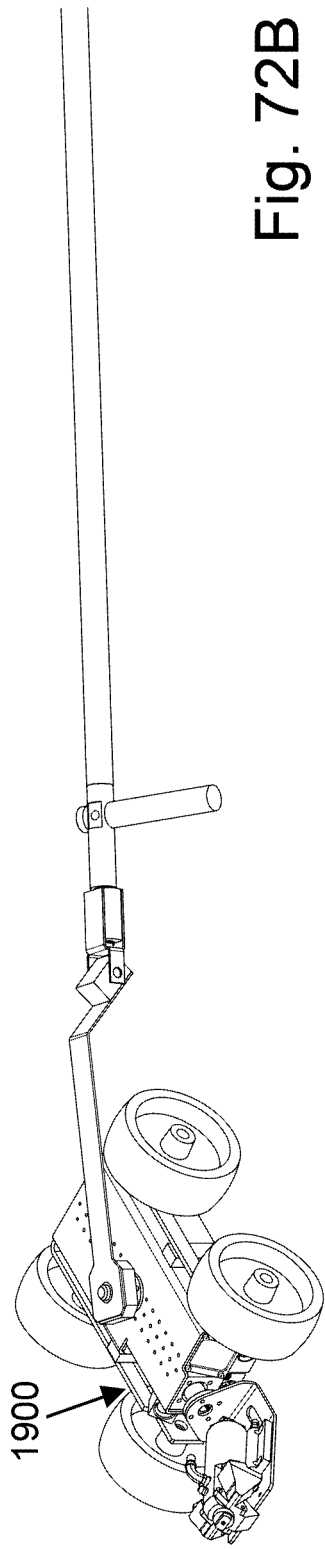
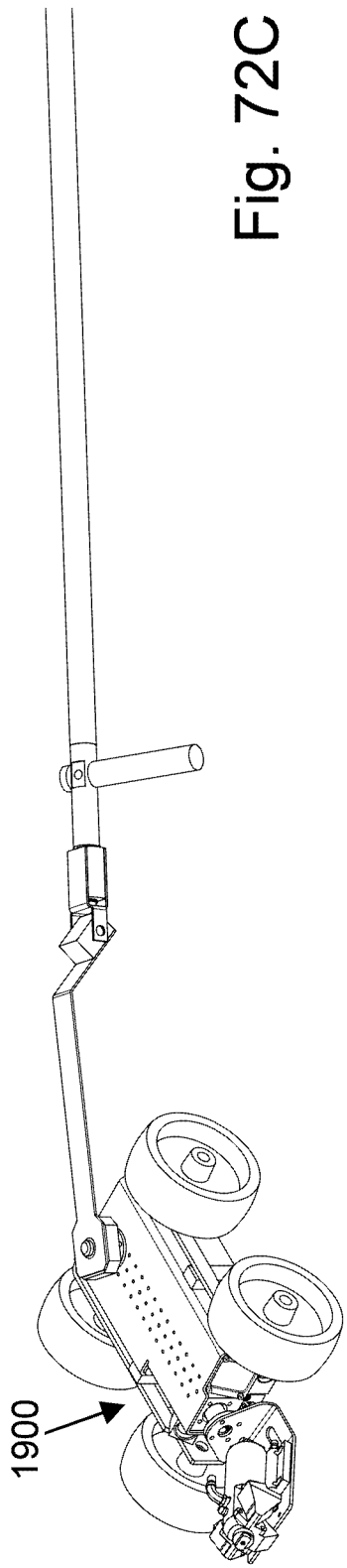

ROBOTIC DEVICE

CROSS REFERENCE TO RELATED APPLICATIONS

This is a National Stage application of PCT/GB2015/053175, filed Oct. 22, 2015, which claims priority to United Kingdom Patent Application Serial No. GB 1418824.7, filed Oct. 22, 2014; and United Kingdom Patent Application Serial No. GB 1512225.2, filed on Jul. 13, 2015, the disclosures of which are incorporated herein by reference.

This invention relates to a remotely operated spray nozzle, in particular an electromechanical arm suitable for spraying a treatment material on a surface of an enclosed space. Embodiments of the invention relate to a modular robot.

BACKGROUND

Our prior application WO 2014/188221 discloses robots for spraying expandable foam material. The present application discloses electromechanical arms that are alternatives to previous robotic vehicles.

It is known to use robots to carry out operations remotely for example in dangerous environments such as nuclear reactors, to view and operate within inaccessible areas such as pipes, or even in medical applications for non-invasive surgery. Known such robots are fitted with or take the form of a robotic arm suitable for carrying out these operations.

However some of the robotic arms of the prior art have a number of disadvantages:
  The robot arms are of a fixed length or number of joints, or if modular in nature are normally limited by the length the arm can be extended before they become too unwieldy or the system does not work;
  Usually the arm is not self-contained, and they have bulky supporting infrastructure resulting in setup and transport issues, and they cannot easily be handled by a single person;
  The robot arms tend to be overly complex requiring sophisticated control systems that abstract the task in hand. This means it is often unintuitive for an operator to simply pick up and carry out a task; and/or
  They either are self-contained units which require their own propulsion unit, which creates traction, power and navigation issues, or are unpowered and are therefore limited in how they can access a space.

An alternative is for operators to use hand tools or powered tools, which in contrast to the robotic devices lack the sophistication and flexibility of these devices. These devices tend to be highly specialised for example chimney cleaning tools or a boroscope for inspecting sewers. These devices tend to be limited in their reach and operating envelope, and usually only where there is direct line of sight.

The present disclosure, at least in some embodiments, seeks to provide alternatives to the devices of the prior art.

BRIEF SUMMARY OF THE DISCLOSURE

Viewed from a first aspect the present invention provides apparatus for spraying a material on a surface. The apparatus comprises at least one elongate member having a distal end and a proximal end, at least one spray nozzle mounted at the distal end of the elongate member for spraying the material in a spray pattern, the spray nozzle being connected to a spray material input at the proximal end of the elongate member, a camera mounted at the distal end of the elongate member and connected to a camera output at the proximal end of the elongate member, the camera being arranged to capture images of the spray pattern, and a control mechanism arranged to control the operation of the spray nozzle from the proximal end of the elongate member.

Thus in accordance with the invention, a simple apparatus is provided which can spray material in locations with limited access under the control of a user remote from the spray location. The elongate member may be in the form of an electromechanical arm.

In an embodiment of the invention, the control mechanism comprises a handle mechanically connected to the elongate member at the proximal end thereof. Thus, the apparatus may be controlled manually by the user. The handle may be arranged to rotate the spray nozzle about a longitudinal axis of the elongate member. The handle may be arranged to cause extension of the elongate member by rotation of the handle. For example, rotation of the handle may cause the elongate member to extend telescopically.

In embodiments of invention, the control mechanism is electrically connected to the spray nozzle for control thereof. Thus, the control mechanism may comprise controls for solenoids, motors and the like, which control operation of the spray nozzle.

In embodiments of the invention, the spray nozzle is mounted for movement relative to the distal end of the elongate member. For example, the spray nozzle may be mounted for motorised movement relative to the distal end of the elongate member. In other embodiments of the invention, the spray nozzle may be fixed relative to the distal end of the elongate member. For example, the spray nozzle may be fixed at an angle to the distal end of the elongate member. A plurality of spray nozzles may be provided at different angles to the distal end of the elongate member.

The elongate member may be telescopically extensible. Alternatively or in addition, the elongate member may be extensible by the addition of one or more modular members.

The apparatus may further comprise a support for the elongate member. The support may hold the elongate member relative to a surface of the working area. In embodiments of the invention, the elongate member is rotatably mounted to the support. For example, the elongate member may be mounted for rotational movement about a longitudinal axis thereof relative to the support. The support may comprise freely rotating wheels for engaging a surface of the working area.

In embodiments of the invention, the support suspends the elongate member from at least one mounting point.

The benefit of the electromechanical arms disclosed herein is that they can fit in confined spaces and allow an operator to carry out operations and spray areas within the space whilst they remain outside, through an opening or entry point that easily allows direct access.

The apparatus may further comprises a laser rangefinder mounted at the distal end of the elongate member and connected to a rangefinder output at the proximal end of the elongate member, the rangefinder being arranged to capture depth information in the field of view of the camera. Thus, depth information relating to the spray pattern may be provided to the user together with images from the camera.

The spray nozzle and/or the camera may be mounted on a wheeled chassis at the distal end of the elongate member. The elongate member may be connected to the chassis via a pivotal connection. The chassis may comprise a plurality of mounting locations for the pivotal connection. In this way, the pivotal connection can be mounted to the chassis at a desired mounting location relative to the centre of gravity of the chassis. This allows the chassis to be steered more easily depending on the type of terrain to be negotiated.

The apparatus may comprise a further elongate member connected to the chassis via a further pivotal connection at a mounting location spaced from a mounting location of the first pivotal connection. In this way the chassis can be steered by relative movement of the elongate members.

One embodiment of the invention is a spray nozzle at the end of an extendable pole or arm, which is manually moved into position. The pole or arm may be extended by sliding it along the ground, through a telescopic mechanism or by adding modules to extend the length. One of more spray nozzles are remotely operable by using a solenoid switch, air valve or other means. The spray nozzles can be angled and positioned to get the required coverage depending on the physical characteristics of the space and desired spray pattern (a number of pre-set positions may be available to suit typical conditions). A camera provides feedback to the operator of what is sprayed. There is a screen, handle and trigger (or switch) for the operator at the other end of the arm. Turning the handle allows the operator to extend the telescopic arm. The pole or arm houses the hoses that feed insulation to the spray nozzles. Depending on the type of insulation they may be insulated or heated. The benefit of this system is it provides an intuitive and easy to operate tool to remotely apply insulation in tight spaces.

In some cases, it is desirable to be able to remotely move the spray nozzles. This means that the arm only needs to be roughly positioned in the right place and a larger area can be covered from a single position. This may take one of a number of different embodiments which are either directly controlled by the operator or via a motor or other powered means. The simplest version includes the spray nozzle mounted at a pre-set angle which can be rotated directly by the operator turning a handle where the motion is transmitted through the pole or arm. A collar with wheels or legs allows the arm to rotate while the arm is held off the ground. Alternatively the rotation may be controlled by a motor and wrist. Alternatively the spray nozzle may be mounted on a gun platform with two axis of rotation to allow full control of the spray pattern via motors and a gearbox.

To help the operator manoeuvre the arm, a sled, ball or wheels may be used on a support for the arm. These wheels may have their axle in line with the arm allowing the arm to be moved side to side more easily, or be mounted so the axle is perpendicular to the arm and making it easier for the arm to be pushed into and out of the void.

Alternatively the arm may be held in place, so that it is suspended above the ground (normally at the entry point to a void, or via an anchor within the void).

To help the operator understand where the tool and spray nozzle is pointing laser cross hairs may be mounted and aligned with the nozzle. Alternatively the apparatus may comprise one or more laser rangefinders that can either scan a predefined area or rotate to build a 3D map. As the angle of the gun and the relative position of the surface being sprayed is known the point of aim can be calculated and overlaid digitally on the operator's screen.

Viewed from a further aspect, the present invention provides a modular robot comprising a plurality of mutually connectable modules. The modules each comprise a first mechanical connector at a first end of the module and a second mechanical connector at a second end of the module. The first and second mechanical connectors of respective modules are non-permanently interengageable to connect the modules end-to-end, whereby to form the modular robot in a desired configuration. Each module comprises a first component, a second component and a motor arranged to move the first component relative to the second component. Each module comprises a controller configured to receive a control signal and to control operation of the motor in response to the control signal.

Thus, in embodiments of the present invention, a modular robot is formed from a plurality of interconnectable modules each of which can be controlled independently. The modules can be selected and connected to form a robot, such as a robot arm, having the required configuration for a particular task.

At least one of said modules may be a bending module wherein said first component comprises said first end and said second component comprises said second end and said first component is pivotally connected to said second component about an axis which is perpendicular to a direction from said first end to said second end, whereby said motor pivots the first component relative to the second component about said axis.

At least one of said modules may be an extending module wherein said first component comprises said first end and said second component comprises said second end and said first component is slidably connected to said second component for relative movement in a direction from said first end to said second end, whereby said motor is arranged to move the first component relative to the second component to increase or decrease the effective length of the extending module. The first component of the extending module may be received within the second component of the extending module. Thus, the first and second components may be telescoped. Other configurations are possible, for example the first and second components may form parallel halves of the extending module.

At least one of said modules may be a widening module configured to increase the effective width of the module in a direction perpendicular to a direction from said first end to said second end by relative movement of the first component and the second component. The widening module is useful for engaging one or more surfaces to retain the module in position.

The first component of the widening module may be an extendable arm. The extendable arm may be pivotally mounted to the second component. The second component may form a chassis of the widening module. A plurality of extendable arms may be provided on the widening module.

The first component of the widening module may be inflatable. The motor may cause inflation or deflation of the first component. For example the motor may be a pump motor. Alternatively, the motor may be a valve actuator, for example for a compressed air valve.

The widening module may comprise a deformable member provided between the first component and the second component. The motor may be arranged to move the first component towards the second component to compress the deformable member in a longitudinal direction from the first end to the second end of the widening module and thereby increase the effective width of the deformable member in a direction perpendicular to the longitudinal direction. Thus, in this embodiment, the deformable member bulges out of the module to increase the effective width thereof.

The extending module and the widening module may be arranged to co-operate to propel the robot relative to at least one surface engaged by the widening module. In this case, the extending module may be extended to propel the widening module forwards. The widening module is then expanded to locate the widening module in position and the extending module is retracted to pull the rest of the robot towards the widening module. The widening module is then retracted so that the process can be repeated.

At least one of said modules may be a twisting module wherein said first component comprises said first end and said second component comprises said second end and said first component is rotatably connected to said second component about an axis in a direction from said first end to said second end, whereby said motor rotates the first component relative to the second component about said axis.

At least one of said modules may be a locomotion module wherein said first component comprises a ground-engaging surface, whereby said motor moves said ground-engaging surface relative to the second component to propel the locomotion module over said surface. The ground-engaging surface may rotate around the locomotion module about an axis from the first end to the second end of the locomotion module. In this way, the locomotion module can move laterally. The locomotion module may comprise wheels or tracks.

The first mechanical connector and the second mechanical connector may be configured to prevent relative rotational movement of the connected modules about an axis from the first end to the second end. In this way, twisting movements can be transmitted from module to module.

The robot may comprise at least one non-motorised module comprising a said first mechanical connector at a first end of the non-motorised module and a said second mechanical connector at a second end of the non-motorised module. Such modules may be, for example, spacer modules.

The modules may each comprise a first electrical connector at a first end of the module and a second electrical connector at a second end of the module. The first and second electrical connectors of respective modules may be non-permanently interengageable to electrically connect the modules. In this way, the modules can be daisy-chained electrically. The first and second electrical connectors may provide power to the motor and/or the controller. The first and second electrical connectors may provide the control signal to the controller. The controller may be configured to receive the control signal wirelessly, for example via Bluetooth.

Embodiments of the invention provides for a remotely operated arm that can fit through tight spaces and has a modular construction that allows it to be adapted to suit different applications. The arm allows an operator to simply add any number of modules together as needed to suit the given application and can be controlled by hand through physical grips, or through a computer controlled interface and actuators in the module.

Applications for such a system include the building industry where there are a number of different voids that are difficult to access such as underfloor cavities in properties with suspended timber floors, in floor voids between the ceiling and floor above, in cavity walls, lofts, air vents, pipework and chimneys. Such a device may allow the operator to survey an area to identify faults, e.g. the location of a leak or dangerous wiring, map a space, and carry out operations such as routing cables, apply sealant, thermal or acoustic insulation, or deploy in position other devices such as sensors.

BRIEF DESCRIPTION OF THE DRAWINGS

Embodiments of the invention are further described hereinafter with reference to the accompanying drawings, in which:

FIGS. 72A to 72C illustrate different positions of connection to the spray device of FIG. 71.

DETAILED DESCRIPTION

Figure 1:
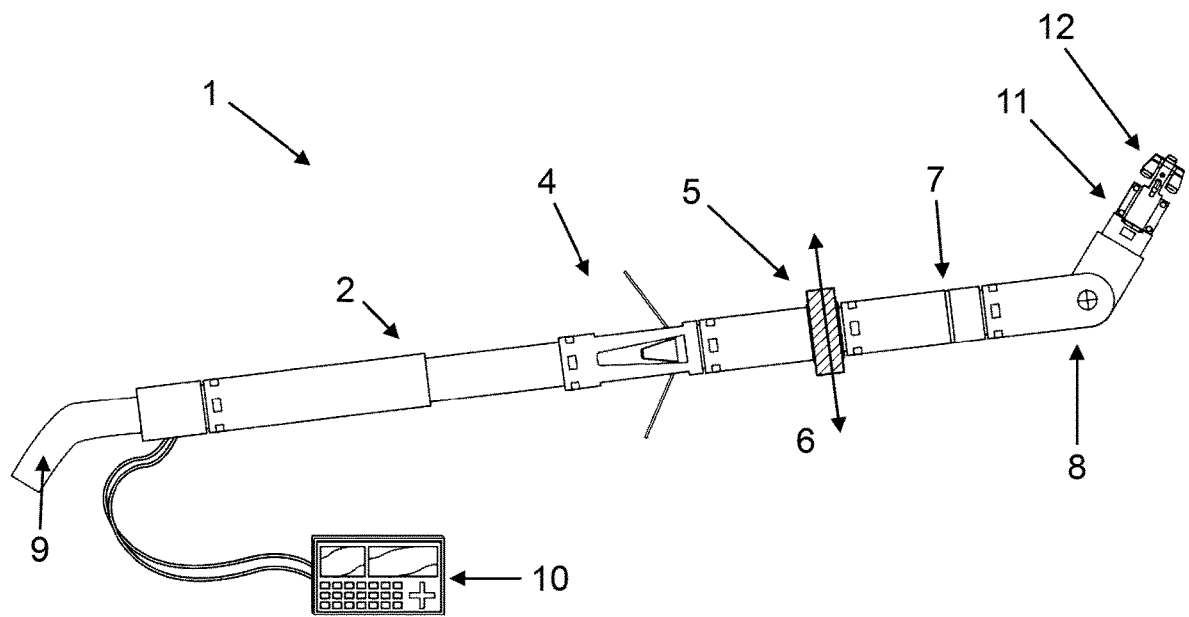
FIG. 1 is an illustration of a modular robot according to one embodiment of an aspect of the present invention.

FIG. 1 is an illustration of a modular robot according to an embodiment of an aspect of the present invention, and shows a remotely controlled arm 1 which consists of a number of modules connected together to form a robot. An extendable chassis is provided by a telescopic module 2 that extends or retracts. The telescopic module 2 is connected to a movable component in the form of an anchor module 4 that is configured to restrict movement of at least a portion of the arm within the surrounding environment. Also connected to the anchor module 4 is a lateral drive module 5 that comprises a driven outer wheel configured to move the arm sideways. When the anchor module 4 is engaged with the surrounding environment and the driven outer wheel of the lateral drive module is in contact with a ground surface, operation of the lateral drive module 5 will pivot the remotely controlled arm 1 horizontally about the anchor point of the anchor module 4. When the anchor module 4 is not engaged, operation of the lateral drive module 5 may move the remotely controlled arm 1 sideways, or rotate the remotely controlled arm about a separate pivot point. Connected to the lateral drive module is a rotational module comprising a rotation joint 7 provided between a chassis component and a rotational component of the rotational module. The rotational component of the rotational module is connected to an elbow joint module comprising an articulated portion 8. The articulated portion is bendable to direct a distal end of the remotely controlled arm 1. The articulated portion 8 is connected to a tool and camera 11 system which allows the operator to carry out operations in hard to reach areas. In this embodiment, the tool is a spray gun 12 for applying insulation, paint or other materials. An operator of the remotely controlled arm 1 controls the robot using a handle 9, for manual control, and a computer controlled interface 10. In the presently described embodiment, the computer controlled interface 10 is connected to the remote controlled arm 1 using a wired connection, though this could alternatively be connected using a wireless connection and could utilise a phone or tablet PC as the computer controlled interface 10.

Figure 2:
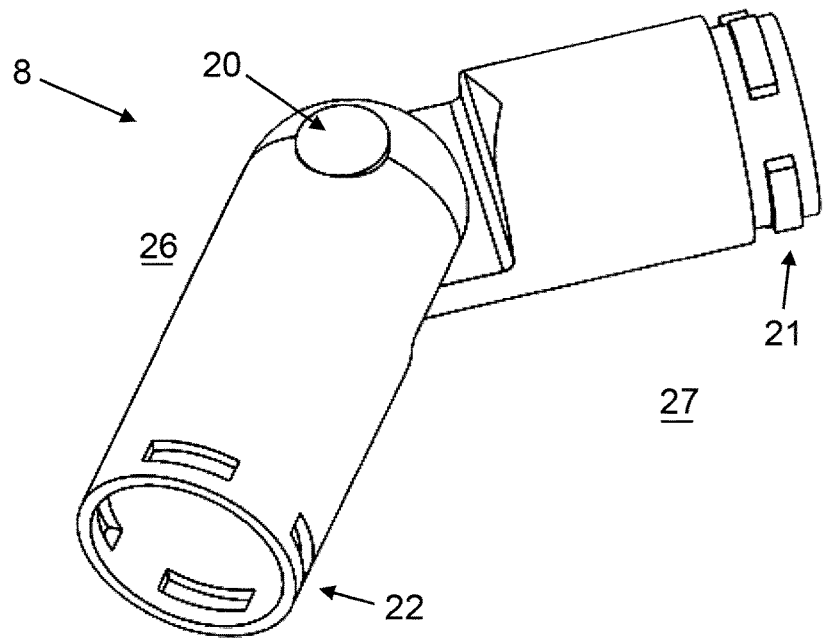
FIG. 2 is an illustration of an elbow joint module for a modular robot according to one embodiment of an aspect of the present invention.

FIG. 2 is an illustration of an elbow joint module for use in a modular robot according to an embodiment of an aspect of the present invention. The elbow joint module comprises an articulated portion 8 arranged to pivot around a central shaft 20. The elbow joint module connects to further modules using a male quick release connector 21 or a female quick release connection 22. The male quick release connector 21 is configured to fit within a complementary female quick release connector in a further module. The further module is secured when protuberances around a circumference of the male quick release connector engage with similarly sized slots defined within a circumference of the female quick release connector. The presently described elbow joint module allows a range of rotation of the articulated portion 8 about the central shaft 20 of approximately ±90 degrees. However, it will be appreciated that different designs may allow a greater or lesser range of rotation. If a rotation of greater than the maximum rotation angle is desired, multiple elbow joint modules may be connected end to end.

Figure 3:
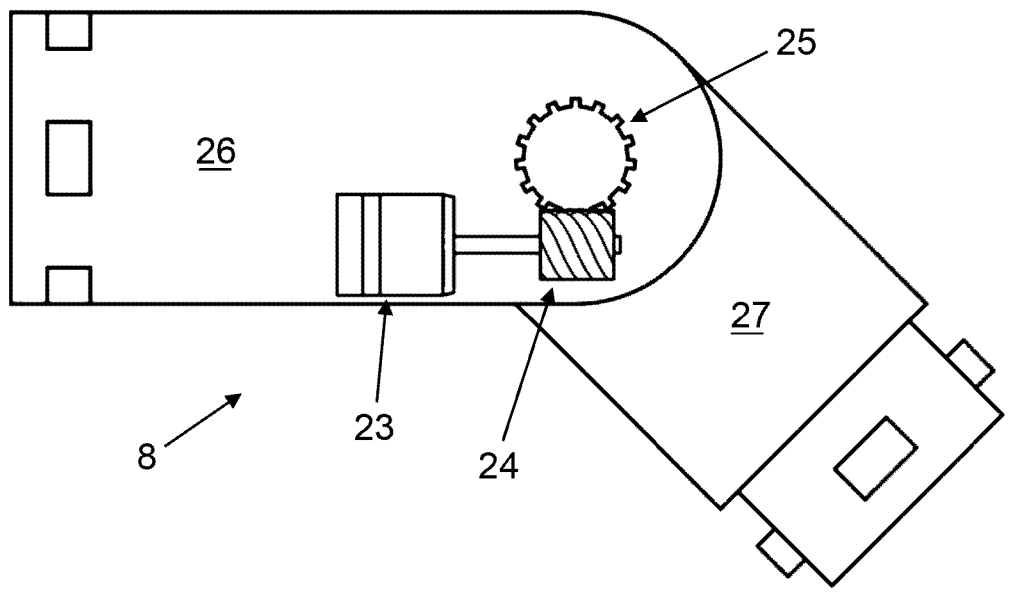
FIG. 3 is an illustration of the internal mechanism for the elbow joint module of FIG. 2.

FIG. 3 is an illustration of the internal mechanism of the elbow joint module as shown in FIG. 2. The articulated section 8 is formed from a driving section 26 and a driven section 27. The driving section 26 is connected to the driven section 27 through the central shaft 20. A motor 23 is provided in the driving section 26, and drives a worm gear 24, arranged to rotate a gear wheel 25. The gear wheel 25 is rotationally fixed to the driven section 27. When the motor operates to rotate the worm gear 24, the gear wheel 25 rotates, bending the driven section 27 of the elbow joint module relative to the driving section 26.

Although the presently described elbow joint module is rotated using a motor and geared mechanism, it will be appreciated that alternative embodiments are possible. For example, the sections could be rotated through the use of tensioned cables on each side of the driving section 26 and the driven section 25.

Although the presently described modular elbow joint module is rotatable about only a single axis, through the central shaft 20, a universal joint module may alternatively be provided to allow rotation about any axis perpendicular to the axial direction of the driven section 26.

Figure 4:
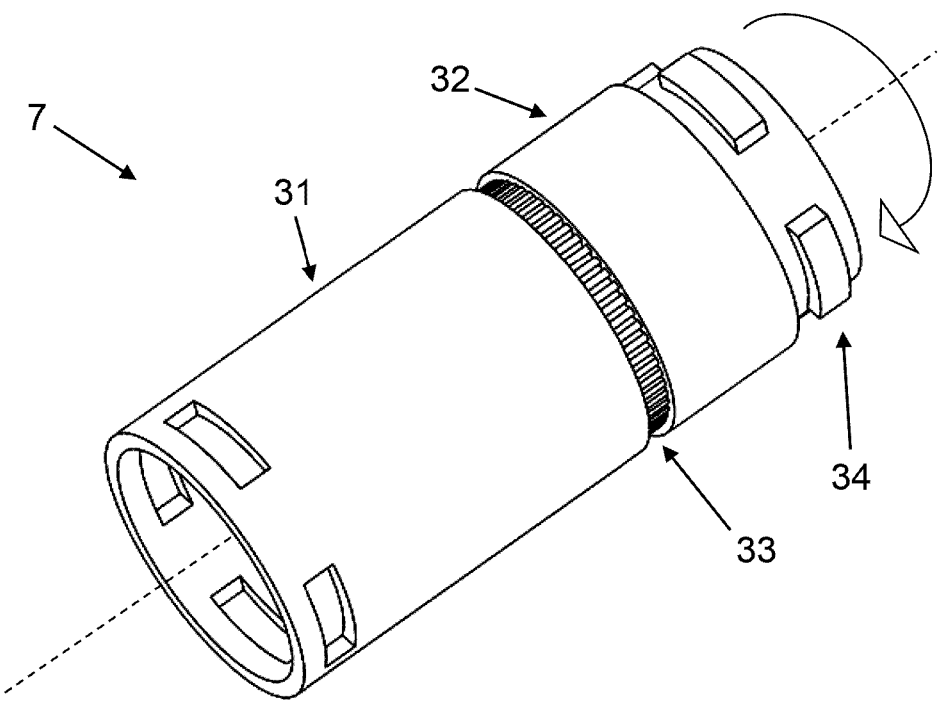
FIG. 4 is an illustration of a rotatable module for a modular robot according to one embodiment of an aspect of the present invention.

FIG. 4 is an illustration of a rotatable module for a modular robot according to one embodiment of an aspect of the present invention. A rotatable module 7 comprises a first chassis component 31 and a second chassis component 32. The first chassis component 31 is configured to be rotatable relative to the second chassis component 32, about a longitudinal axis of the rotatable module 7. A bush 33 is provided between in the joint between the first chassis component 31 and the second chassis component 32 to reduce friction between the rotating components. The locking protuberances of the male quick release connector 34 are configured to transmit a torque from the second chassis component 32 to a further module (not shown), connected to the male quick release connector 34.

The presence of the rotatable module 7 in a modular robot allows a tool on an end of the robot or a section of the robot downstream of the rotatable module 7 to be orientated in a larger number of possible directions.

Figure 5:
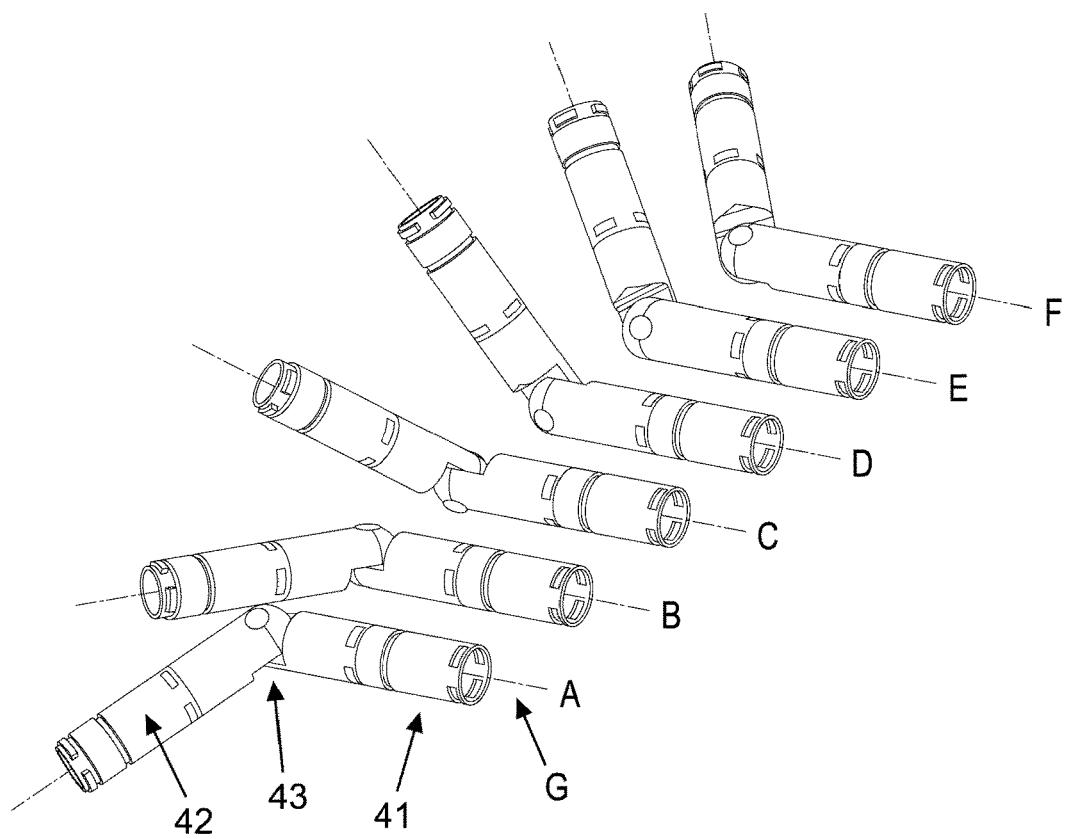
FIG. 5 is an illustration of an elbow joint assembly for a modular robot according to one embodiment of an aspect of the present invention.

FIG. 5 is an illustration of an elbow joint assembly for a modular robot according to one embodiment of an aspect of the present invention. In this assembly, a first rotatable module 41 is connected to a second rotatable module 42, with an elbow joint module provided therebetween. As the first rotatable module 41 rotates clockwise, the elbow joint module 43 is also rotated, along with the second rotatable module as shown in steps A-F. As the number of modules increases the torque required by the first rotatable module 41 will increase or may hit obstructions, therefore the angle of the elbow joint module 43 may decrease relative to the static axis G. The second rotatable module 42 allows a further module or tool attached to it to be rotated relative to the elbow joint module 43 and maintain its level relative to the surrounding environment.

Figure 6:
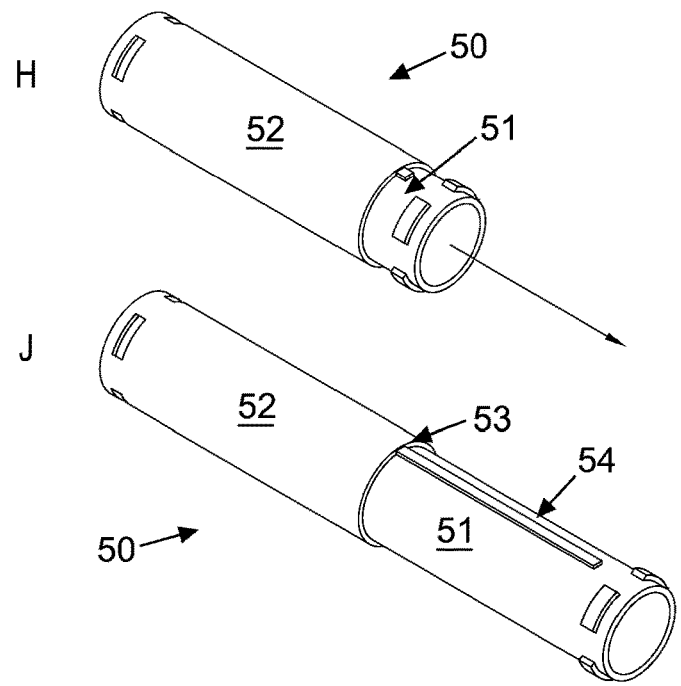
FIG. 6 is an illustration of an extendable chassis module for a modular robot according to one embodiment of an aspect of the present invention.

FIG. 6 is an illustration of an extendable chassis module for a modular robot according to one embodiment of an aspect of the present invention. The extendable chassis module 50 is shown in a retracted position H and an extended position J, and comprises an outer chassis component 52 and an inner chassis component 51. The inner chassis component is configured to telescopically extend from within an end of the outer chassis component 52. A recessed slot 53 is defined within an inner surface of the casing of the outer chassis component 52. The recessed slot 53 is configured to receive a tab 54 provided on the inner chassis component 51. The recessed slot 53 and tab 54 ensure that rotational movement can be transferred between the outer chassis component 52 and the inner chassis component 51 in both a retracted position H and an extended position J.

Figure 7:
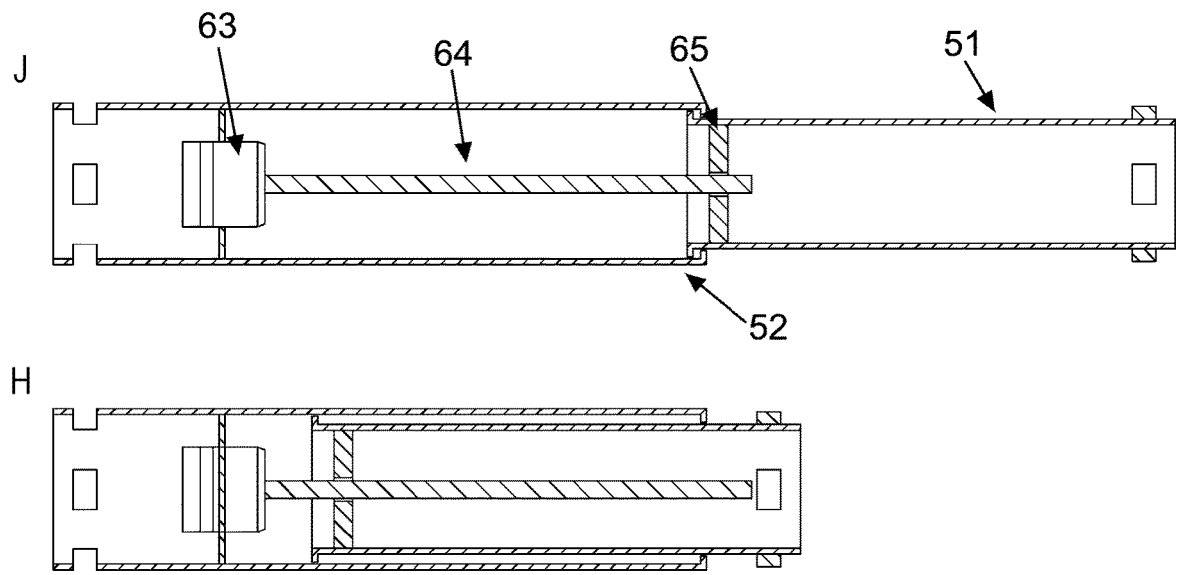
FIG. 7 is an illustration of the internal mechanism for the extendable chassis module of FIG. 6.

FIG. 7 is an illustration of the internal mechanism for the extendable chassis module of FIG. 6 in both an extended position J and a retracted position H. A motor 63 fixed in the outer chassis component 52 is connected to a lead screw 64 which is screwed into a threaded nut 65 fixed in the inner chassis component 51. When the motor 63 is operated, the lead screw 64 screws into the threaded nut 65 to move the inner chassis component 51 relative to the outer chassis component 52.

Figure 8:
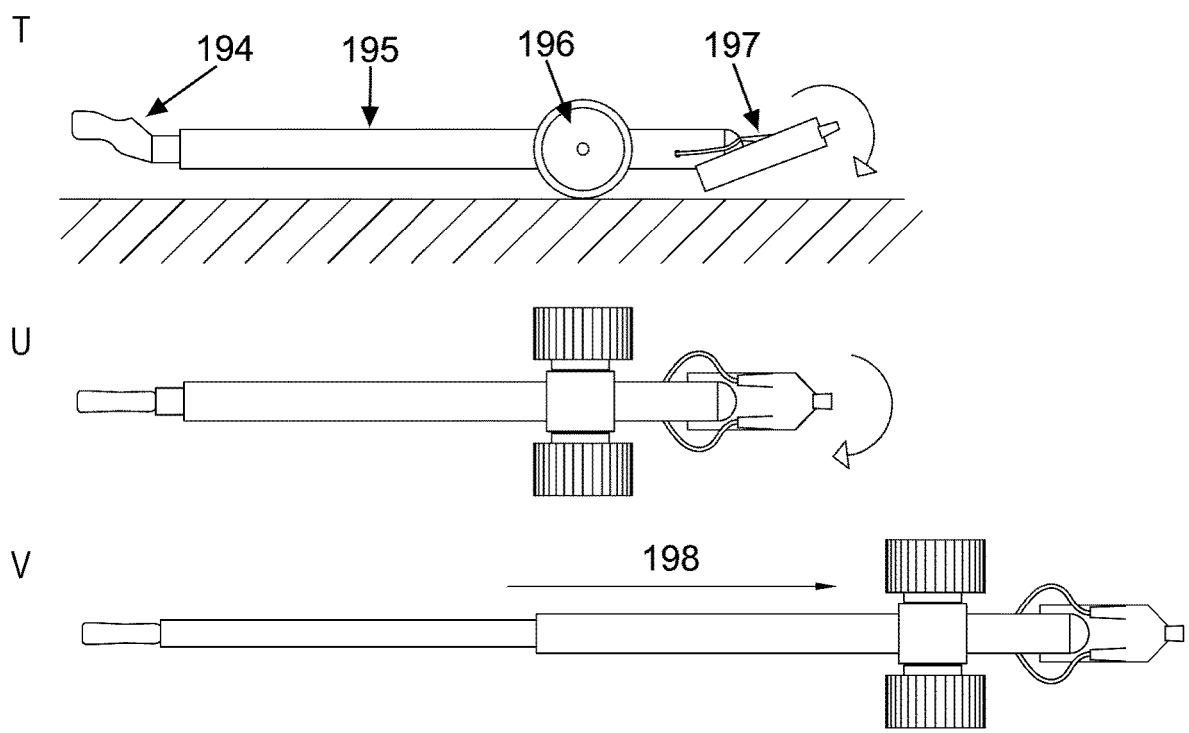
FIG. 8 is an illustration of an embodiment of a free-wheeling modular robot.

FIG. 8 is an illustration of a free-wheeling arm operating according to one embodiment of an aspect of the present invention. In this particular embodiment, the arm is not formed from multiple, detachable modules, but nevertheless is formed from different components capable of facilitating the arm to carry out tasks in a difficult to reach area, such as an underfloor void. In a side view T, the arm is provided having an extendable chassis module 195. An end of the inner extendable section of the extendable chassis module is terminated with a handle 194 for manually controlling the arm. The extendable chassis module 195 also comprises a wheeled module 196 arranged to carry the arm above the ground and facilitate easy manoeuvring of the arm over rough ground. Beyond the wheeled module 196, the extendable chassis module 195 is connected to a tool 197 which may be tilted up and down by manipulating the handle 194. In a top view U, the arm is shown with the tool 197 rotatable left and right by twisting the handle 194. The angle of the tool 197 relative to the extendable chassis 195 determines the spray arc produced when the handle is twisted and the tool rotated. The angle may be either pre-set or controlled with a second actuator, e.g. gear and motor, cable, etc. As seen in a lengthened configuration V, the arm may be extended by extending the extendable chassis module in direction 198.

Figure 9:
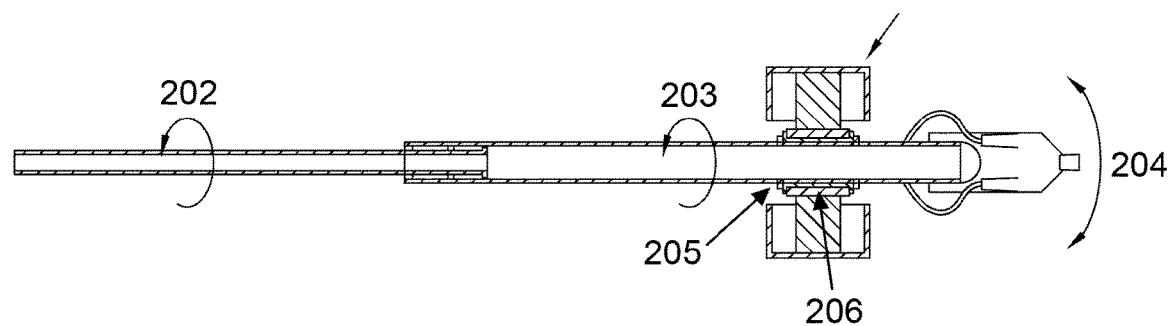
FIG. 9 is an illustration of the operating mechanism for the modular robot of FIG. 8.

FIG. 9 is an illustration of the operating mechanism for the modular robot of FIG. 8. When an operator applies rotational movement to an inner chassis component 202 of the extendable chassis module, it is transmitted through the outer chassis component 203 to pivot the tool 204. The wheels 207 support the weight of the arm and allow it to be more easily manoeuvred. A collar 205 and bush 206 allow the arm to be rotated relative to the wheels 207 so they remain stationary on the supporting surface.

Figure 10:
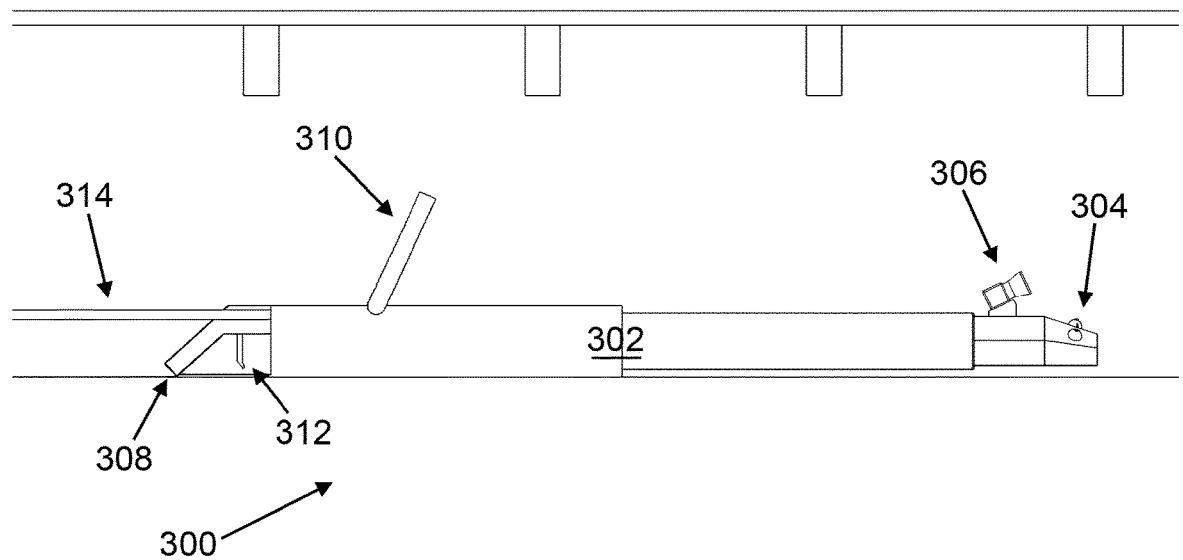
FIG. 10 is an illustration of an embodiment of an electromechanical arm according to the present disclosure, viewed from the side.
Figure 11:
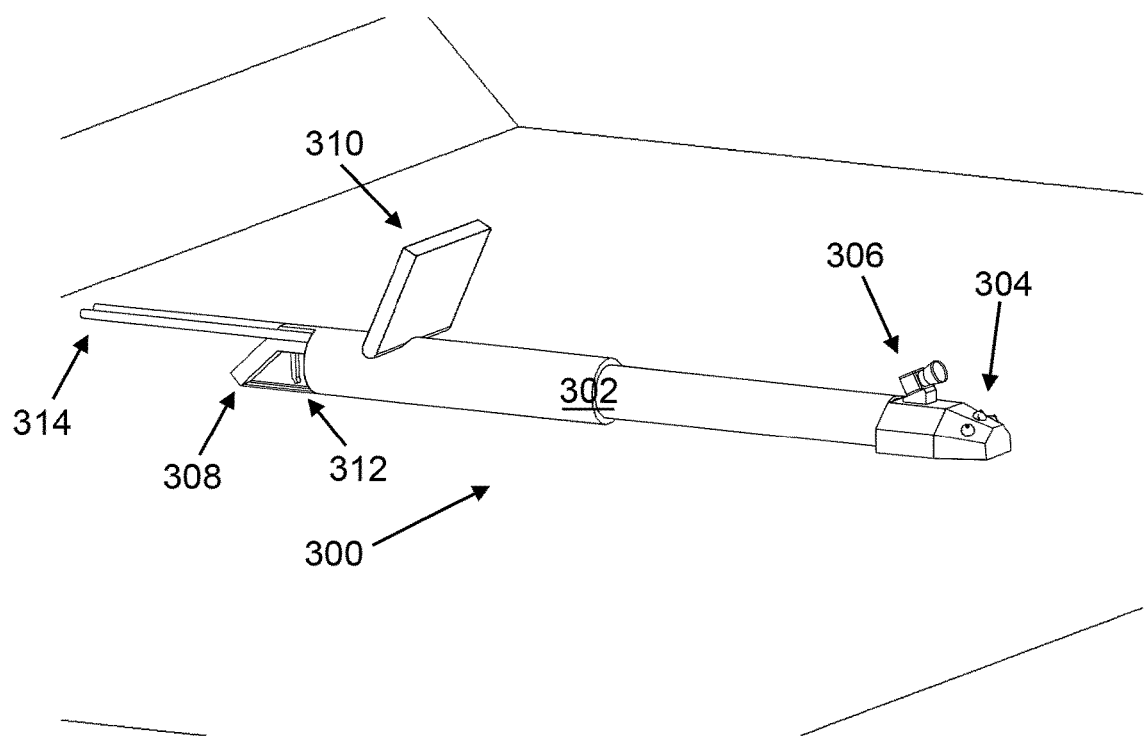
FIG. 11 is an illustration of the electromechanical arm of FIG. 10, seen in an isometric view.

FIGS. 10 and 11 are illustrations of an embodiment of an electromechanical arm according to the present disclosure, viewed from the side and an isometric view respectively. The electromechanical arm 300 comprises an elongate member in the form of an extendable pole 302, and a spray gun 304 comprising three spray nozzles provided at a distal end of the extendable pole 302. A camera 306, also provided at the distal end of the extendable pole 302, is arranged to provide feedback to an operator of the electromechanical arm 300 of what is sprayed by the spray gun 304. A range finder may be mounted next to the camera 306. A handle 308, display in the form of a display screen 310, and a trigger 312 are provided at a proximal end of the extendable pole 302, opposite the distal end. The electromechanical arm 300 is configured to be manually moved into position. The electromechanical arm 300 is usable for spraying insulation foam within a void of a building. In the present embodiment, the extendable pole 302 is extended using a telescopic mechanism. It will be appreciated that the reach of the electromechanical arm 300 can be further extended by sliding the whole electromechanical arm 300 along the ground. In another embodiment, the extendable pole 302 may be extended in length by adding modules to lengthen the extendable pole 302. The spray gun 304 is remotely operable by using a solenoid switch, air valve or other means via the trigger 312 at the handle 308. The spray nozzles on the spray gun 304 are configurable to be angled and positioned to get the required coverage depending on the physical characteristics of the space and desired spray pattern (a number of pre-set positions may be available to suit typical conditions). The telescopic mechanism for extending the extendable pole 302 is operated by turning the handle 308. The extendable pole 302 houses hoses (not shown) that feed liquid insulation material to the spray gun 304. As shown in FIG. 11, the hoses 314 enter into the electromechanical arm 300 alongside the handle 308. Depending on the type of insulation the hoses 314 may be insulated or heated. The benefit of this system is it provides an intuitive and easy to operate tool to remotely apply insulation in tight spaces.

In some embodiments, either or both of the screen and trigger may be provided remote from the arm. In this way, the operator may position the electromechanical arm 300 within the void without needing to simultaneously see the display of a screen mounted on the electromechanical arm. The system may communicate to a pre-existing device such as phone, tablet or laptop, which may be used by the operator to view the display and control the arm.

Figure 12:
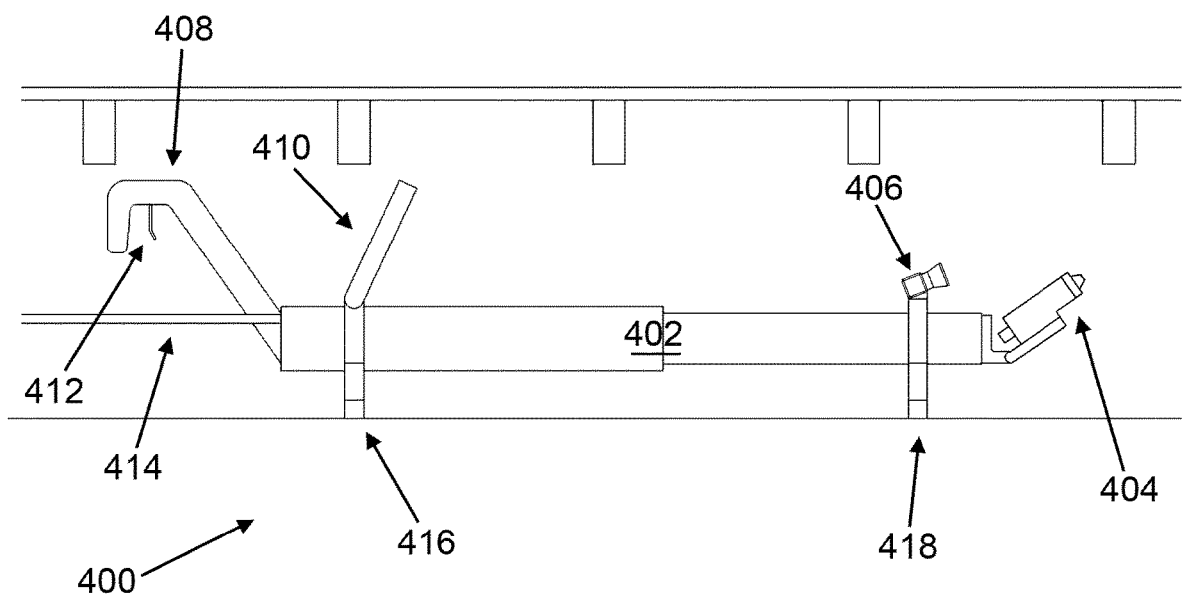
FIG. 12 is an illustration of an embodiment of an electromechanical arm according to the present disclosure, viewed from the side.
Figure 13:
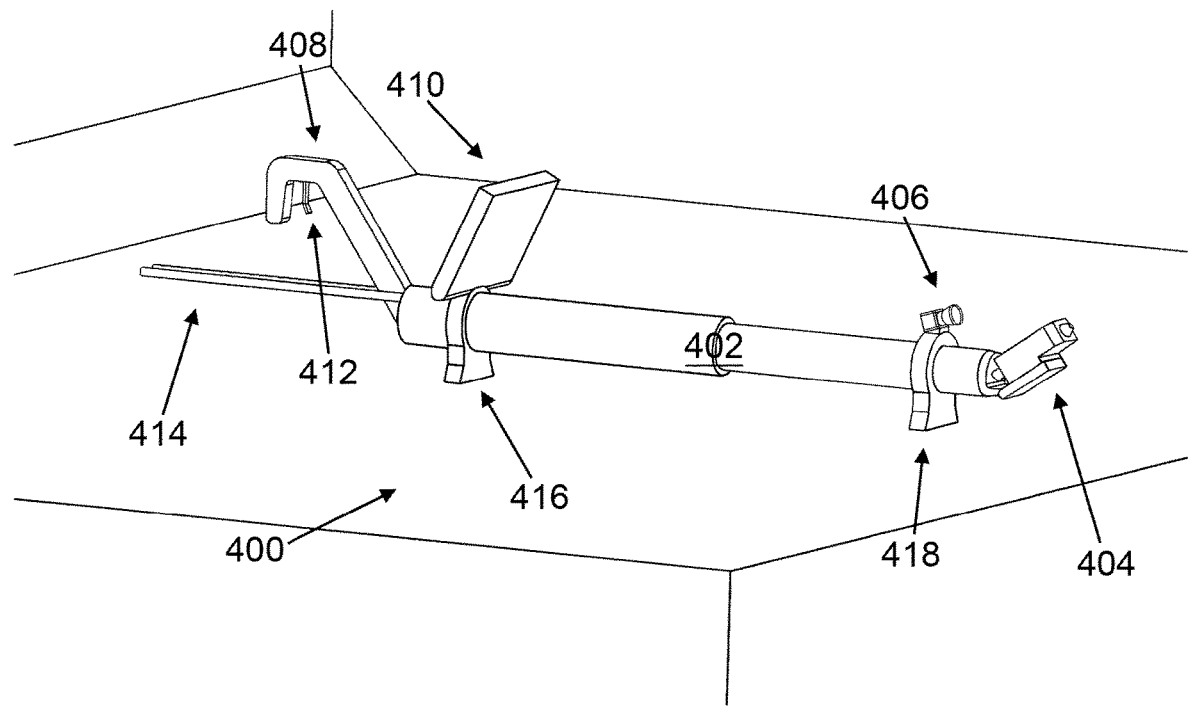
FIG. 13 is an illustration of the electromechanical arm of FIG. 12, seen in an isometric view.

FIGS. 12 and 13 are illustrations of an embodiment of an electromechanical arm according to the present disclosure, viewed from the side, and an isometric view respectively. The embodiment of the electromechanical arm 400 is substantially as described in relation to the electromechanical arm 300 in FIGS. 10 and 11 apart from the hereinafter described differences. The electromechanical arm 400 is supported by a front stand 418 and a rear stand 416. The stands 416, 418 hold the electromechanical arm 400 off the ground. The front stand 418 and the rear stand 416 comprise a collar mechanism, allowing the extendable pole 402 to rotate relative to the stand in order to turn the spray gun 404. The stands 416, 418 allow the electromechanical arm 400 to be placed on a substantially flat surface during operation. In this particular embodiment the spray gun 404 comprises only a single nozzle, and is mounted at a preset angle to the vertical. Rotating the handle 408 between a first position and a second position sweeps the path of the nozzle through an arc. In this way, insulation can be sprayed in a range of directions by rotating the handle 408. By modifying the preset angle, it is possible to modify the arc through which the spray gun 404 will travel. The camera 406 is configured to remain static as the arm rotates. It will be appreciated that the camera 406 may alternatively be mounted to the spray gun 404, such that the camera 406 moves with the rotational motion of the handle 408. This will ensure that the camera is always pointing in the direction of spray of the spray gun. However, such an arrangement may disorient a user when viewed on the screen. In some embodiments, the camera may still be mounted on the front stand 418, but be moveable independently of the spray gun 404.

Figure 14:
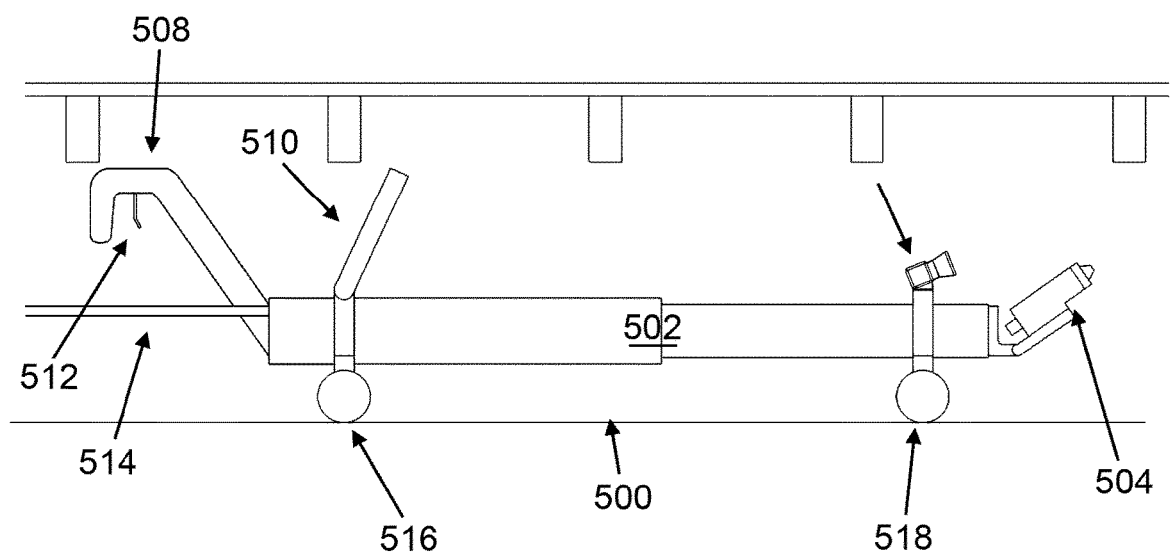
FIG. 14 is an illustration of an embodiment of an electromechanical arm according to the present disclosure, viewed from the side.

FIG. 14 is an illustration of an embodiment of an electromechanical arm according to the present disclosure, viewed from the side. The electromechanical arm 500 is substantially as described in relation to FIGS. 12 and 13, apart from the hereinafter described differences. Each of the stands 516, 518 comprise a pair of wheels to support the electromechanical arm 500 off the surface on which it is to be operated. In particular, the wheels allow the electromechanical arm 500 to easily be pushed along the surface, making it easier to manoeuvre the electromechanical arm 500.

Figure 15:
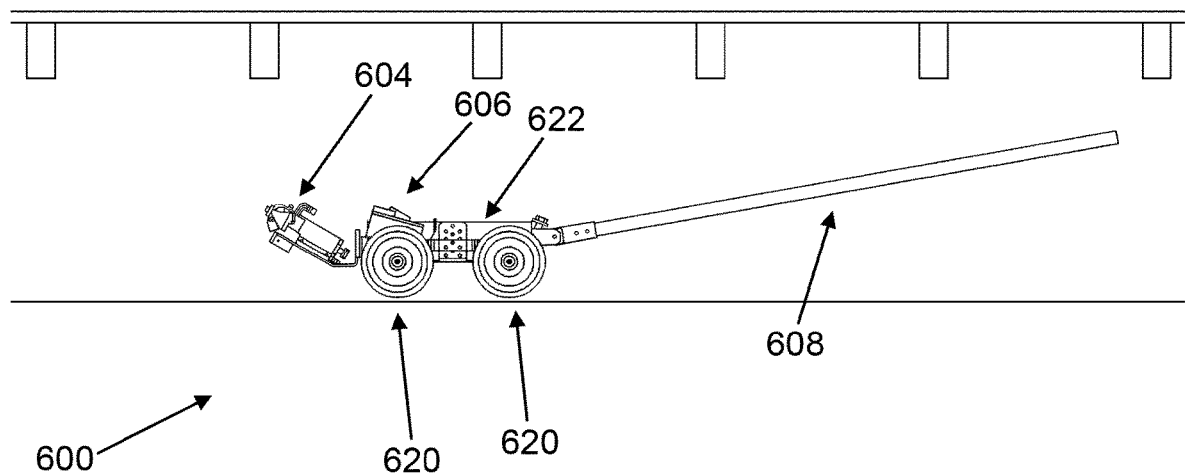
FIG. 15 is an illustration of an embodiment of an electromechanical arm according to the present disclosure, viewed from the side.
Figure 16:
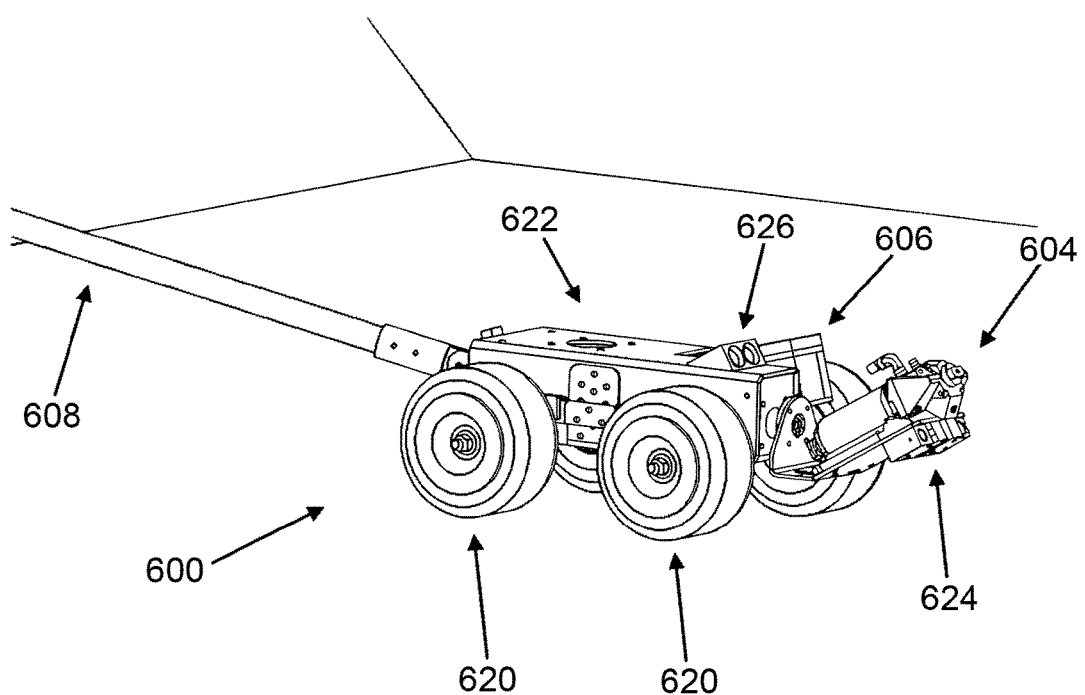
FIG. 16 is an illustration of the electromechanical arm of FIG. 15, seen in an isometric view.

FIGS. 15 and 16 are illustrations of an embodiment of an electromechanical arm according to the present disclosure, viewed from the side, and from an isometric view respectively. The electromechanical arm 600 is substantially as described in relation to FIG. 14, apart from the hereinafter described differences. The electromechanical arm 600 comprises a chassis 622, forming the main body of the electromechanical arm 600.

The chassis 622 is provided with four wheels 620 for easy manoeuvring of the chassis 622. The wheels 620 are typically not driven wheels and are free to rotate. A front end of the chassis 622 is provided with the spray gun 604 mounted thereto. The spray gun 604 is mounted at an offset angle and is rotatable movable relative to the chassis 622, whereby to move the point of aim of the spray gun 604 through an arc. The spray gun 604 is connected to a motor via a gearbox (not shown) mounted within the chassis 622 for generating a rotational movement of the spray gun 604 from an electrical signal. The angle of the gun is measured either through the control of a stepper motor, tacho mounted to the drive shaft or other means. A rear end of the chassis 622 is connected to a handle 608 for manoeuvring the electromechanical arm 600. The chassis 622 further comprises the camera 606, mounted to observe the direction of aim of the spray gun 604. The chassis 622 also comprises a light and range finder 626 mounted to illuminate and produce a 3D map of the void, respectively. A pair of lasers 624 are mounted to an underside of the spray gun 604 for projecting a laser cross (not shown) onto a surface to be sprayed using the spray gun 604 denoting the point of aim of the spray gun 604. Alternatively the range finder may comprise a laser range finder (lidar) or similar device that can scan an area to build up a 3D image. As the angle of the gun and the relative position of the surface being sprayed is known the point of aim can be calculated and overlaid digitally on the operators screen. An air curtain (not shown) may be used to protect the range finder and camera from the insulation by supplying compressed air through nozzles around the camera 606 and range finder 626. The point of aim is configured to be observed by the camera 606 in order to display the point of aim to an operator of the electromechanical arm 600. The reach of the electromechanical arm 600 may be changed by changing a length of the handle 608, either by replacement handles of a different length or by fitting additional handle members.

Figure 17:
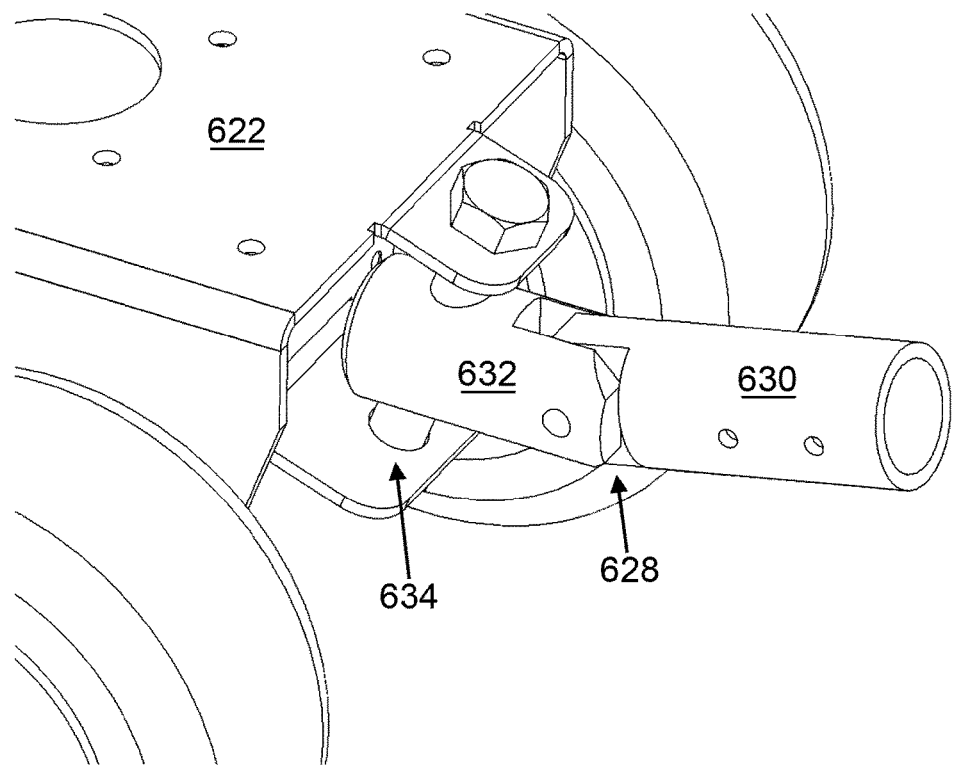
FIG. 17 is an illustration of a close up-view of a pivot joint on the electromechanical arm of FIGS. 15 and 16.

FIG. 17 is an illustration of a close up-view of a pivot joint on the electromechanical arm of FIGS. 15 and 16. The chassis 622 of the electromechanical arm 600 is connected to the handle 608 through a universal joint 628. The universal joint allows the electromechanical arm 600 to be manoeuvred from a range of directions. The universal joint comprises a handle section 630 which connects to the handle 608 and a twisting section 632 which connects to the chassis 622. The angled section 632 has defined therein an angled hole 634 configured to connect the universal joint to the chassis 622. As the handle 608 is rotated, the twisting motion turns the chassis 622 and therefore the spray gun 604. This allows the operator to change the direction in which the electromechanical arm 600 with the spray gun 604 is pointing by rotating the handle 608. In particular, a connecting pin is mounted in the angled hole 634 at an angle to the chassis 622, which ensures a rotation of the handle 608 causes a horizontal turning of the chassis 622.

Figure 18:
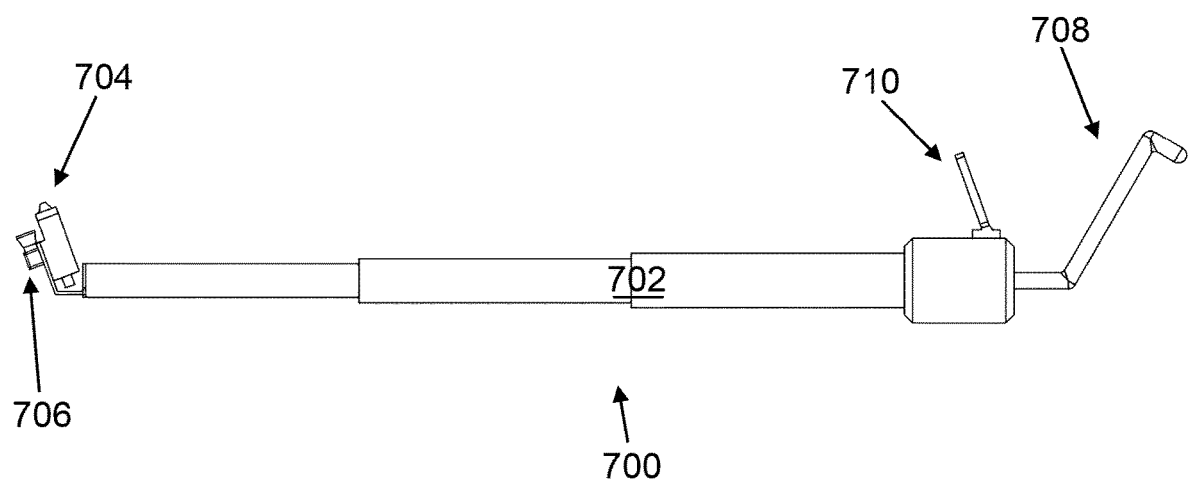
FIG. 18 is an illustration of an embodiment of an electromechanical arm according to the present disclosure, viewed from the side.
Figure 19:
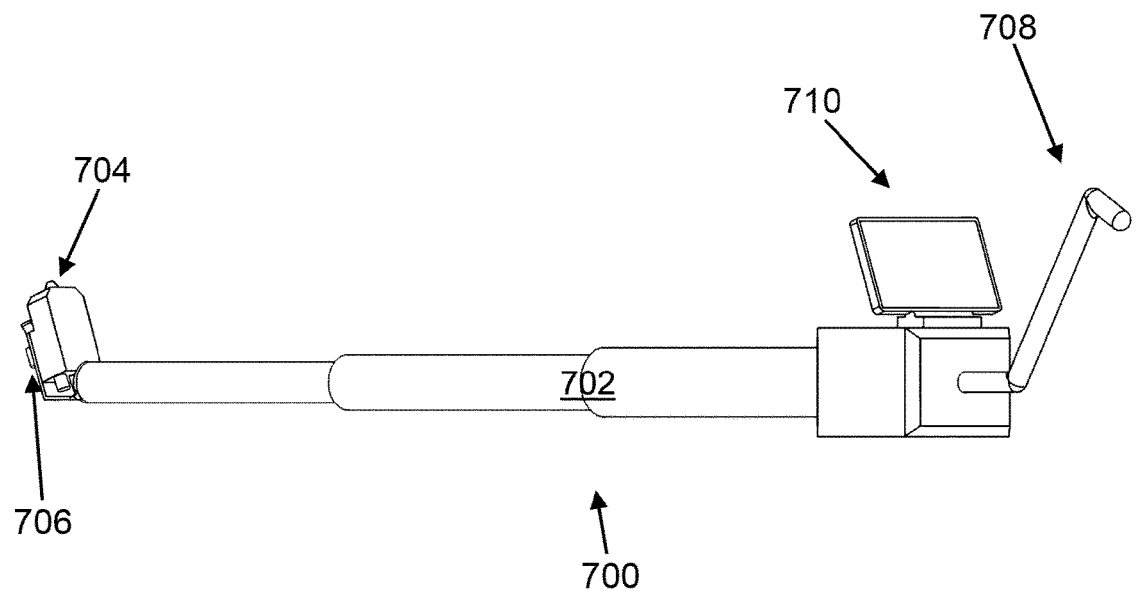
FIG. 19 is an illustration of the electromechanical arm of FIG. 18, seen in an isometric view.

FIGS. 18 and 19 are illustrations of an embodiment of an electromechanical arm according to the present disclosure, viewed from the side and an isometric view respectively. The electromechanical arm 700 is substantially as described with reference to FIGS. 10 and 11, but with the hereinafter described differences. The camera and range finder 706 is mounted beneath the spray gun 704. This mounting arrangement ensures that the camera and range finder 706 can be protected from any debris falling onto the electromechanical arm 700, for example, solidifying insulation foam. In this particular embodiment, the handle can be used to control both the extension of the electromechanical arm 700 and to control the rotation of the spray gun 704. As the camera and range finder are mounted to the gun they also rotate to follow the point of aim. The range finder provides a measurement of the material applied before and after so the thickness of coverage can be calculated. The range finder may comprise a lidar that scans a 2D plane mounted in such a way that when the gun rotates it creates a 3D scan of the area. Lifting the handle 708 into a 90 degree position allows the extension of the arm to be adjusted. Winding the handle 708 clockwise or anticlockwise adjusts the extension length of the extendable pole 702 without adjusting the direction in which the spray nozzle 704 is aiming. Furthermore, moving the handle 708 back into an angled position between 90 degrees and 0 degrees (typically approximately 45 degrees) relative to the axis parallel to the direction of the extendable pole 702 engages a separate mechanism to control the rotational movement of the spray gun without controlling the extension of the extendable pole 702. The camera 706 mounted to the base of the spray gun 704 provides visual feedback to the operator via the display screen 710. The spray 704 is mounted at an angle of approximately 70 degrees to the horizontal.

Figure 20:
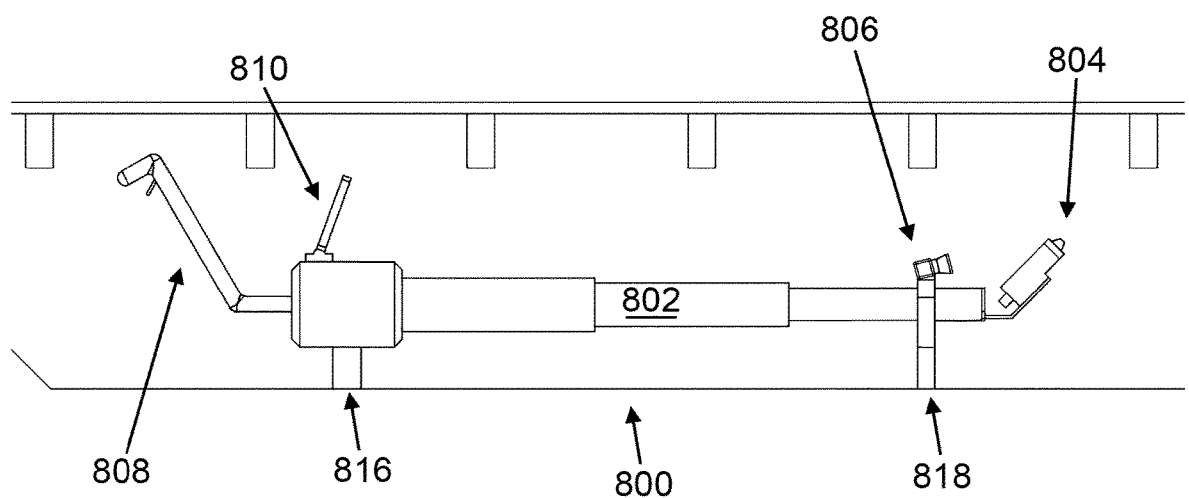
FIG. 20 is an illustration of an embodiment of an electromechanical arm according to the present disclosure, viewed from the side.

FIG. 20 is an illustration of an embodiment of an electromechanical arm according to the present disclosure, viewed from the side. The electromechanical arm 800 is substantially as described with reference to FIGS. 18 and 19 apart from the hereinafter described differences. The extendible pole 802 is supported by a front stand 818 and a rear stand 816 which function substantially as described with reference to FIGS. 12 and 13. The spray gun 804 is mounted at an angle of approximately 45 degrees to the horizontal.

Figure 21:
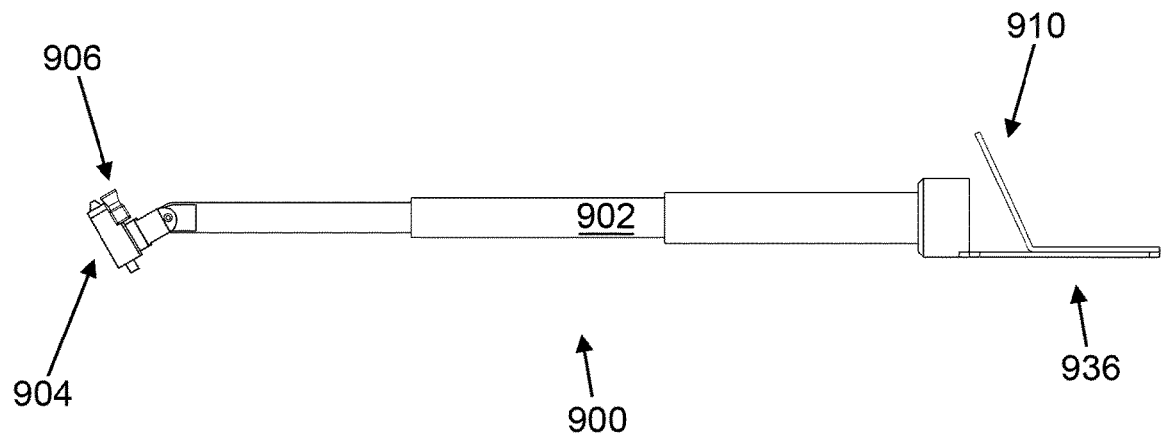
FIG. 21 is an illustration of an embodiment of an electromechanical arm according to the present disclosure, viewed from the side.
Figure 22:
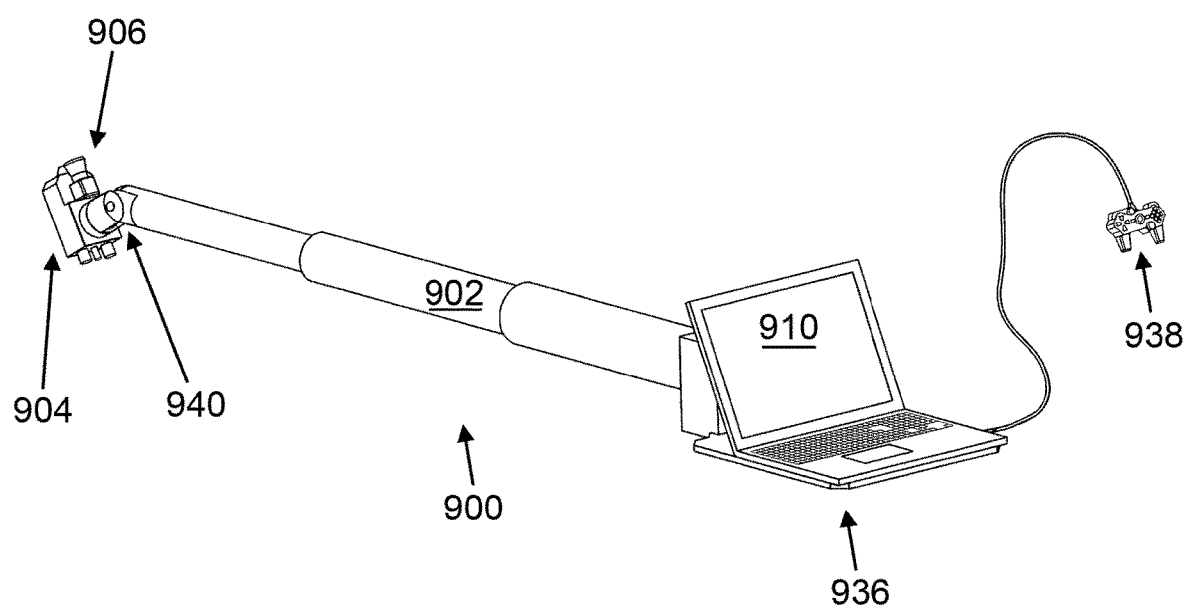
FIG. 22 is an illustration of the electromechanical arm of FIG. 21, seen in an isometric view.

FIGS. 21 and 22 are illustrations of an embodiment of an electromechanical arm according to the present disclosure, viewed from the side, and from an isometric view respectively. The electromechanical arm 900 is substantially as described with reference to FIGS. 18 and 19 apart from the hereinafter described differences. The electromechanical arm 900 comprises a wrist and elbow joint 940 between the extendable pole 902 and the spray gun 904 arranged to allow variation in the direction of the spray gun 904. The wrist and elbow joint 940 will be described in more detail in relation to FIG. 39. The electromechanical arm 900 is also provided with a microcontroller in the form of a laptop 936 having a screen 910 for displaying the image from the camera 906. Thus, the laptop can provide a visual feedback for an operator of the positioning of the spray gun 904. The electromechanical arm 900 is controlled using a controller in the form of a gamepad 938 connected to the laptop 936. Position sensors in the electromechanical arm 900 provide data to the laptop 936.

Figure 23:
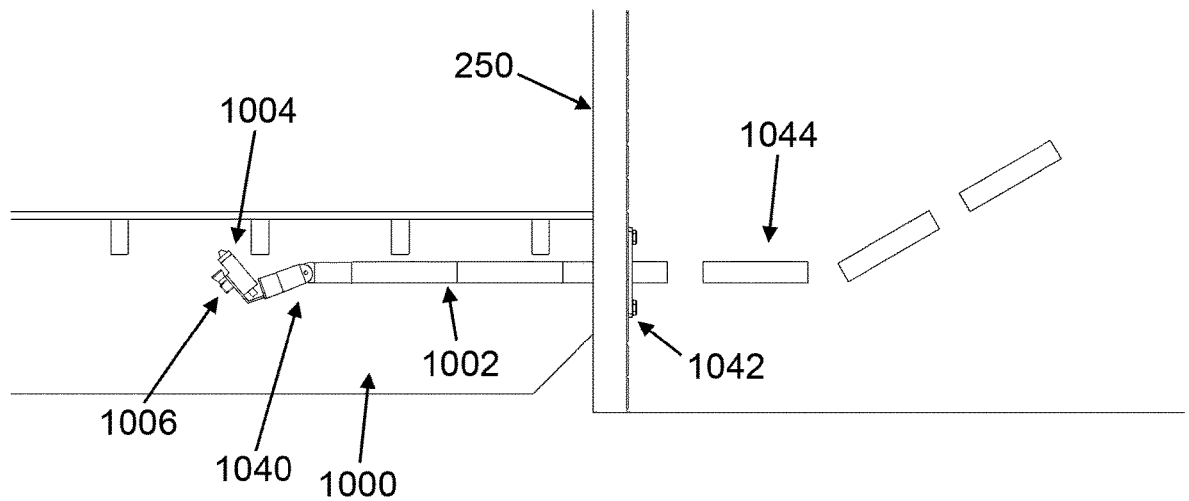
FIG. 23 is an illustration of an embodiment of an electromechanical arm according to the present disclosure, viewed from the side.

FIG. 23 is an illustration of an embodiment of an electromechanical arm according to the present disclosure, viewed from the side. The electromechanical arm 1000 is substantially as described with reference to FIGS. 21 and 22 above apart from the hereinafter described differences. The extendible pole 1002 is formed from a plurality of interlocking, modular sections. Additional arm sections 1044 may be fed into the electromechanical arm 1000 to extend the length. It will be appreciated that other sections may be inserted to form the electromechanical arm 1000 as required, for example a wrist and elbow joint 1040 provided at an end of the extendable pole 1002 and connected to the spray gun 1004. In some embodiments, just a single pole section is used having the correct length, rather than a number of shorter lengths connected together. The electromechanical arm 1000 extends into the underfloor cavity from a wall mounting 1042 secured in a hole defined within an outer wall 250. The wall mounting will be described further in relation to FIG. 47.

Figure 24:
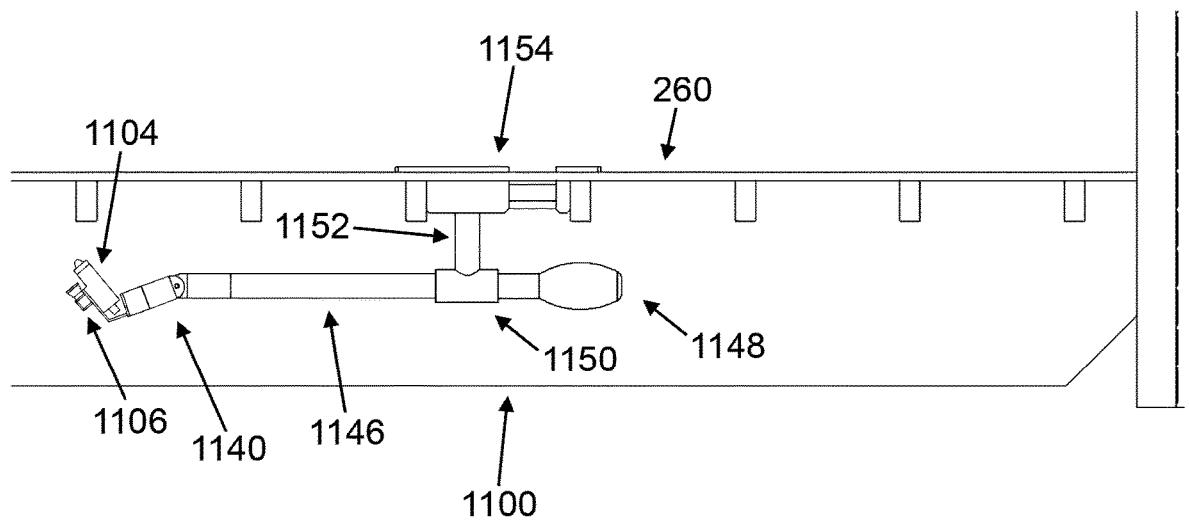
FIG. 24 is an illustration of an embodiment of an electromechanical arm according to the present disclosure, viewed from the side.
Figure 25:
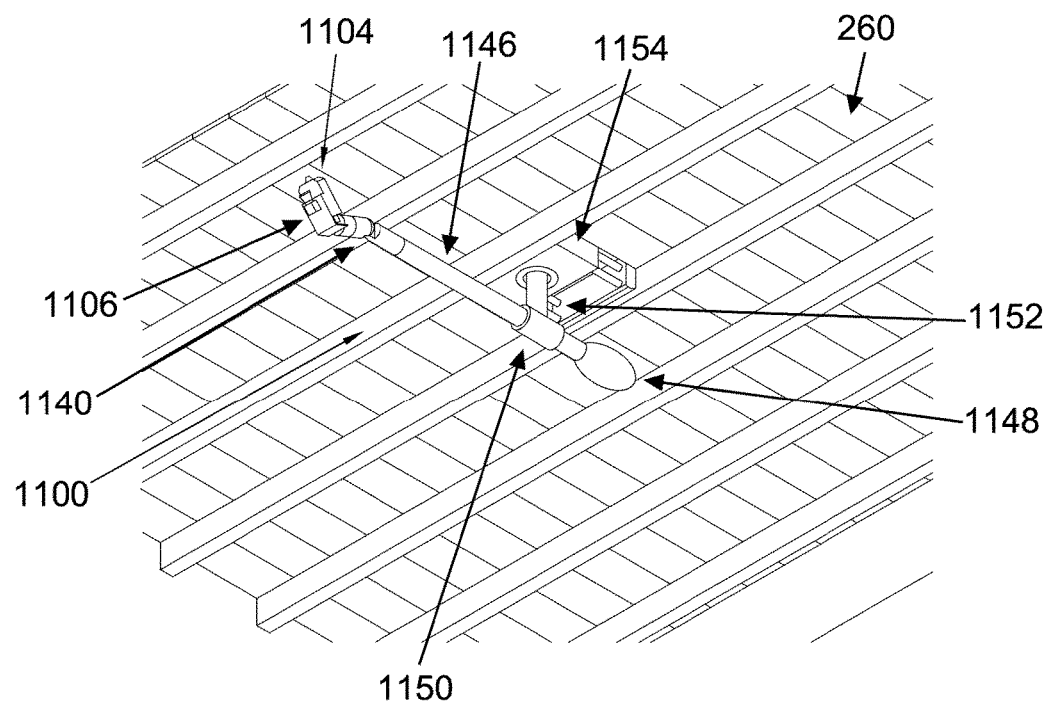
FIG. 25 is an illustration of the electromechanical arm of FIG. 24, seen in an isometric view.

FIGS. 24 and 25 are illustrations of an embodiment of an electromechanical arm according to the present disclosure, viewed from the side, and from an isometric view respectively. The electromechanical arm 1100 is substantially as described with reference to FIG. 23 apart from the hereinafter described differences. Instead of an extendable pole, the electromechanical arm 1100 comprises a sliding pole 1146 which is arranged to slide within a collar 1150 provided at the end of a pivot 1152. The pivot is connected to a floor mounting 1154 such that the electromechanical arm is mounted in a hole defined in a floor 260 via the floor mounting 1154. The floor mounting 1154 will be described further in relation to FIG. 46. An end of the sliding pole 1146 opposite the spray nozzle 1104 is provided with a counterbalance 1148 which is configured to ensure the moments acting on the floor 160 through the floor mount 1154 are minimised. The counterbalance 1148 also ensures that the electromechanical arm 1100 moves easily. A mass of the counterbalance may be increased or decreased by filling the counterbalance with ballast, for example water. In some embodiments, the counterbalance 1148 is arranged to move on the sliding pole 1146 in order to balance the moments acting on the floor 260 through the floor mounting 1154. The sliding arm mechanism can be manually operated or robotically controlled to move the spray nozzle 1104 forward and backwards, and to rotate the sliding pole 1146. The electromechanical arm 1100 may be controlled directly using an optional handle (not shown) extending above the level of the floor 260. Alternatively, the electromechanical arm 1100 may be controlled remotely via motors using a screen and controller remote from the arm. The sliding pole 1146 can slide through the collar 1150 to extend the reach of the spray gun 1104 within the void. As will be explained further with reference to FIG. 46 below, the floor mounting 1154 wedges into the opening in the floor 260 to provide a stable mounting point for the electromechanical arm 1100.

Figure 26:
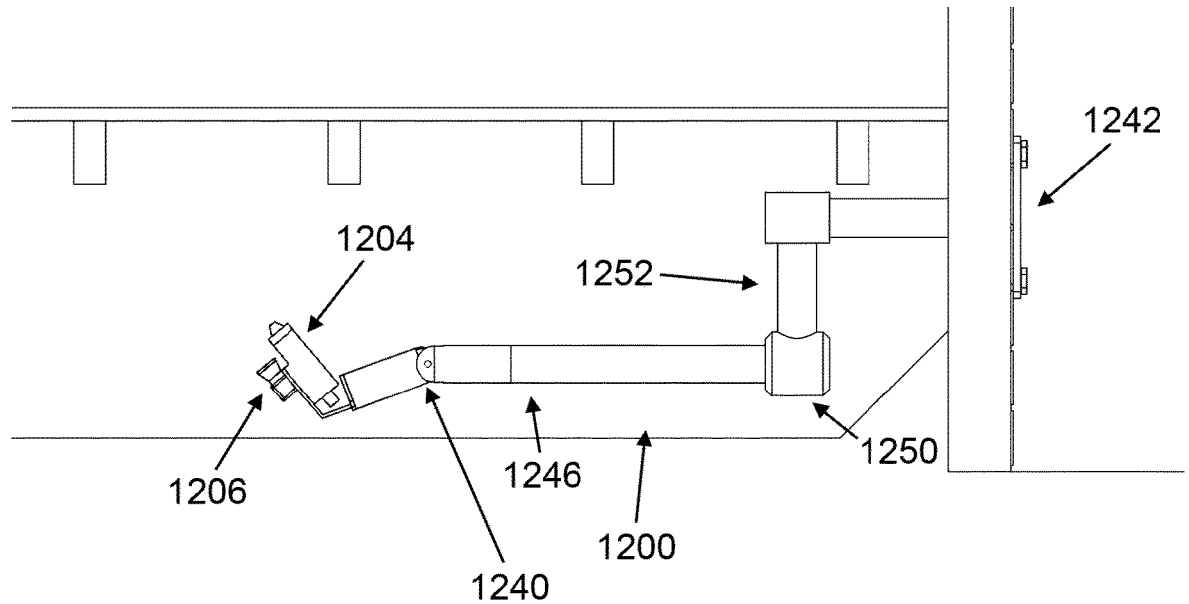
FIG. 26 is an illustration of an embodiment of an electromechanical arm according to the present disclosure, viewed from the side.
Figure 27:
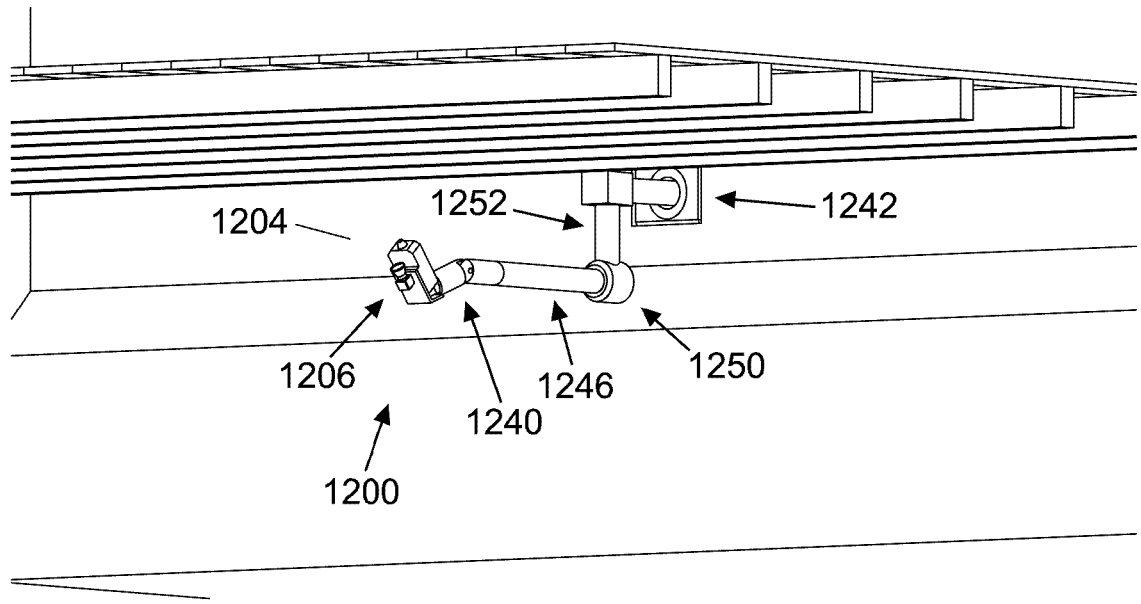
FIG. 27 is an illustration of the electromechanical arm of FIG. 26, seen in an isometric view.

FIGS. 26 and 27 are illustrations of an embodiment of an electromechanical arm according to the present disclosure, viewed from the side, and from an isometric view respectively. The electromechanical arm 1200 is substantially as described in relation to FIGS. 24 and 25 apart from the hereinafter described differences. Instead of being mounted in a hole defined in a floor, the electromechanical arm 1200 is mounted using a wall mounting 1242. The collar 1250 allows the sliding pole 1246 to move in and out to extend the reach of the electromechanical arm 1200. However, it will be appreciated that because the electromechanical arm 1200 is mounted using a wall mounting 1242, the sliding pole 1246 is only able to slide through the collar 1250 a small amount. The pivot 1252 allows the electromechanical arm 1200 to rotate about the pivot 1252 to allow the spray gun 1204 to access a range of different positions. To extend the electromechanical arm 1200 further into the cavity, additional arm sections (not shown) may be added at the wall mounting 1242 in a similar way as that described in relation to FIG. 23. The electromechanical arm 1200 has been adapted to be used with an air vent entry system and the reach from the wall 250 of the building to the pivot 1252 can be adjusted accordingly. In particular, this design is suitable for periscope vents where the inlet and outlet of the vent are out of vertical alignment.

Figure 28:
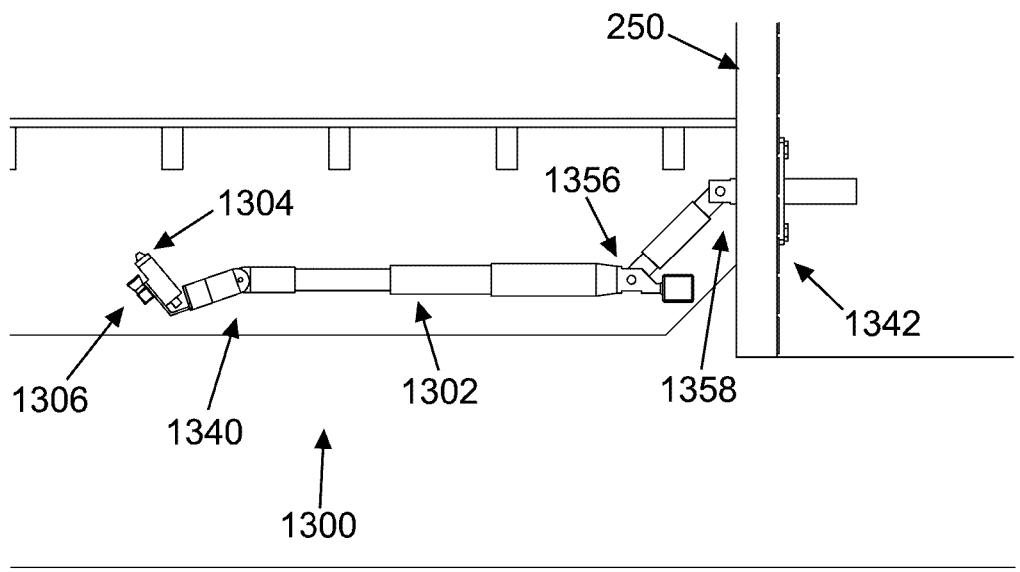
FIG. 28 is an illustration of an embodiment of an electromechanical arm according to the present disclosure, viewed from the side.
Figure 29:
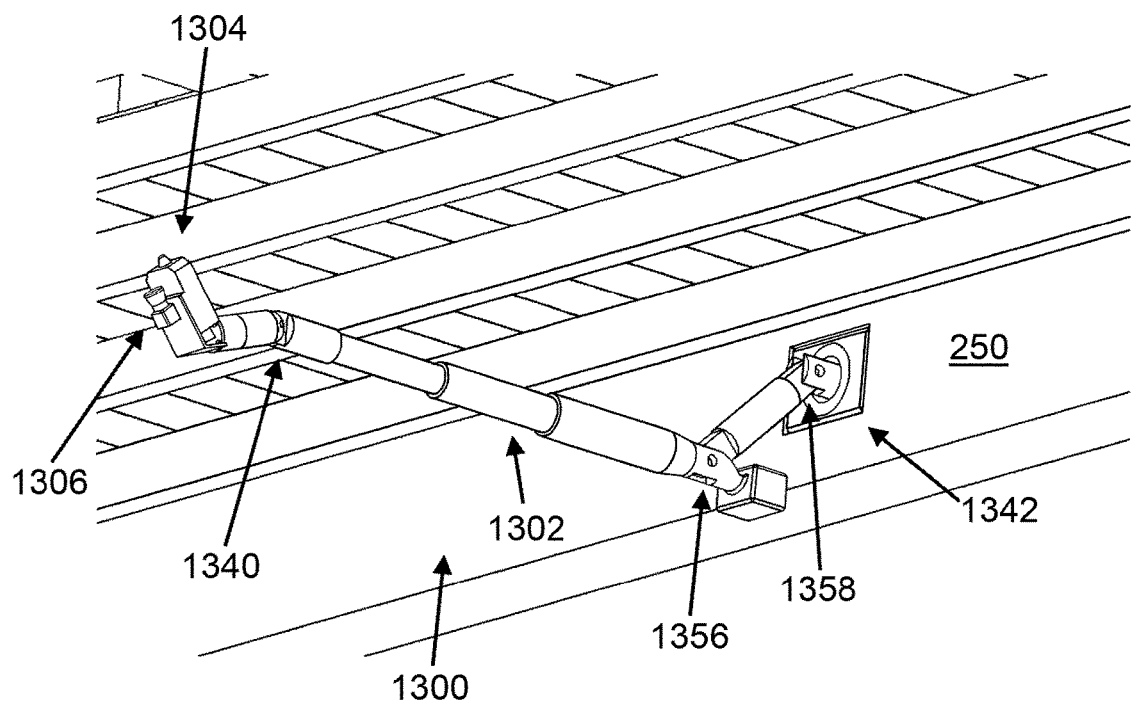
FIG. 29 is an illustration of the electromechanical arm of FIG. 28, seen in an isometric view.

FIGS. 28 and 29 are illustrations of an embodiment of an electromechanical arm according to the present disclosure, viewed from the side, and from an isometric view respectively. The electromechanical arm 1300 is substantially as described with reference to FIG. 23 apart from the hereinafter described differences. An upper elbow section 1358 is provided between the wall mounting 1342 and the extendable pole 1302. A lower elbow section 1356 is provided between the upper elbow section 1358 and the extendable pole 1302. In this way, a height of the extendable pole 1302 in the void can be varied whilst ensuring that the extendable pole 1302 continues to extend parallel to a bottom surface of the void. This particular arrangement is flexible and will suit a variety of different opening types.

Figure 30:
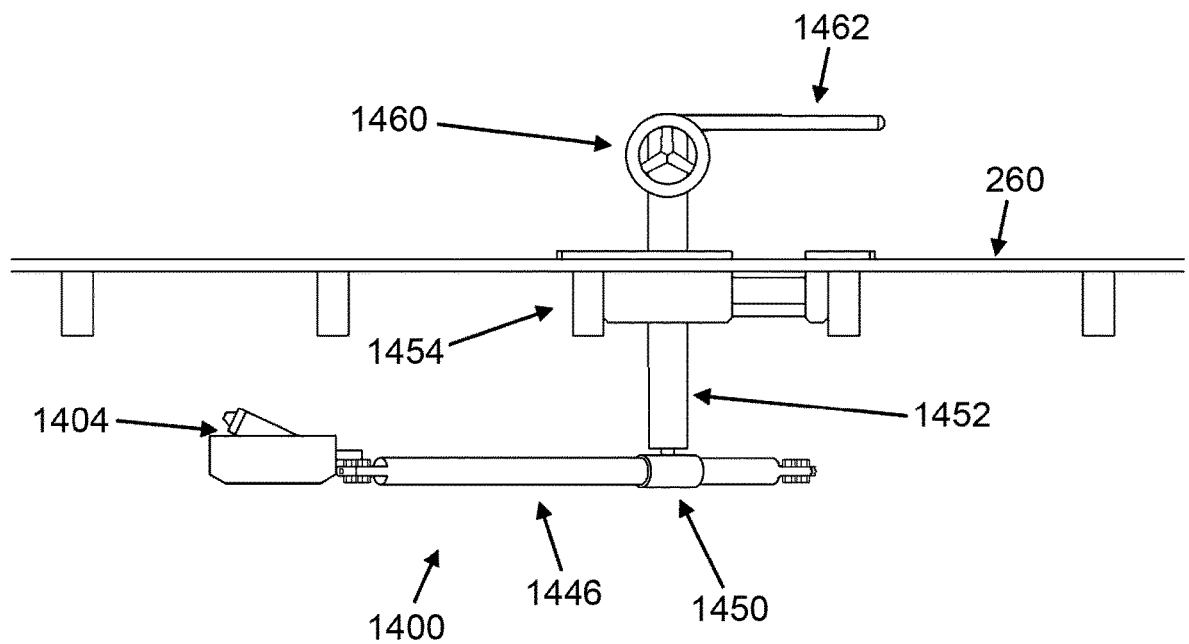
FIG. 30 is an illustration of an embodiment of an electromechanical arm according to the present disclosure, viewed from the side.
Figure 31:
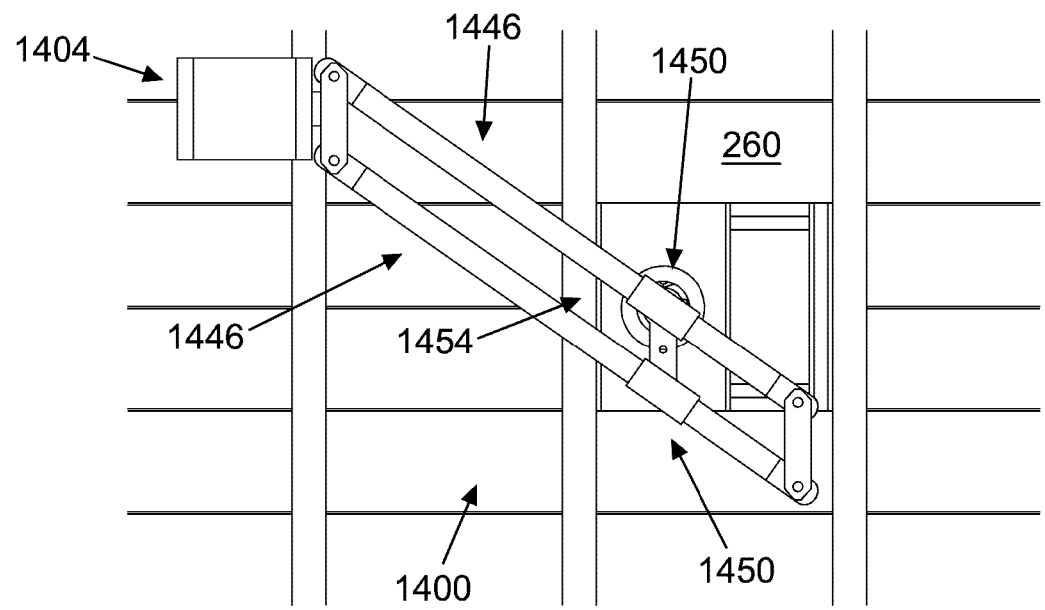
FIG. 31 is an illustration of the electromechanical arm of FIG. 30, seen in a bottom-up view.

FIGS. 30 and 31 are illustrations of an embodiment of an electromechanical arm according to the present disclosure, viewed from the side, and a bottom-up view respectively. The electromechanical arm 1400 is substantially as described with reference to FIGS. 24 and 25 apart from the hereinafter described differences. The electromechanical arm 1400 comprises an electronically controlled spray nozzle as will be described further in relation to FIG. 41, connected to a four bar linkage formed from two sliding poles 1446 configured to slide through two collars 1450. The two collars 1450 are connected together by a joining link which is fixedly secured to the floor mounting 1454. One of the collars 1450 is connected to the pivot 1452, itself connected to a tiller 1462. Rotating the tiller moves the spray gun 1404 in an arc, whilst ensuring that the spray gun 1404 continues to point in the same direction. The four bar linkage translates the rotational movement of the tiller 1462 to an arc movement of the spray gun 1404, where the spray gun 1404 continues to point in the same direction relative to the floor 260 throughout the arc movement. A control wheel 1460 is provided above the floor mounting and connected with gearing to the four bar link. In particular, rotating the control wheel 1460 controls the extension of the spray gun 1404 by sliding the sliding poles 1446 through the collars 1450 to extend or retract the reach of the spray gun 1404. In this particular embodiment, the tiller 1462 can be lifted to engage the rotational movement of the whole electromechanical arm 1400 or left in its resting position, so that it operates the four bar linkage to move the spray gun 1404 substantially laterally. The benefit of this mechanism is that the spray apparatus can remain parallel throughout the motion.

Figure 32:
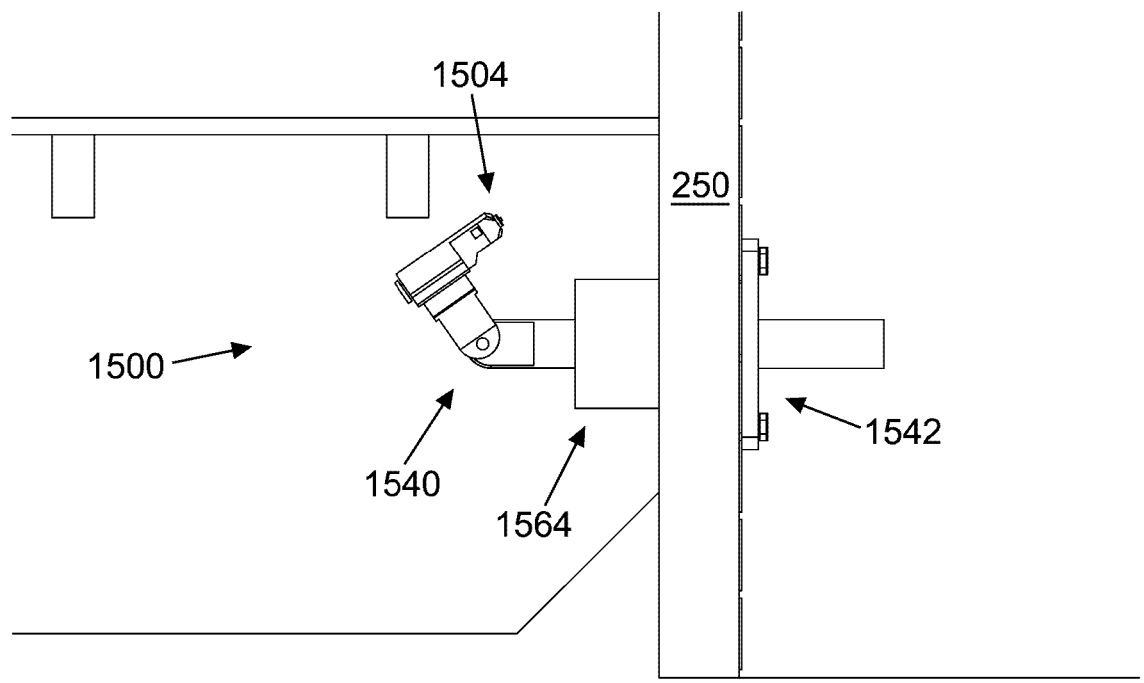
FIG. 32 is an illustration of an embodiment of an electromechanical arm according to the present disclosure, viewed from the side.
Figure 33:
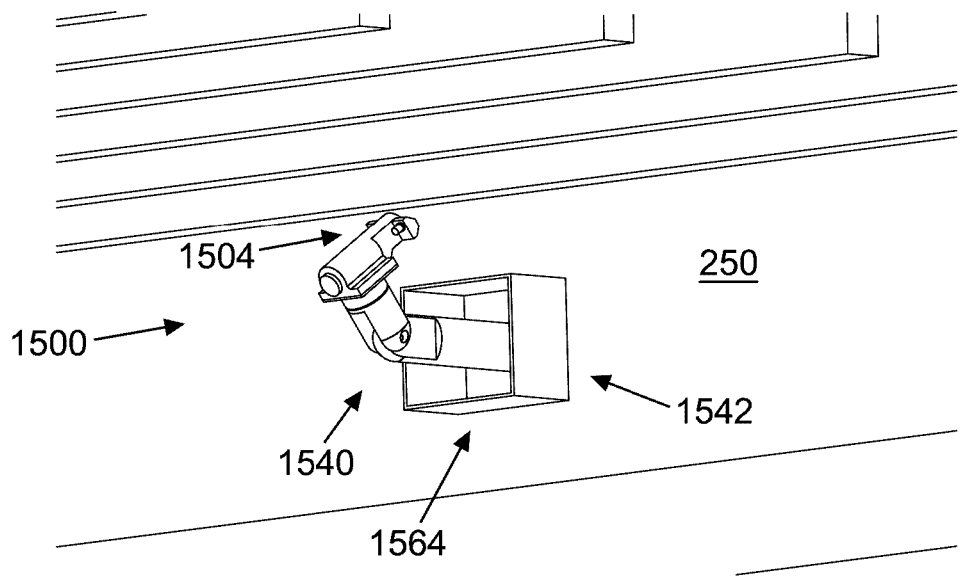
FIG. 33 is an illustration of the electromechanical arm of FIG. 32, seen in an isometric view.

FIGS. 32 and 33 are illustrations of an embodiment of an electromechanical arm according to the present disclosure, viewed from the side, and in an isometric view respectively. The electromechanical arm 1500 is substantially as described with reference to FIG. 23 apart from the hereinafter described differences. The electromechanical arm 1500 is provided with a mould 1564 that provides a neat finish to the area around the air vent defined within the wall 250 when the electromechanical arm 1500 is removed from the wall 250. The spray gun 1504 can be rotated around the axis of the electromechanical arm 1500 and has an elbow and wrist joint 1540 that allows the spray gun 1504 to be positioned accurately. The clean opening is required so that the underfloor void remains ventilated even after insulation is applied to the underside of the floor.

Figure 34:
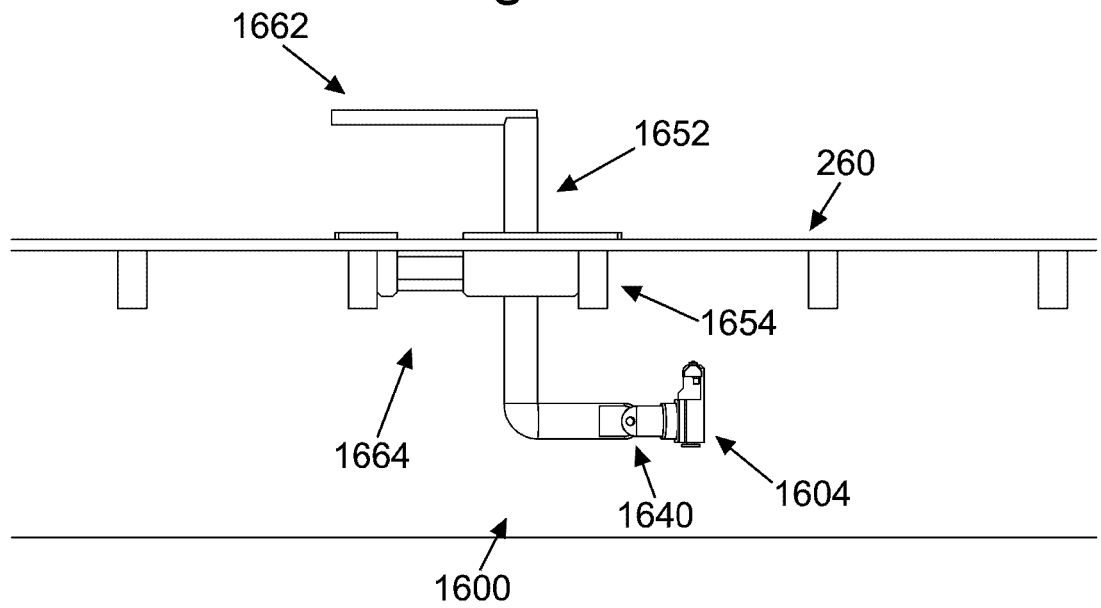
FIG. 34 is an illustration of an embodiment of an electromechanical arm according to the present disclosure, viewed from the side.
Figure 35:
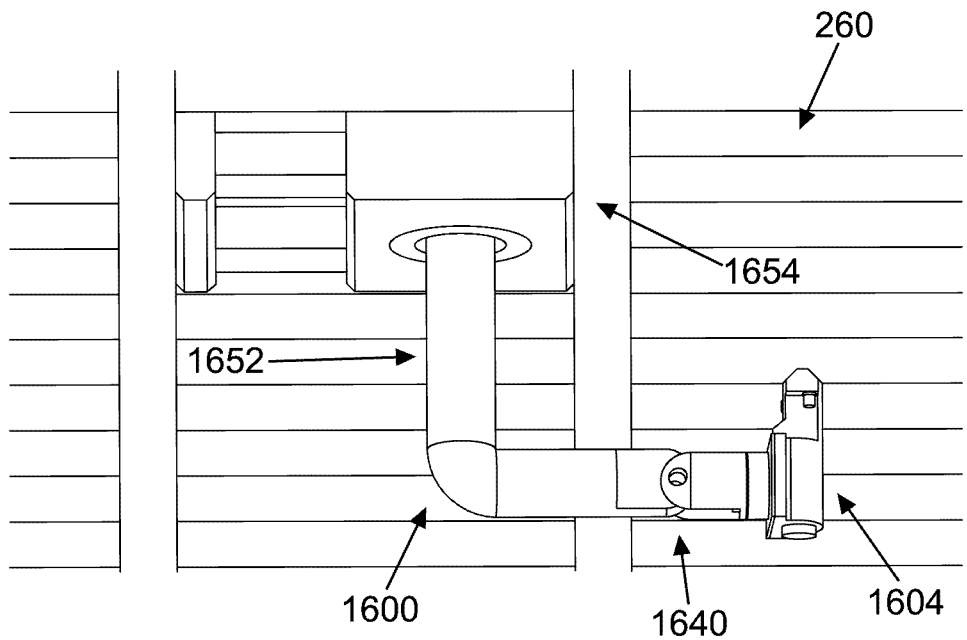
FIG. 35 is an illustration of the electromechanical arm of FIG. 34, seen in an isometric view.

FIGS. 34 and 35 are illustrations of an embodiment of an electromechanical arm according to the present disclosure, viewed from the side, and in an isometric view respectively. The electromechanical arm 1600 is substantially as described with reference to FIGS. 32 and 33 apart from the hereinafter described differences. In this particular embodiment, the electromechanical arm 1600 may be referred to as a floorboard finishing tool. The electromechanical arm 1600 is a manually actuated tool that rotates the spray gun 1604 around the opening in the floor 260 and mould 1664. The electromechanical arm 1600 extends through the floor mounting 1664 with a pivot 1652 that may be rotated through a tiller 1662. This creates a neat access hatch which can be filled with a piece of ridged insulation panel and removed to allow access easily at a later stage.

Figure 36:
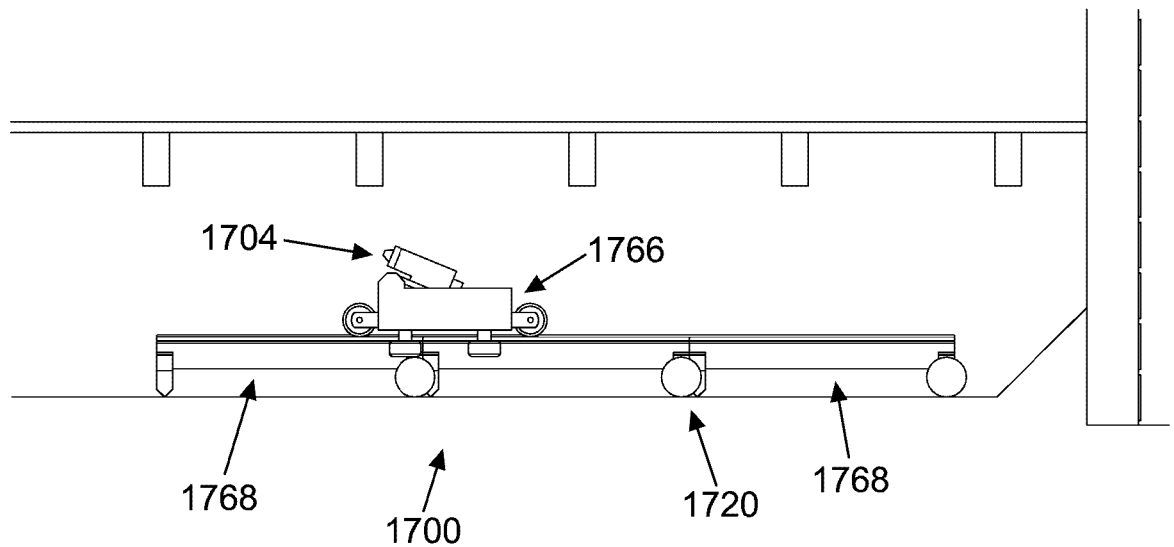
FIG. 36 is an illustration of an embodiment of an electromechanical arm according to the present disclosure, viewed from the side.
Figure 37:
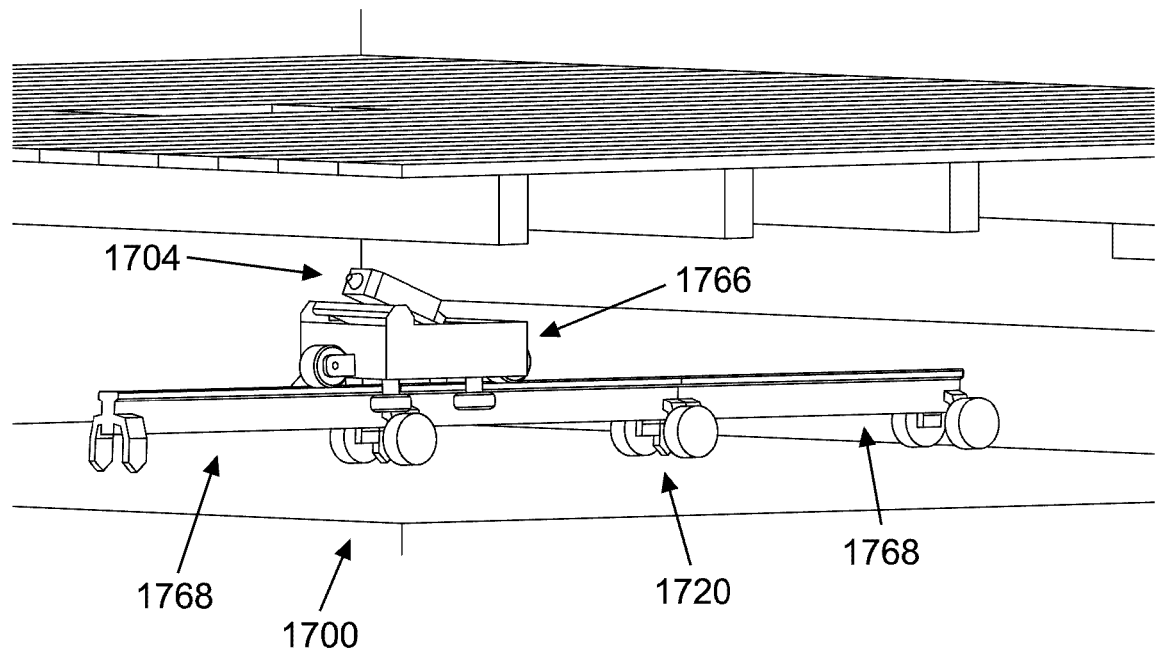
FIG. 37 is an illustration of the electromechanical arm of FIG. 36, seen in an isometric view.

FIGS. 36 and 37 are illustrations of an embodiment of an electromechanical arm according to the present disclosure, viewed from the side, and in an isometric view respectively. The electromechanical arm 1700 comprises a spray gun 1704 as described further in relation to FIG. 41. The spray gun 1704 is mounted on a gun carriage 1766, provided with wheels and configured to run along a modular track system comprising a plurality of rail sections 1768. The plurality of rail sections 1768 comprise a plurality of wheels 1720 for easy deployment and manoeuvring of the track. A wheeled gun carriage 1766 runs on the track and has a 2 axis movement system for the spray gun 1704 to enable it to spray a large area.

Figure 38:
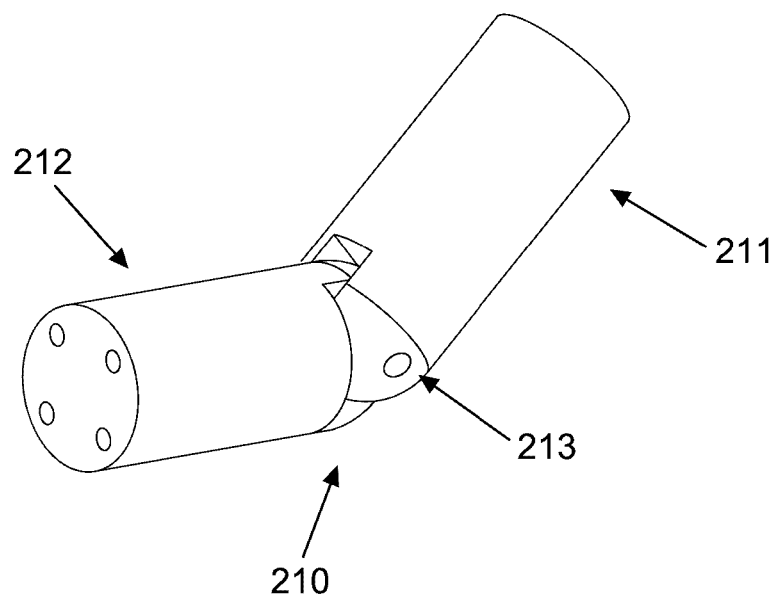
FIG. 38 is an illustration of an embodiment of an elbow joint for an electromechanical arm.

FIG. 38 is an illustration of an embodiment of an elbow joint for an electromechanical arm. The elbow joint 210 comprises a first member 211 and a second member 212 rotatably connected to the first member 211 through a connecting axle 213. The first member 211 is configured to be rotatably positioned relative to the second member 212 by rotation about the connecting axle 213. The elbow joint 210 is a powered elbow joint and allows for the arm to be easily manipulated in a single axis. This will help the electromechanical arm go around corners, sleeper walls and avoid obstacles that are in the underfloor void. A worm gearbox attached to a motor (not shown) controls the movement of the elbow joint 210 and allows for accurate positioning. The elbow joint 210 is modular and connectable to further modules to provide a wide variety of arm configurations.

Figure 39:
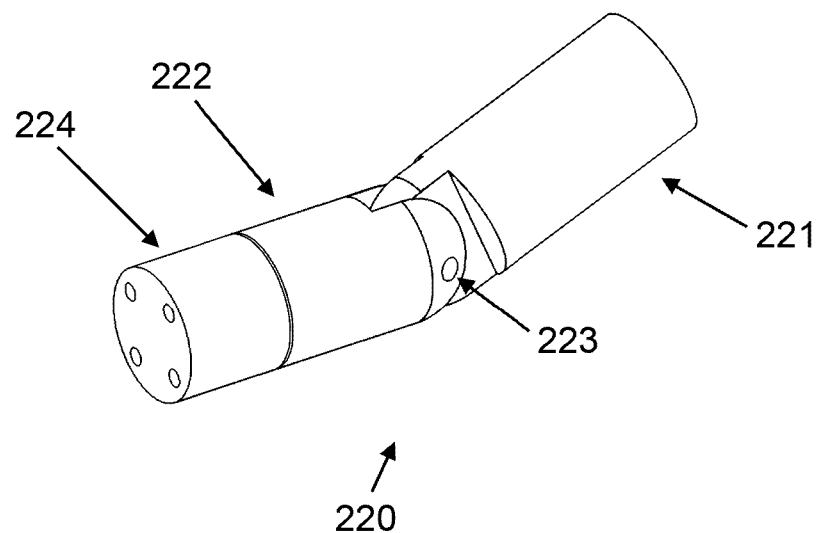
FIG. 39 is an illustration of an embodiment of a combined elbow and wrist joint for an electromechanical arm.

FIG. 39 is an illustration of an embodiment of a combined elbow and wrist joint for an electromechanical arm. The elbow joint part of the elbow and wrist joint 220 is substantially as described with reference to FIG. 38. A rotation member 224, otherwise known as a wrist joint is provided on an end of the second member 222 opposite the end connected to the first member 221 through the connecting axle 223. Consequently, this section of the arm has two axes of movement. As with FIG. 38, there is a powered hinge that can move the whole arm up and down. There is also a wrist part to the section that is able to rotate a rotation member 224 of the joint 220 relative to the first and second member 221, 222 of the joint 220. The end of the wrist section has the mountings to enable any of the spray guns to be attached to it. A planetary gearbox and motor (not shown) control the rotational movement of the wrist and a worm gearbox and motor (not shown) will control the movement of the elbow joint.

Figure 40:
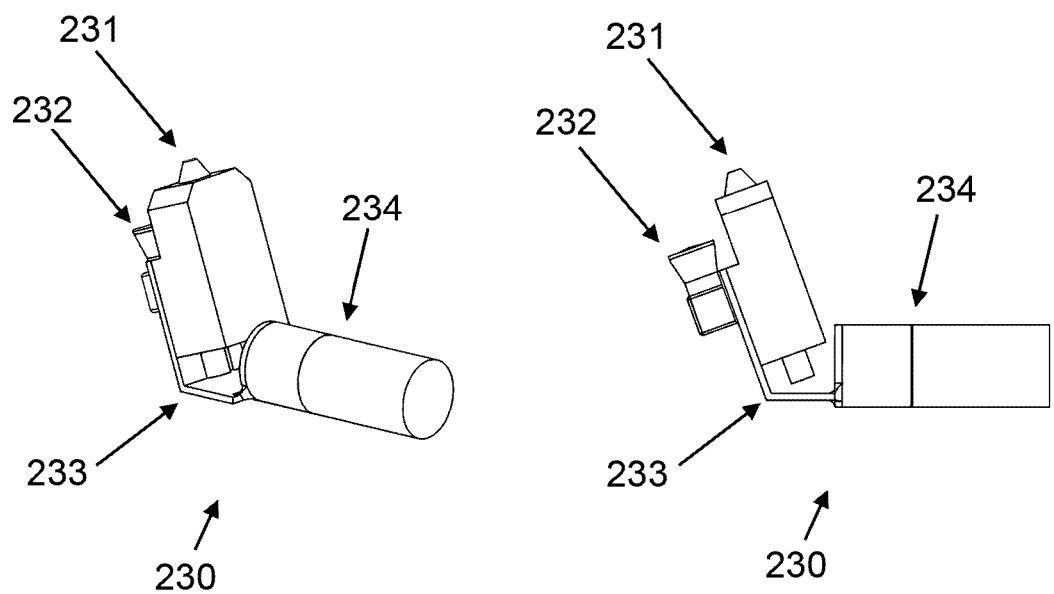
FIG. 40 is an illustration of two views of an embodiment of a single axis spray gun for an electromechanical arm.

FIG. 40 is an illustration of two views of an embodiment of a single axis spray gun for an electromechanical arm. The spray gun 230 is in the form of a single axis spray gun and comprises a nozzle 231 configured to be usable to spray a treatment, for example insulation foam, out of the spray gun 230. The spray gun 230 further comprises a camera 232 arranged to capture an aim point of the spray gun 230. The camera is connectable to a display screen (not shown) provided away from the spray gun 230 to allow an operator to see the areas sprayed with treatment from the spray gun 230. The spray gun 230 further comprises an angled plate 233 set at an angle of, in this particular case, approximately 70 degrees. The single axis spray gun movement works by rotating the nozzle about a single axis using the wrist joint 234. The angled plate 233 that is attached to the end of the rotating axis sets the spray arc which the nozzle 231 may travel through. It will be appreciated that different angled plates can be attached depending on void height and spraying requirements.

Figure 41:
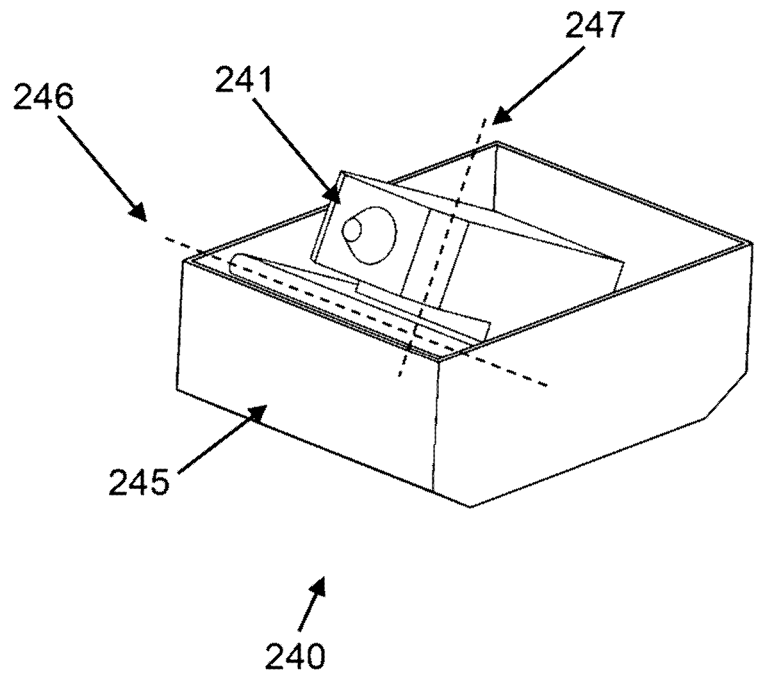
FIG. 41 is an illustration of an embodiment of a two axis movement spray gun for an electromechanical arm.

FIG. 41 is an illustration of an embodiment of a two axis movement spray gun for an electromechanical arm. The spray gun 240 is in the form of a two axis spray gun and comprises a nozzle 241 provided on a movable plate configured to be moveable within a housing 245 which may be connected to a further module in the electromechanical arm. The spray gun 240 can move in a vertical plane by rotating about the horizontal axis 246, positioned at the front of the movable plate. The spray gun 240 can also move in a horizontal plane by rotating about a transverse axis 247, positioned centrally approximately ⅔ of the way from the back of the movable plate to the front of the movable plate. This allows the spray gun 240 to cover a large area whilst spraying. Complex patterns can be achieved by this spraying system, ensuring a large area is covered quickly and completely. The horizontal axis is typically positioned adjacent a front end of the spray gun. This ensures that the spray gun is positioned high enough to overcome any obstacles at the front of the arm in a flat configuration, whilst also ensuring the spray gun does not protrude upwards too far in an up-angled configuration.

Figure 42:
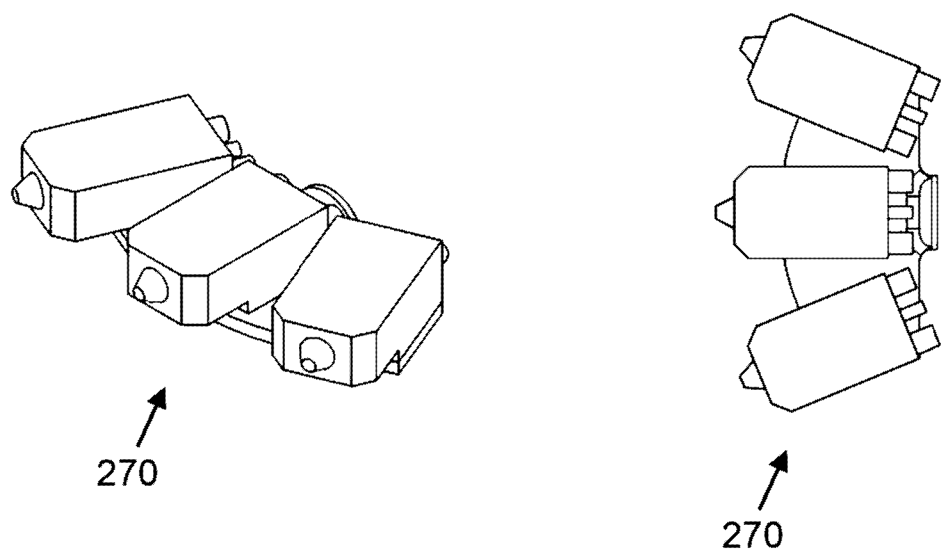
FIG. 42 is an illustration of two views of an embodiment of a multiple spray nozzle module, with three nozzles arranged in a horizontally spaced configuration.

FIG. 42 is an illustration of two views of an embodiment of a multiple spray nozzle module 270, with three nozzles arranged in a horizontally spaced configuration. Angling three spray guns as shown enables the user to cover a very large area in a small amount of time.

Figure 43:
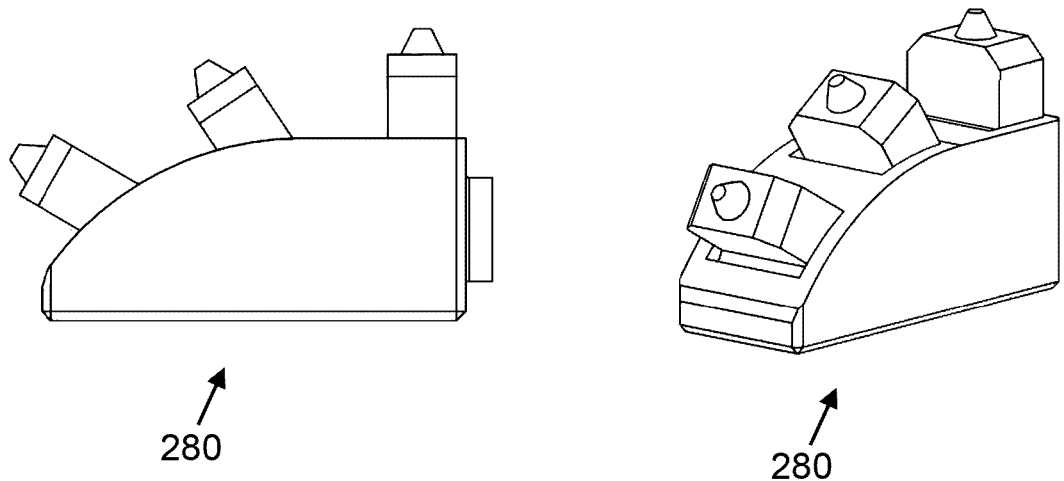
FIG. 43 is an illustration of two views of a further embodiment of a multiple spray nozzle module, with three nozzles arranged in a vertically spaced configuration.

FIG. 43 is an illustration of two views of a further embodiment of a multiple spray nozzle module 280, with three nozzles arranged in a vertically spaced configuration. A variation on the horizontally angled spray gun, this spray gun arrangement has been designed to cover the area in between the joists on the underside of a floor in a single spray. It will be appreciated that although FIGS. 42 and 43 disclose three separate spray guns, more or fewer spray guns may be provided. Furthermore, in some embodiments, a single spray gun may have multiple spray nozzles as necessary.

Figure 44:
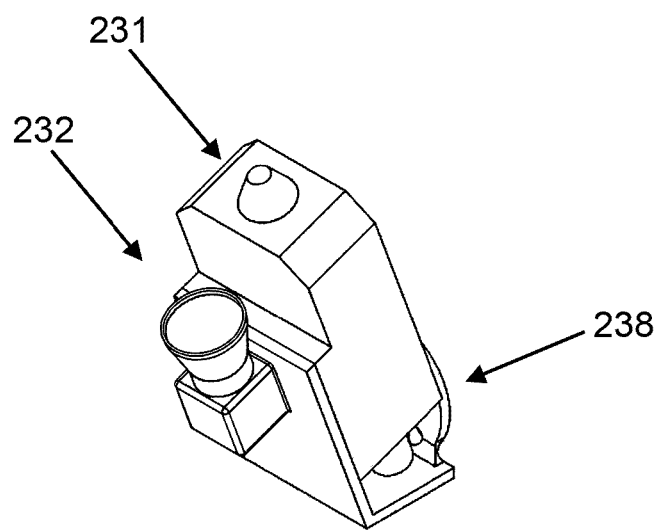
FIG. 44 is an illustration of an embodiment of a spray gun with an inline camera for an electromechanical arm.

FIG. 44 is an illustration of an embodiment of a spray gun with an inline camera for an electromechanical arm. The spray gun 231 and camera 232 are mounted in such a way that the user can easily see where they are spraying. The angle of the spray gun 231 is approximately 70 degrees relative to a mounting plate 238 and typically allows the user to spray the whole area between the floor joists when the spray gun is mounted on a wrist joint or another rotatable member.

Figure 45:
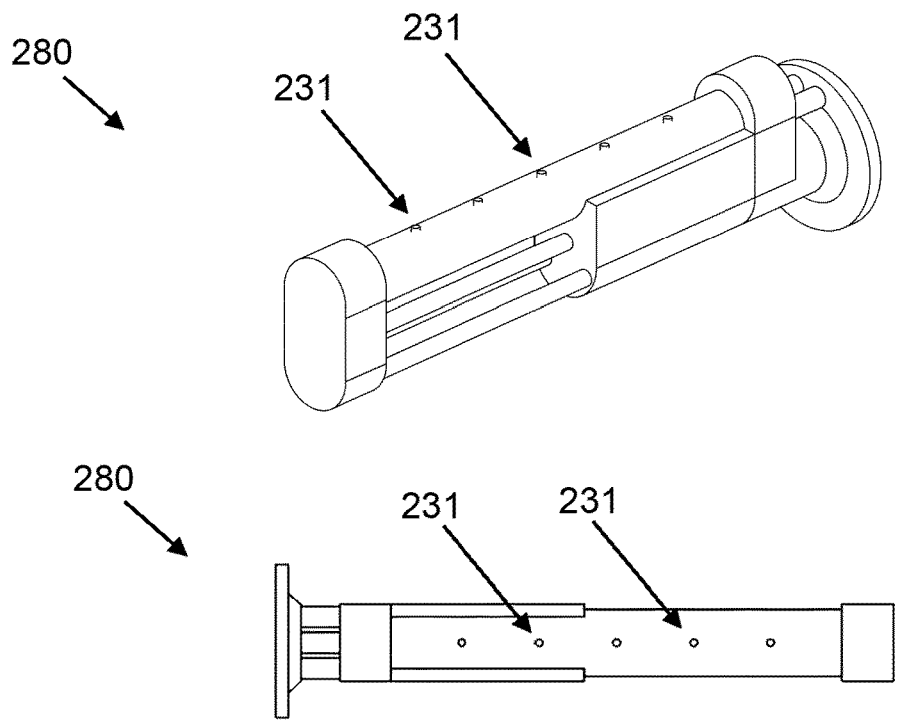
FIG. 45 is an illustration of two views of an embodiment of a sprinkler spray gun for an electromechanical arm.

FIG. 45 is an illustration of two views of an embodiment of a sprinkler spray gun for an electromechanical arm. The sprinkler spray gun 280 comprises a plurality of nozzles 231. In this particular embodiment, the sprinkler spray gun 280 comprises five nozzles 231 arranged in a line and configured to spray treatment in substantially the same direction. Multiple spray nozzles maximise the area that is covered. The barrel of the gun that the nozzles protrude from are mounted to a motor and gearbox (not shown) that allows the barrel to rotate. An encoder on the motor allows for accurate positional feedback on the sprinkler system.

Figure 46:
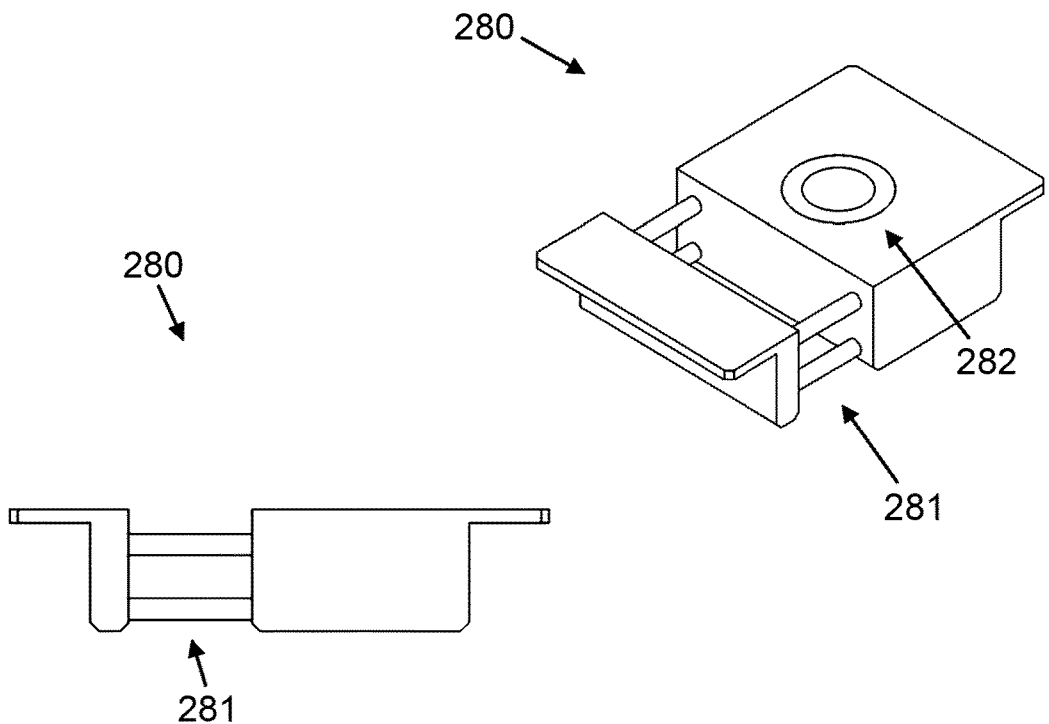
FIG. 46 is an illustration of two views of an embodiment of a floorboard mounting for an electromechanical arm.

FIG. 46 is an illustration of two views of an embodiment of a floorboard mounting device for an electromechanical arm. The floorboard mounting device, referred to as a floor mounting 280 is configured to hold itself securely in between the joist of a floor and uses a spring 281 to push the two parts out into the sides of the joists. The floor mounting 280 expands to fit between the floorboards and hold itself securely between the joists. There is a hole 282 running through the floor mounting 280 configured for mounting of the electromechanical arms. This mounting allows the free rotational movement of the arm, whilst supporting the arm.

Figure 47:
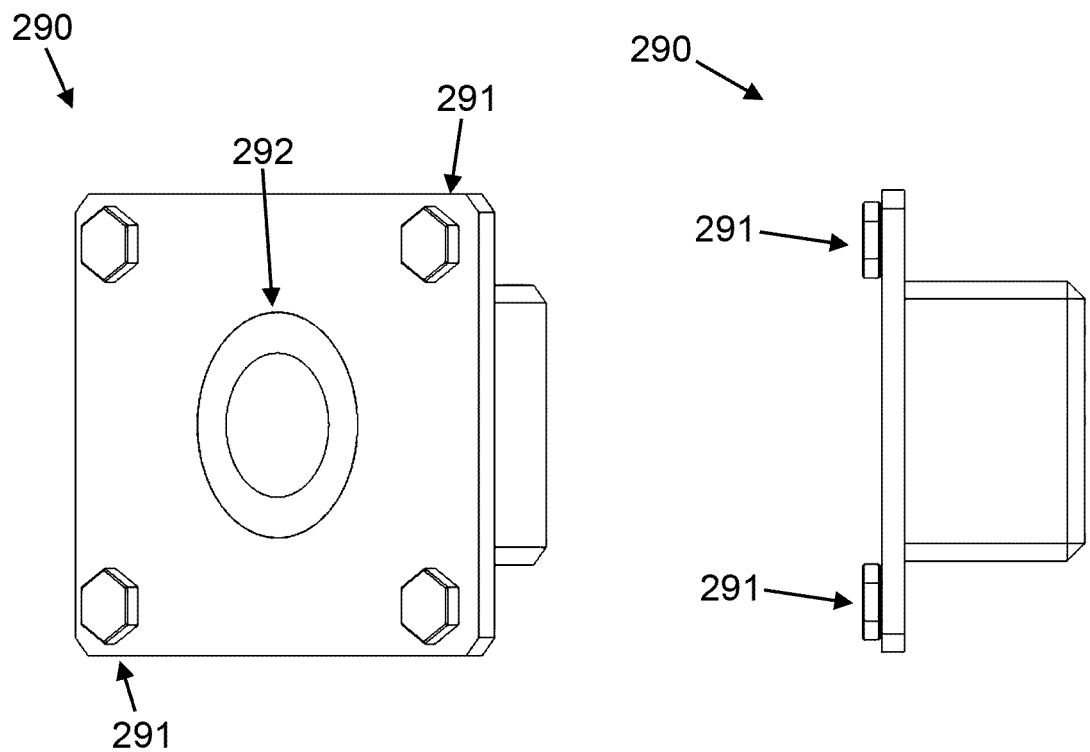
FIG. 47 is an illustration of two views of an embodiment of an air vent mounting for an electromechanical arm.

FIG. 47 is an illustration of two views of an embodiment of an air vent mounting for an electromechanical arm. The wall mounting 290, also referred to as an air vent mounting, is designed to fit into the space left by a double air brick. The mounting will then bolt to the wall using bolts 291 allowing for a secure mounting. As with the floor mounting 280, the wall mounting 290 has defined therein a hole 292 for mounting of the electromechanical arms. The mounting will provide support for the arms allowing them to move in and out of the void, and to allow for the arm to rotate.

Figure 48:
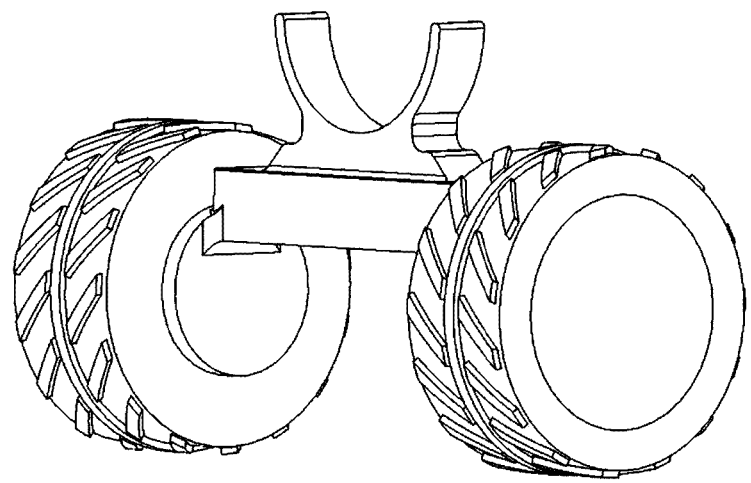
FIG. 48 is an illustration of an embodiment of a wheeled arm-holder for an electromechanical arm.

FIG. 48 is an illustration of an embodiment of a wheeled arm-holder for an electromechanical arm. The wheeled arm-holder is easily attachable to an elongate member of an arm to support the arm during movement and operation within a void.

Figure 49:
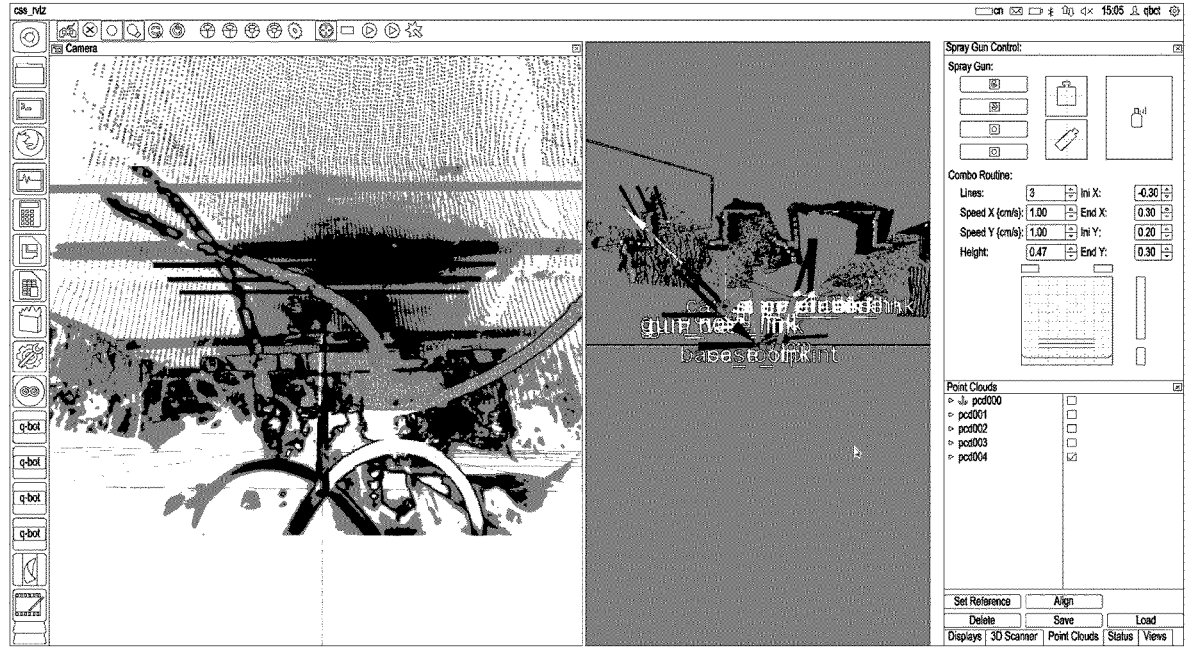
FIGS. 49 to 51 are illustrations of an embodiment of a user interface used by operators of an electromechanical arm as described in the present disclosure, showing the interface for controlling a spray gun mounted on the electromechanical arm.
Figure 50:
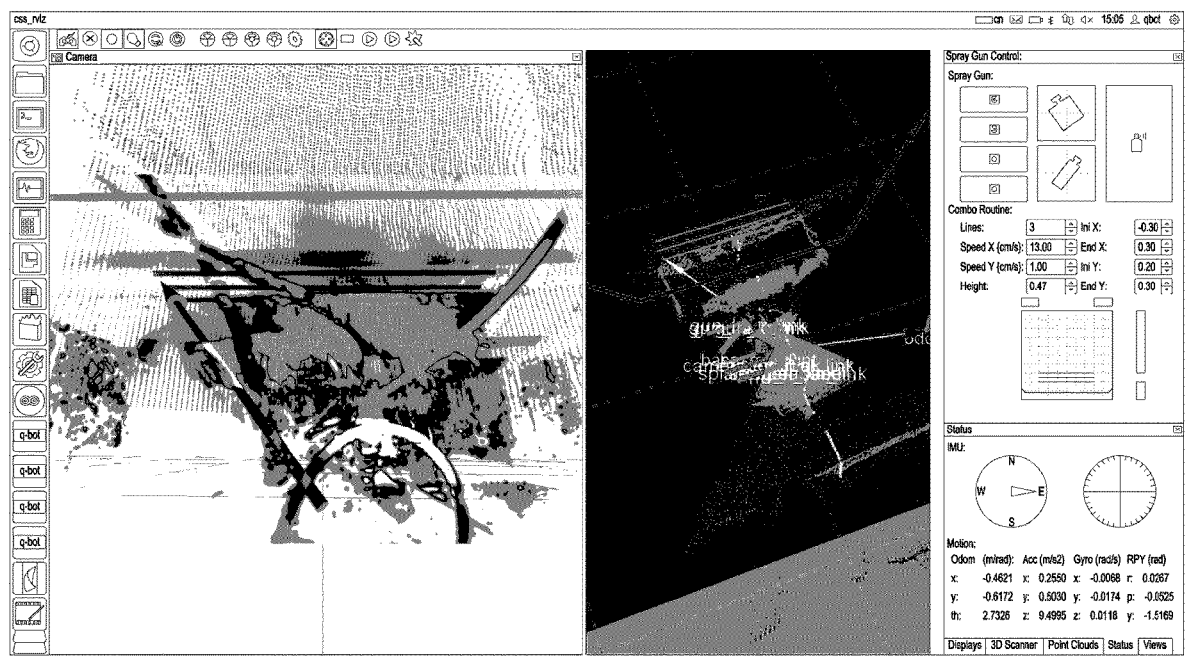
Figure 51:
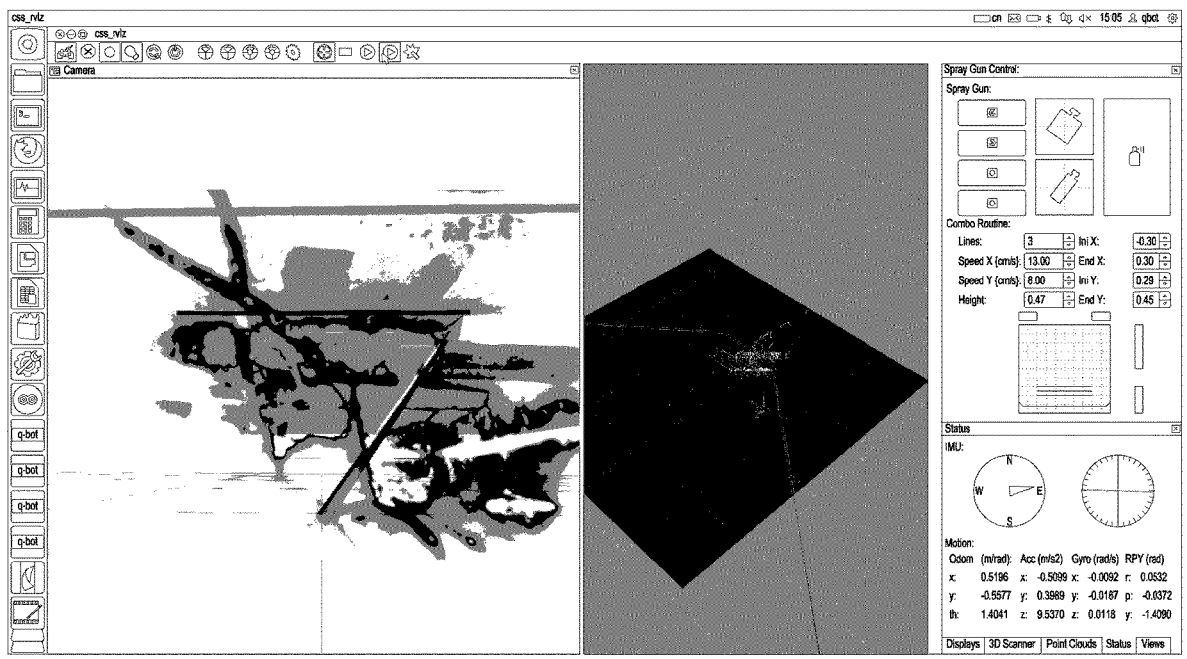

FIGS. 49 to 51 are illustrations of an embodiment of a user interface used by operators of a electromechanical arm as described in the present disclosure, showing the interface for controlling a spray gun mounted on the electromechanical arm.

FIG. 49 shows the video feed from the onboard camera with information from the map and scanning overlaid. The operator is shown where the gun is pointing by an arrow and can directly control the movement, for example with a gamepad controller. The operator can also select the area to spray and the electromechanical arm calculates the movement required to spray that area. In this case the strokes are shown as horizontal lines overlaid on the camera feed on the area to be sprayed. As shown in FIGS. 49 to 51, alongside the processed view from the camera, the user can select different views of the overall positioning of the electromechanical arm and the orientation of the spray gun within the space to be treated.

It will be appreciated that in some embodiments, the electromechanical arm will comprise a position sensor, in the form of a tilt sensor for providing information about the position of the electromechanical arm within the void. In this way, the control interface described in FIGS. 49 to 51 can be provided with position information for the spray gun on the electromechanical arm in order to build up a map of the void, and in particular the position of the electromechanical arm within the void, in addition to the aim direction of the spray gun.

The camera may be visual or thermal. The range finding system may be ultrasonic, a laser scanner (e.g. Hokuyo urg-04lx) or infrared (e.g. Creative Senz3D). The sensor platform may rotate or pan to gain a full 3-D image. If the spray gun is mounted on a motorised one or two axis gun platform allowing the operator to remotely control the application of the material then this may be done directly with a gamepad controller or by the device calculating the required spray pattern to cover the given area.

The control system for application of materials takes information from the range finder, and a nine-degree of freedom motion/tilt sensor to calculate the position of the electromechanical arm relative to the surface being sprayed. This information can then be used to draw on the video feed where the gun is pointing aiding manual spraying by the operator. Or the operator can select an area on the map or video feed and the robotic vehicle automatically calculates the area that needs to be sprayed.

Figure 52:
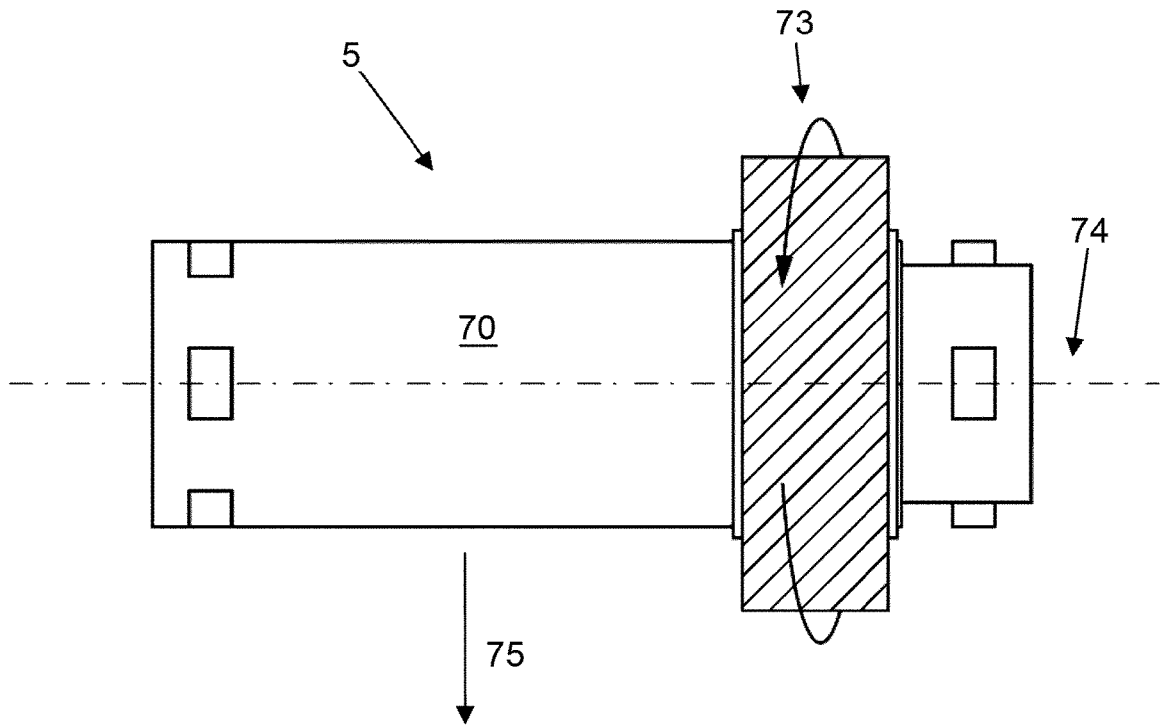
FIG. 52 is an illustration of a lateral drive module for a modular robot according to one embodiment of an aspect of the present invention.

FIG. 52 is an illustration of a lateral drive module for a modular robot according to one embodiment of an aspect of the present invention. The lateral drive module 5 comprises a chassis component 70 and a drive wheel 73 provided on an outside of the chassis component 70. The drive wheel 73 is arranged to rotate about a longitudinal axis 74 of the chassis component 70 to create perpendicular motion to drive at least the lateral drive module laterally. In some situations, the drive wheel 73 may be an omni wheel which allows free movement in the direction of the longitudinal axis 74 of the chassis component, but provides traction laterally.

The term "laterally" as used in the present disclosure takes its normal meaning as being in a direction which is transverse, in particular perpendicular, to a longitudinal direction.

Figure 53:
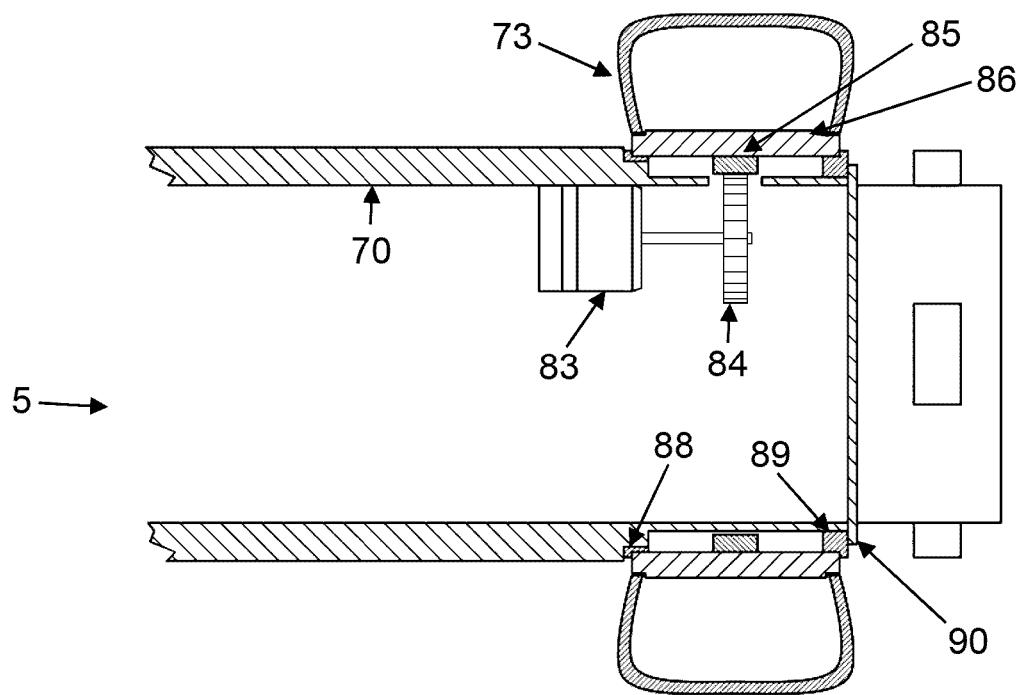
FIG. 53 is an illustration of the internal mechanism for the lateral drive module of FIG. 52.

FIG. 53 is an illustration of the internal mechanism for the lateral drive module of FIG. 52 showing a section through the lateral drive module 5. A motor 83 is fixed within the chassis component 70 of the lateral drive module 5. The motor 83 is configured to drive a pinion gear 84, driving an outer ring 85 attached to the wheel hub 86. Bushes or bearings 88, 89 are provided between the chassis component 70 and the wheel hub 86 to allow the drive wheel 73 to rotate relative to the chassis component 70. The bushes or bearings 88, 89 are held in place by a retaining ring (90).

Figure 54:
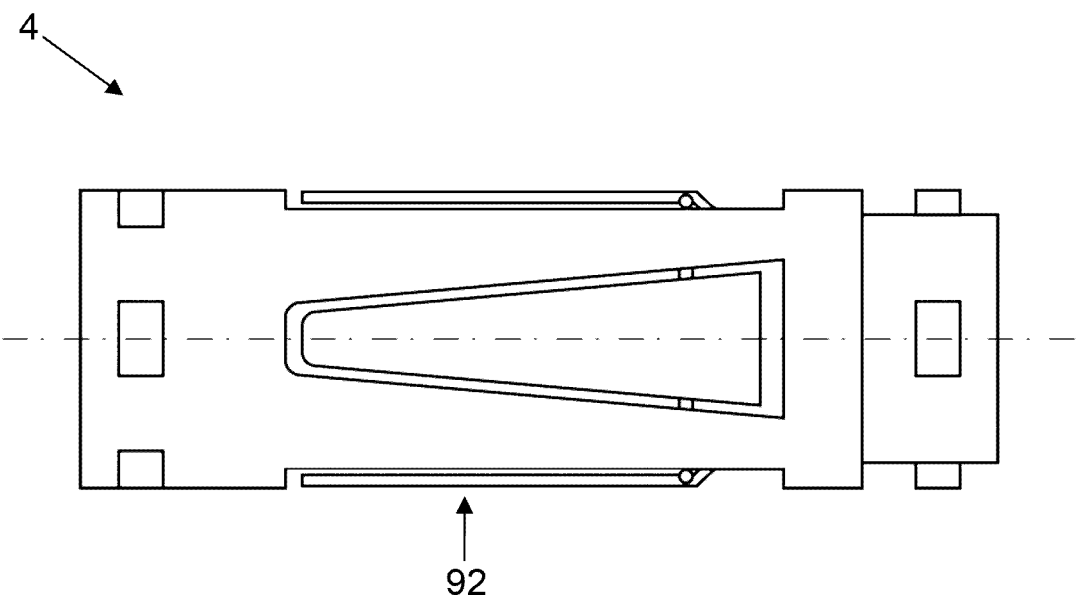
FIG. 54 is an illustration of a movable component in a second mode for a modular robot according to one embodiment of an aspect of the present invention.

FIG. 54 is an illustration of a movable component according to one embodiment of an aspect of the present invention. The movable component is an anchor module 4 comprising four retracted grippers 92 configured to bend out from a surface of the anchor module 4. The anchor module 4 is shown in a flat configuration, where each of the grippers 92 are pressed flat against the surface of the anchor module 4. This configuration allows the anchor module 4 to move through the environment surrounding the remotely controlled arm without causing an obstruction. As will be described more completely with reference to FIG. 55, the grippers can hold the module in position when they are deployed in a bent out configuration.

Figure 55:
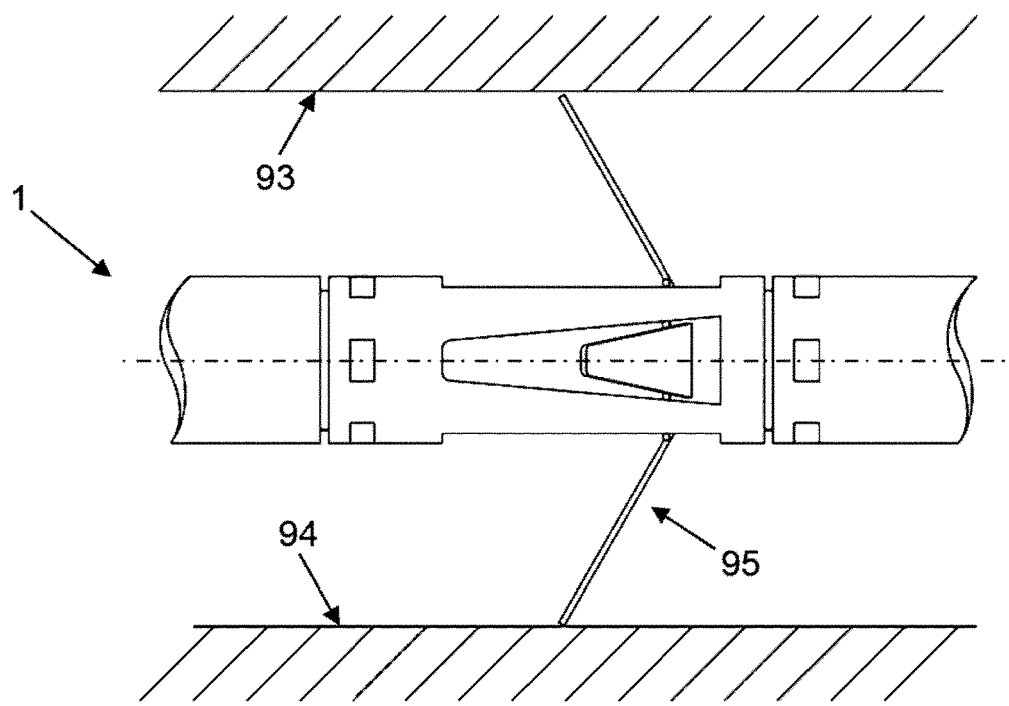
FIG. 55 is an illustration of the movable component of FIG. 54 in a first mode.

FIG. 55 is an illustration of the movable component of FIG. 54 in a first mode. When the remotely controlled arm 1 is operating in an environment between a first surface 93 and a second surface 94, the deployed grippers 95 can be deployed to hold the anchor module 4 in position. The two surfaces may be side walls, the wall of a pipe or the floor and ceiling of a void. Alternatively, as with a conventional anchor, the grippers may simply dig into the ground.

Figure 56:
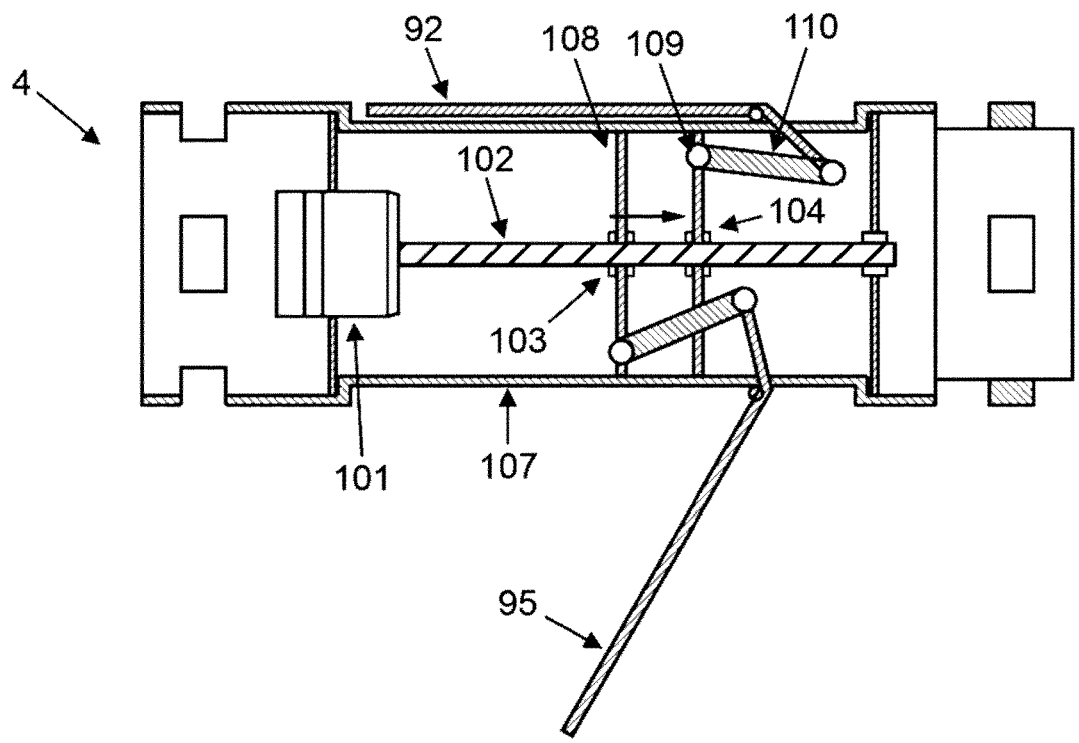
FIG. 56 is an illustration of the internal mechanism for the movable component of FIG. 54 and FIG. 55.

FIG. 56 is an illustration of the internal mechanism for the movable component of FIG. 54 and FIG. 55, showing a section through the anchor module 4. A retracted gripper 92 is shown in a first position of the mechanism, and a deployed gripper 95 is shown in a second position of the mechanism. A motor 101 is provided within the anchor module 4. The motor 101 drives a lead screw 102. In the first position of the mechanism, the lead screw engages with nut 104 which is rotationally immobilised so as to move axially down the lead screw 102 towards the motor 101. The movement of the screw is transferred to linkage 110 through pin 109, and causes retracted gripper 92 to begin to move from the retracted position to the deployed position. As can be seen from deployed gripper 95, the nut 103, which is the same component as nut 104, is now in a position closer to the motor 104, resulting in the deployed position of the deployed gripper 95.

Figure 57:
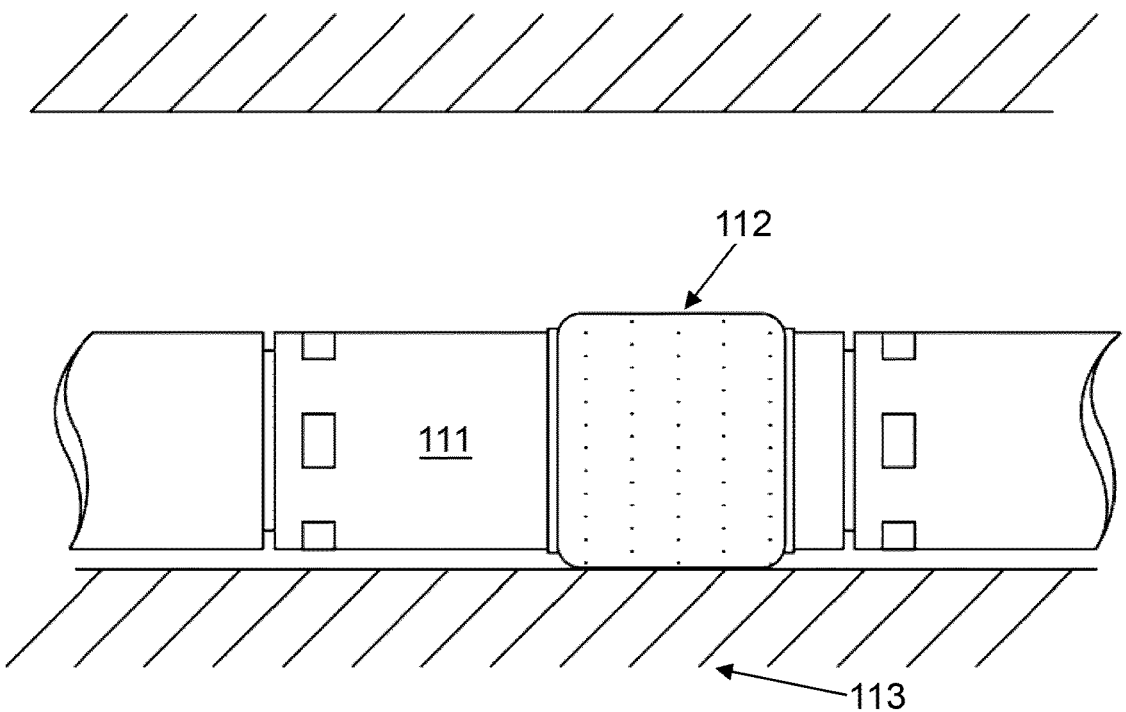
FIG. 57 is an illustration of a movable component for a modular robot according to one embodiment of an aspect of the present invention where the movable component is an inflatable ring.

FIG. 57 is an illustration of a section through a movable component for a modular robot according to one embodiment of an aspect of the present invention where the movable component is an inflatable ring. The anchor module 111 comprises an inflatable ring 112 provided around an outside of a portion of the anchor module. The inflatable ring 112 is formed from a flexible material which must also be robust enough to withstand contact with obstructions in a lower surface 113. In a deflated position, the inflatable ring 112 rests on the lower surface and will not prevent movement of the anchor module in a lateral direction.

Figure 58:
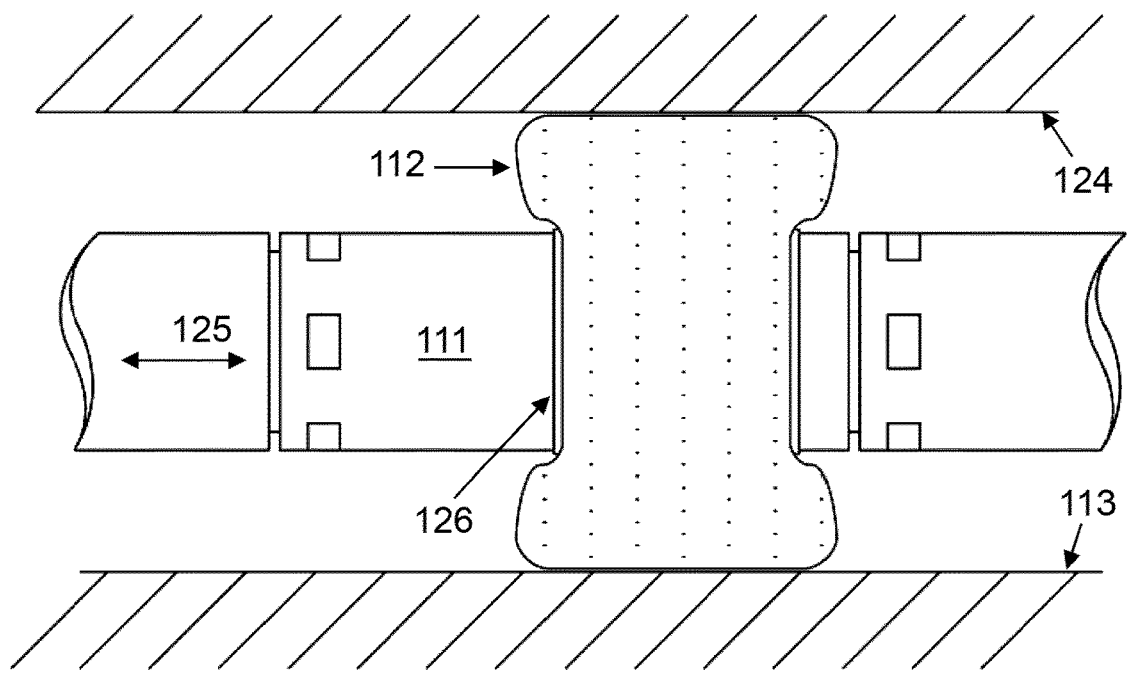
FIG. 58 is an illustration of the movable component of FIG. 57 with the inflatable ring inflated.

FIG. 58 is an illustration of the movable component of FIG. 57 with the inflatable ring 112 inflated. The inflatable ring 112 is now in contact with both the lower surface 113 and the upper surface 124. The contact between the inflatable ring 112 and the lower surface 113 and the inflatable ring 112 and the upper surface 124 acts as an anchor to hold the remotely controlled arm in place to prevent movement whilst other modules in the modular robot may be carrying out other operations. In this particular embodiment, the anchor module 111 also comprises a bush 126 provided between the anchor module 111 and the inflatable ring 112 and configured to provide a low friction sliding joint to allow the remotely controlled arm to slide through the centre of the inflatable ring in the axial direction 125. This will typically reduce the friction compared with dragging the remotely controlled arm over the ground. It may also protect sensitive components on some modules of the arm from potential damage by being dragged over the ground.

Figure 59:
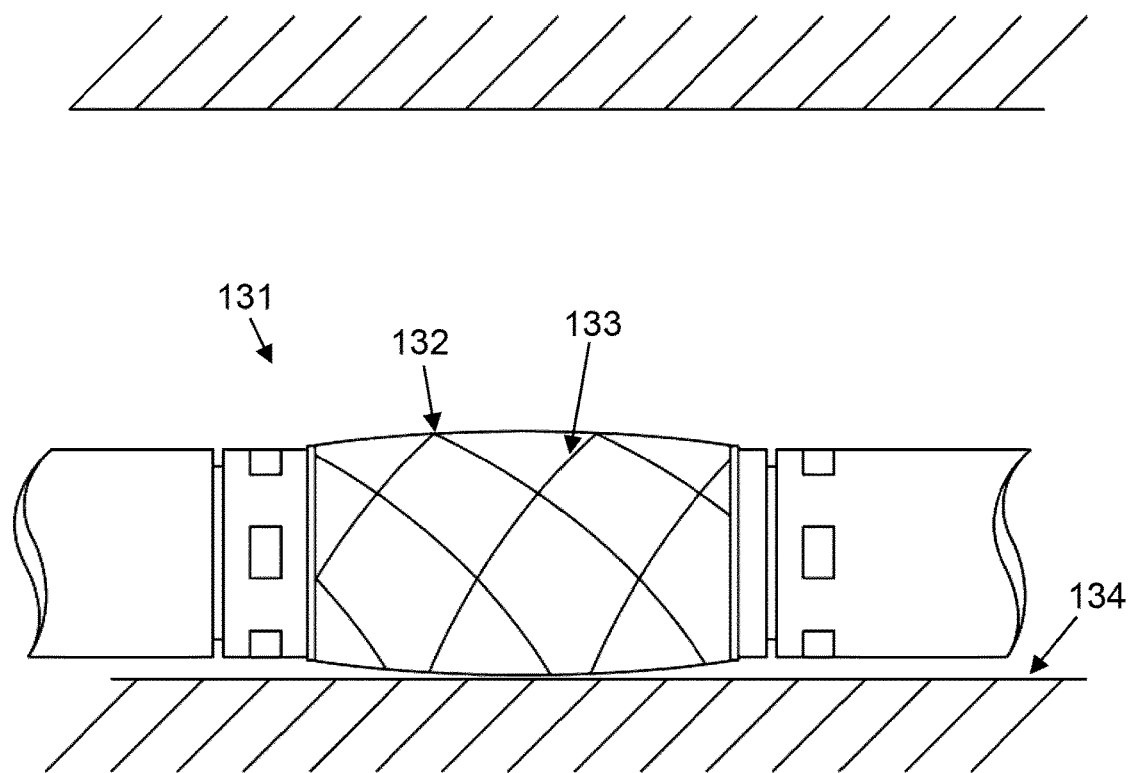
FIG. 59 is an illustration of a movable component for a modular robot according to one embodiment of an aspect of the present invention where the movable component is a semi-rigid inflatable ring.

FIG. 59 is an illustration of a movable component for a modular robot according to one embodiment of an aspect of the present invention where the movable component is a semi-rigid inflatable ring. The anchor module 131 comprises a semi-rigid ring 132 formed from a flexible material and a wire mesh 133. In the configuration shown, the semi-rigid ring 132 is shown deflated and resting on the lower surface 134. In some embodiments, the flexible material may be the same material as used in the inflatable ring described in relation to FIG. 57 and FIG. 58.

Figure 60:
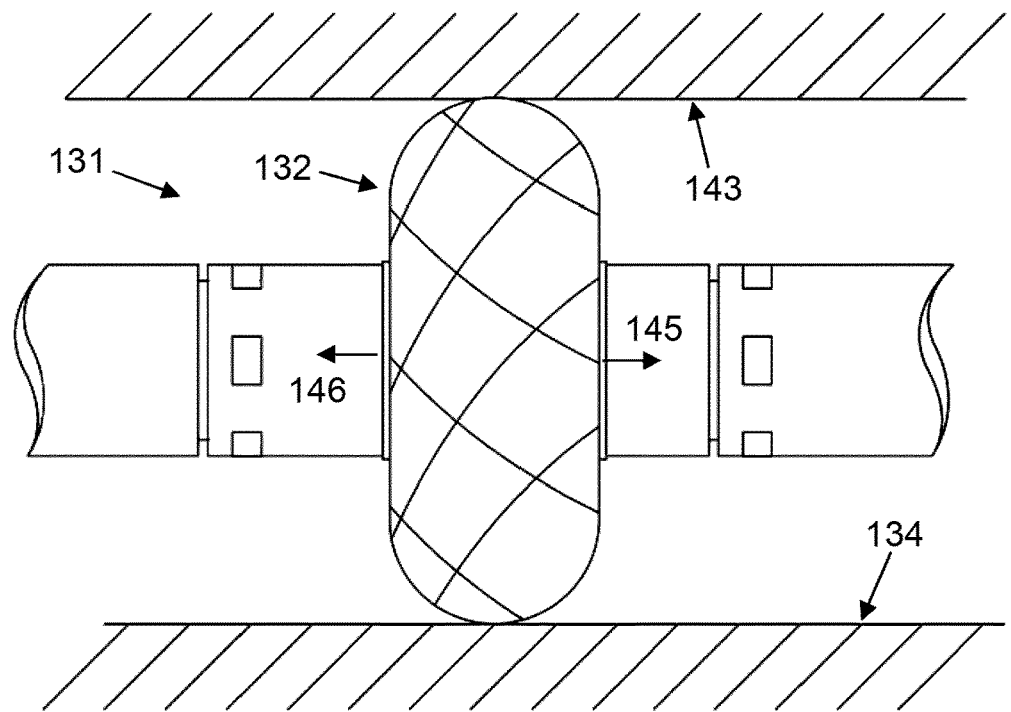
FIG. 60 is an illustration of the movable component of FIG. 59 with the semi-rigid inflatable ring inflated.

FIG. 60 is an illustration of the movable component of FIG. 59 with the semi-rigid inflatable ring inflated. The anchor module 131 is provided with the semi-rigid ring 132 provided in an inflated position. When inflated, the semi-rigid ring 131 holds the anchor module between the lower surface 134 and the upper surface 143. In the configuration of FIG. 60, the semi-rigid ring is shown having a maximum diameter. In alternative configurations, the diameter of the ring may be reduced by moving the sides of the ring 132 out along direction 145 and direction 146, thereby increasing the distance between two sides of the ring 132.

Similarly, it will be understood that a longer anchor module combined with a longer semi-rigid ring will result in the anchor module being able to be anchored between two surfaces spaced a further distance apart.

Figure 61:
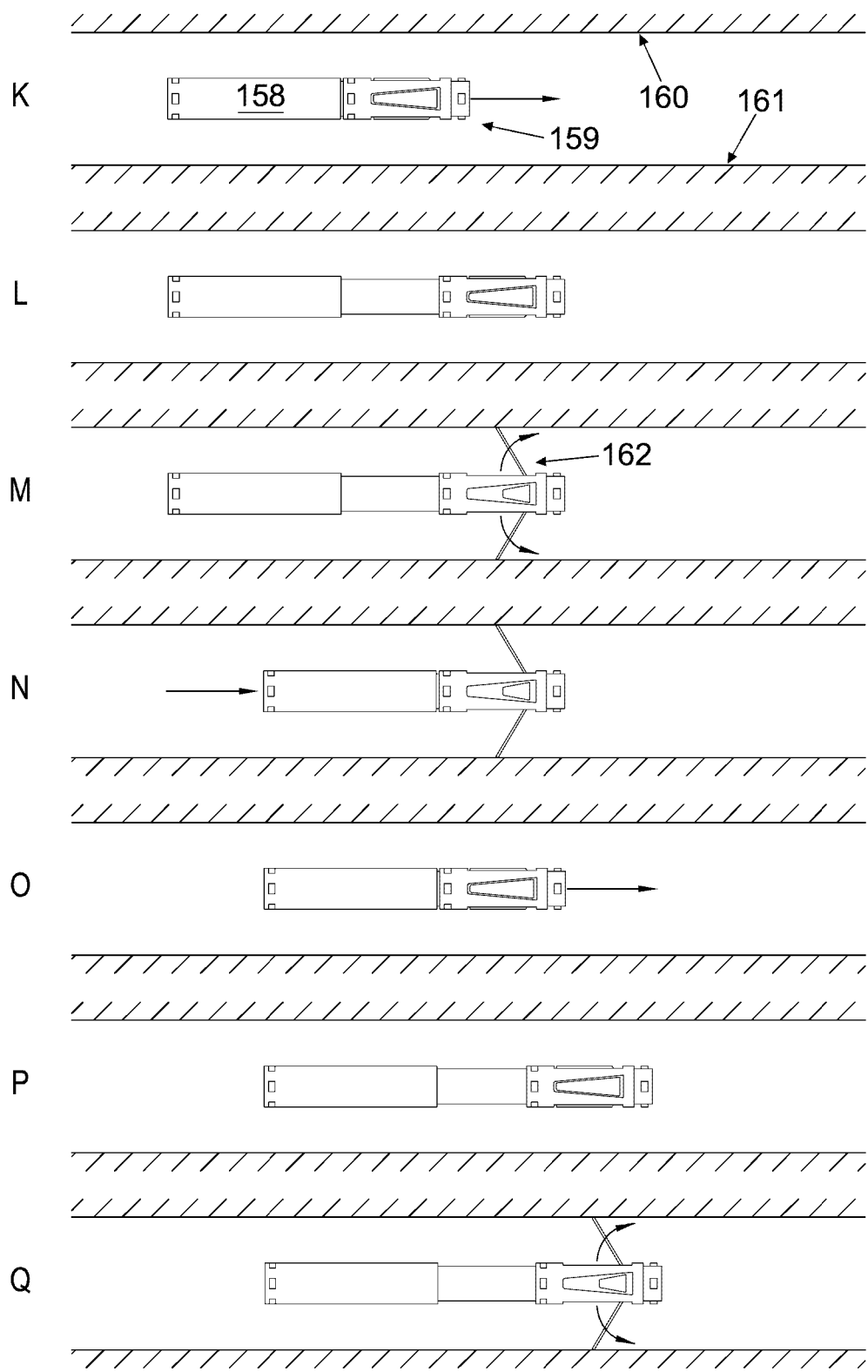
FIG. 61 is an illustration of the operation of the combination of a movable component and an extendable chassis for a modular robot according to one embodiment of an aspect of the present invention.

FIG. 61 is an illustration of the operation of the combination of a movable component and an extendable chassis for a modular robot according to one embodiment of an aspect of the present invention. An extendable chassis module 158 is connected to an anchor module 159, provided in a void between an upper surface 160 and a lower surface 170. By controlling the operation of the anchor module and the extendable chasses module, a forward propulsion of the remotely controlled arm may be achieved. When the anchor module is not in contact with the upper surface 160 or the lower surface 161, the assembly may be held in place between the upper surface 160 and the lower surface 161 by connection with further modules which support the assembly.

In a first step K, the extendable chassis module 158 is provided in a retracted configuration and the anchor module 159 is provided in a retracted configuration. In a second step L, the extendable chassis module 158 extends, such that both the extendable section of the extendable chassis module 158 and the anchor module 159 move into the void between the upper surface 160 and the lower surface 161. In step M, the grippers 162 of the anchor module 159 deploy and engage with the upper surface 160 and the lower surface 161, holding the anchor module in place. In a next step N, the extendable chassis module 158 retracts moving a back of the assembly along the void. To get to step O, the grippers 162 have been retracted and are held flat against a surface of the anchor module 159. Step O is substantially the same as step K, but with the remotely controlled arm moved along the void by a distance equal to the extension length of the extendable chassis module 158. In this way, step P and step Q correspond to step L and step M respectively, but offset by the distance of the extension length of the extendable chassis module 158.

It will be appreciated that other designs of anchor module may be used instead of the anchor module 159 used in this particular embodiment. In some embodiments, the inflatable ring or the semi-rigid ring may be used to engage with the upper surface 160 and the lower surface 161 of the void.

Figure 62:
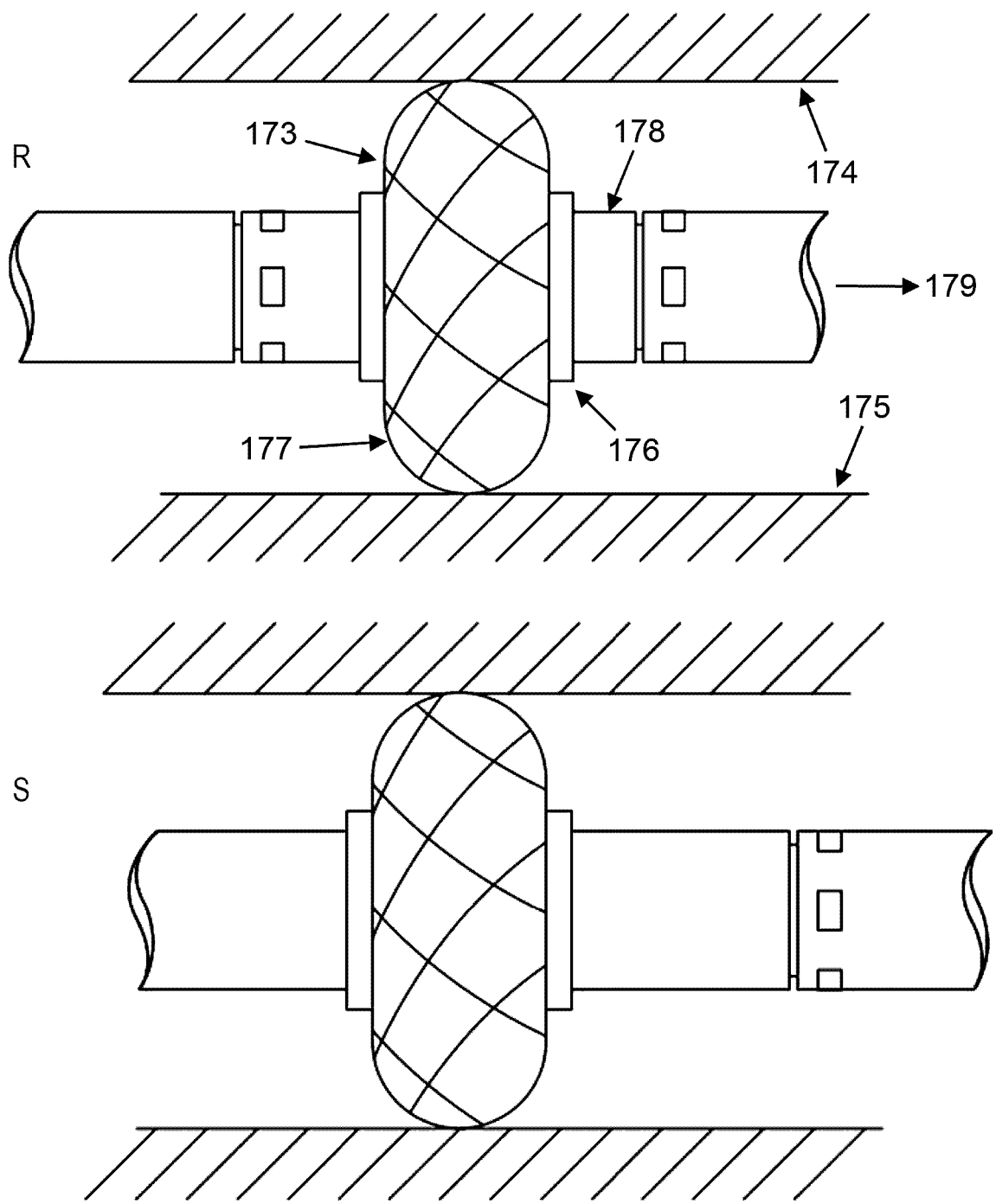
FIG. 62 is an illustration of a movable component for a modular robot according to one embodiment of an aspect of the present invention.

FIG. 62 is an illustration of a movable component for a modular robot according to one embodiment of an aspect of the present invention shown in a first position R and a second position S. In the first position R, an anchor module 173 is deployed, holding the remotely controlled arm between an upper surface 174 and a lower surface 175. A bush 176 is provided between the semi-rigid ring 177 and the chassis component 178. The bush 176 allows the semi-rigid ring 177 to slide along the chassis component 178, and even over the connections between modules. In the second position S, the semi-rigid ring 177 is shown with the remotely controlled arm having slid through the semi-rigid ring 177, whilst holding the remotely controlled arm away from both the lower surface 175 and the upper surface 174.

Figure 63:
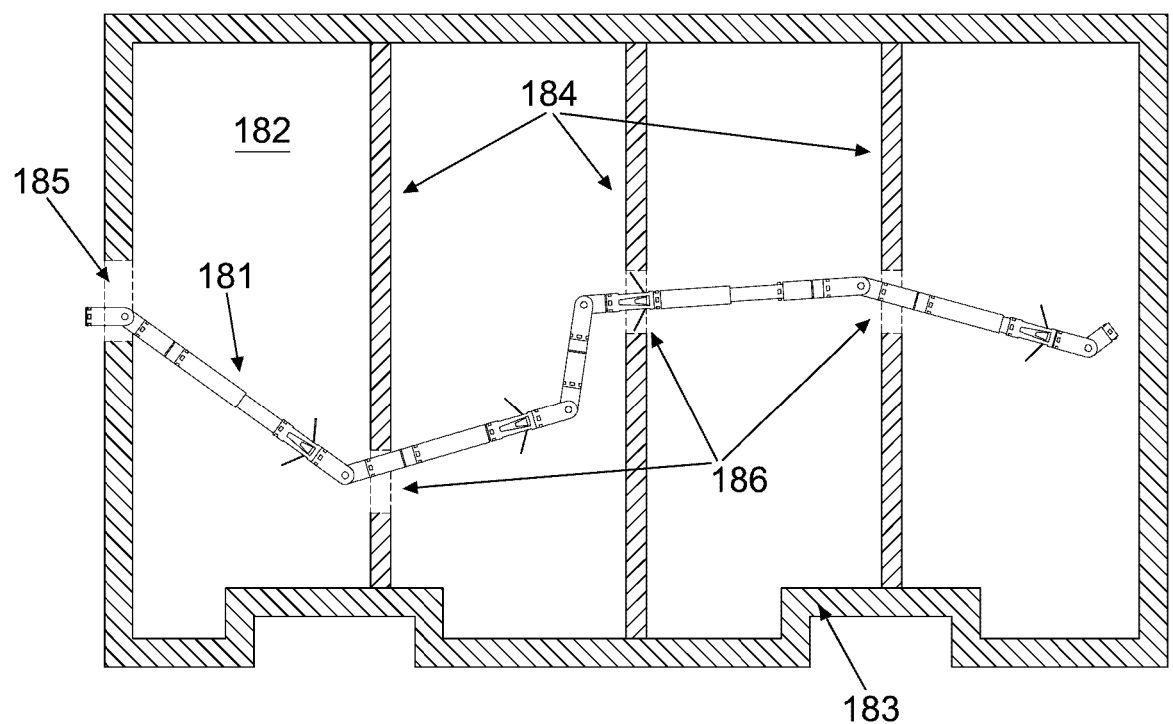
FIG. 63 is an illustration of a modular robot operating in an under floor void according to one embodiment of an aspect of the present invention.

FIG. 63 is an illustration of a modular robot operating in an under floor void according to one embodiment of an aspect of the present invention. A remotely controlled arm 181 comprises multiple modules and is operating in an underfloor void 182. The void is formed by spaces between exterior walls 183 and internal sleeper walls 184. Access to a first part of the underfloor void 182 has been gained through an air vent 185. Access to a series of further parts of the underfloor void 182 has been gained through gaps 186 in the sleeper walls 184. The modules making up the remotely controlled arm 181 include anchor modules, extendable chassis modules and elbow joint modules, enabling the remotely controlled arm 181 to manoeuvre within the underfloor void 182.

Figure 64:
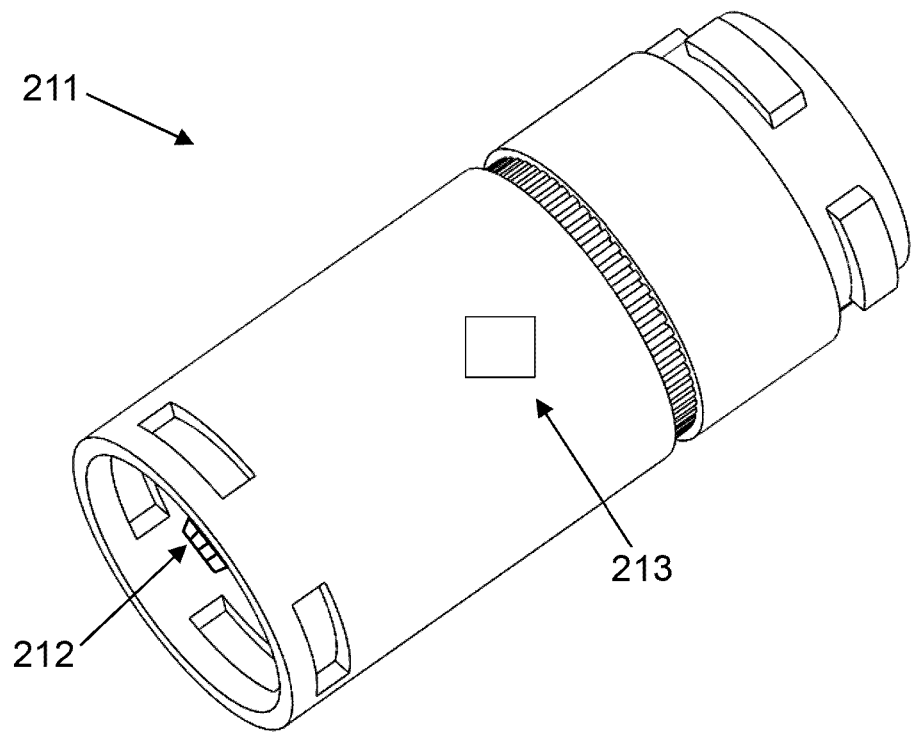
FIG. 64 is an illustration of a modular robot according to an embodiment of an aspect of the present invention, showing the electrical connectivity between modules.

FIG. 64 is an illustration of a modular robot according to an embodiment of an aspect of the present invention, showing the electrical connectivity between modules. A module 211 has an electrical connector 212 to transmit power and communication signals from one module to the next. A microcontroller 213 interprets signals from the control system to actuate different functionality in the module 211. Depending on the particular module, this functionality may be, for example, rotating a joint or deploying an anchor. In this particular embodiment, the module 211 is a rotatable module. The module 211 has a unique identifier that is sent back to the control system to identify the module 211 along with data about a current status of the module. For example, the status information may include position, rotation, deployment, etc. This allows a virtual representation of the remotely controlled arm to be built at the control system, even when the operator cannot see the arm.

Although the description for the connectivity was directed towards the module shown in FIG. 64, it will be appreciated that substantially the same principle may be applied to other modules. Furthermore, although the specific electrical connector 212 was described in relation to FIG. 64, it will be appreciated that other designs of connector are possible. In some embodiments, the connector may be incorporated into the quick release connector. In further embodiments, the connection may be a wireless connection, for example infrared or Bluetooth. In some embodiments, power and communication signals are transmitted over different routes. For example, in one embodiment power is transmitted using a physical electrical connection between modules, but communication signals, including command signals, is transmitted wirelessly between modules.

Figure 65:
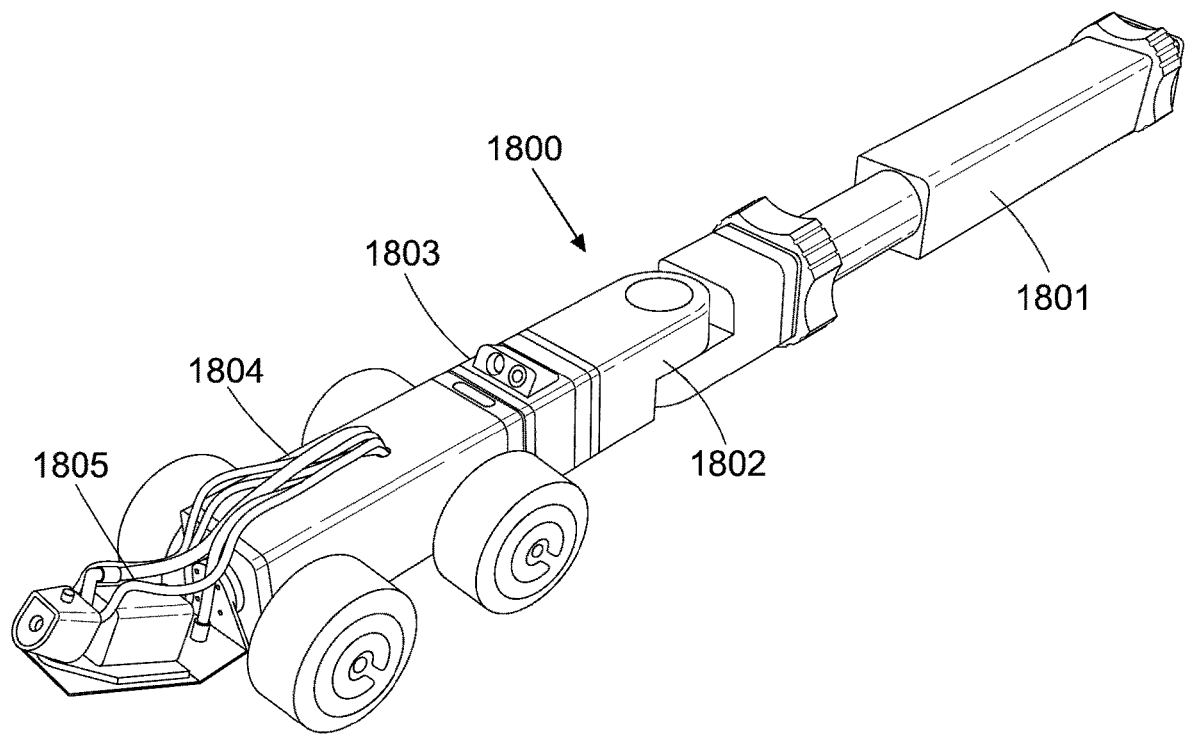
FIG. 65 is an illustration of a modular robot according to an embodiment of an aspect of the present invention.
Figure 66:
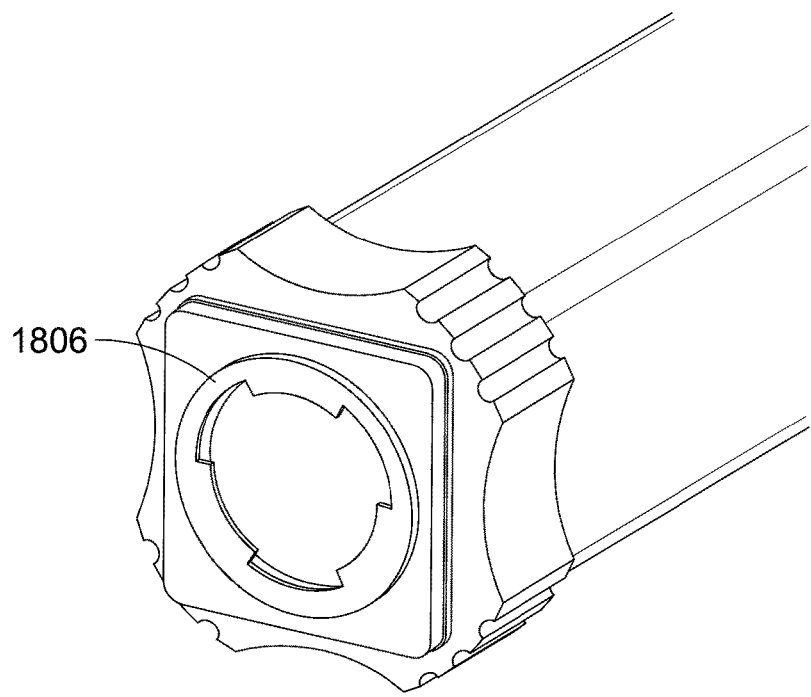
FIG. 66 shows a female connector of the modular robot of FIG. 65.
Figure 67:
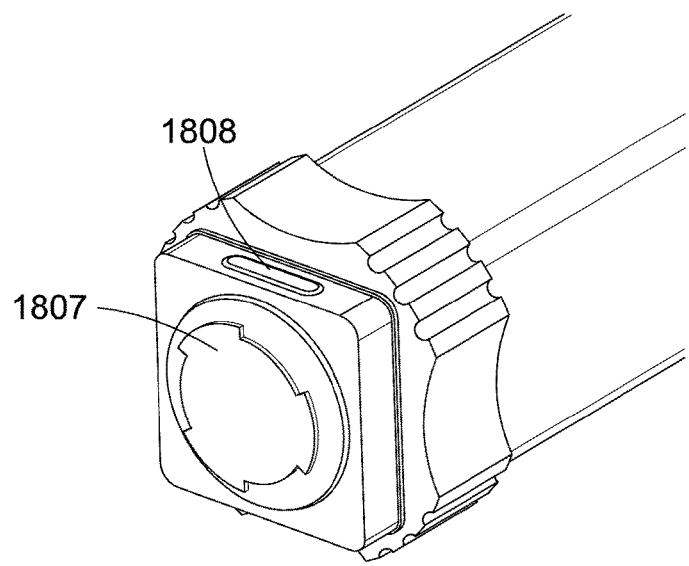
FIG. 67 shows a male connector of the modular robot of FIG. 65.

FIG. 65 is an illustration of a modular robot 1800 according to an embodiment of an aspect of the present invention. The configuration and operation of the modular robot 1800 of FIG. 65 is similar to that of the modular robot of FIG. 1. According to this embodiment, the modular robot 1800 comprises a telescopic module 1801, an elbow module 1802, a camera module 1803, a chassis module 1804 and spray gun module 1805. The particular combination of module 1801-1805 shown in FIG. 65 is merely representative of a possible combination of the modules. The modules 1801-1805 are interconnected by means of respective female connectors 1806 and male connectors 1807 to provide the modular robot shown in FIG. 65. FIG. 66 shows a female connector 1806 of the modular robot of FIG. 65 and FIG. 67 shows a male connector 1807 of the modular robot of FIG. 65. The male and female connectors 1806, 1807 interlock by insertion of the male connector 1807 into the female connector and a quarter turn. The male and female connectors then lock together and can be a released by pressing a button 1808 on the male connector 1807 and rotating the connectors relative to each other. The connectors 1806, 1807 connects the respective modules together both mechanically and electrically.

Figure 68:
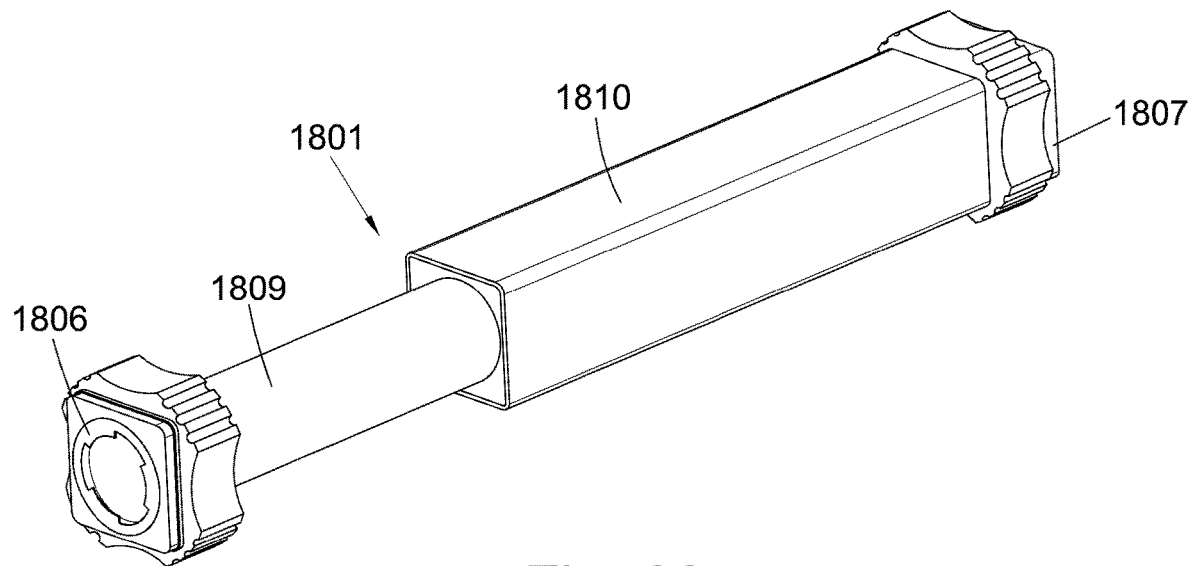
FIG. 68 shows a telescopic module of the modular robot of FIG. 65.

FIG. 68 shows a telescopic module 1801 of the modular robot of FIG. 65. The telescopic module 1801 comprises a first part 1809 received telescopically within a second part 1810. Extension of the telescopic module 1801 is effected by an electric motor within the first (or second) part which telescopes the first part 1809 out of the second part 1810 to extend the telescopic module 1801. The first part 1809 is engaged with the second part 1810 to prevent relative rotation therebetween about the longitudinal axis of the telescopic module 1801.

Figure 69:
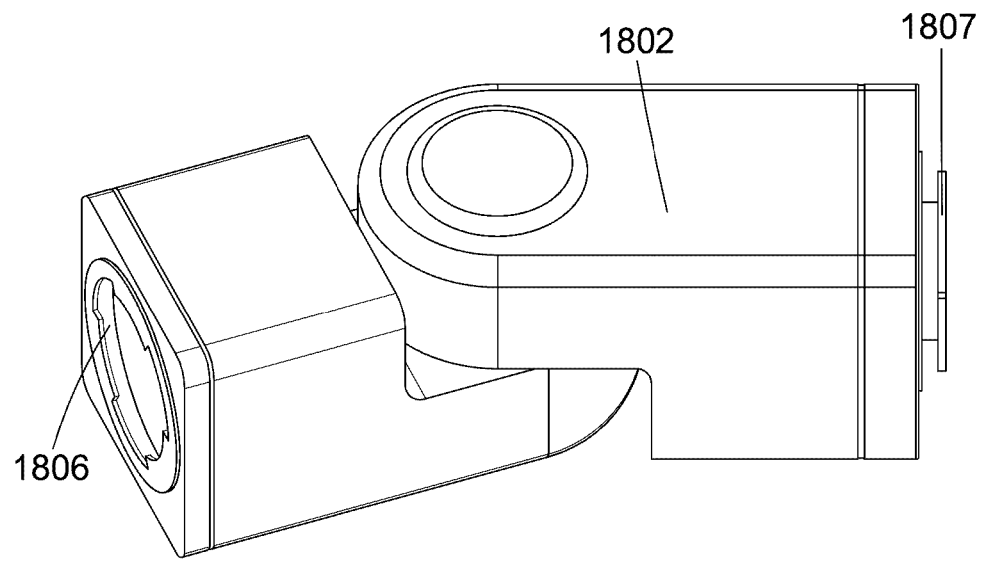
FIG. 69 shows an elbow module of the modular robot of FIG. 65.
Figure 70:
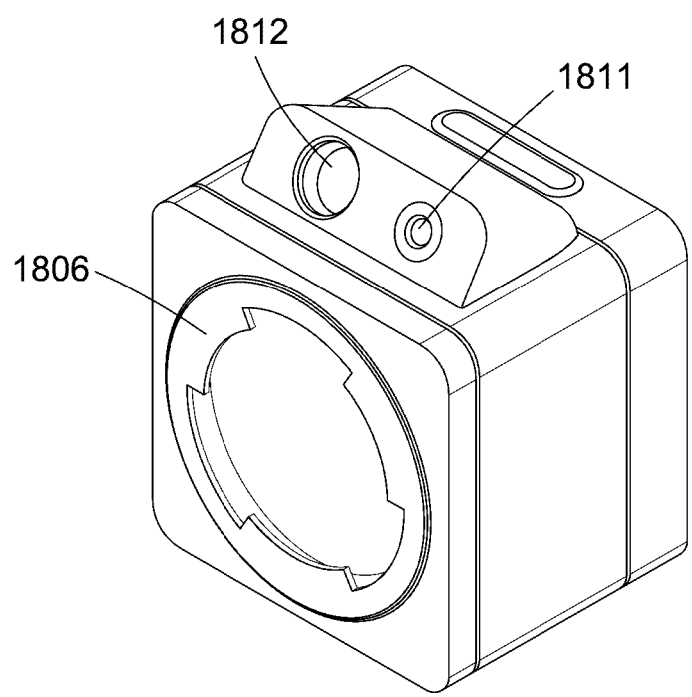
FIG. 70 shows a camera module of the modular robot of FIG. 65.

FIG. 69 shows an elbow module 1802 of the modular robot of FIG. 65. The elbow module 1802 provides a motorised joint utilising a worm gearbox connected to a stepper motor and encoder to provide accurate movement and precision feedback to the operator FIG. 70 shows a camera module 1803 of the modular robot of FIG. 65. The camera module 1803 is provided with a camera 1811 and an LED light source 1812 for illuminating the field of view of the camera 1811.

Figure 71:
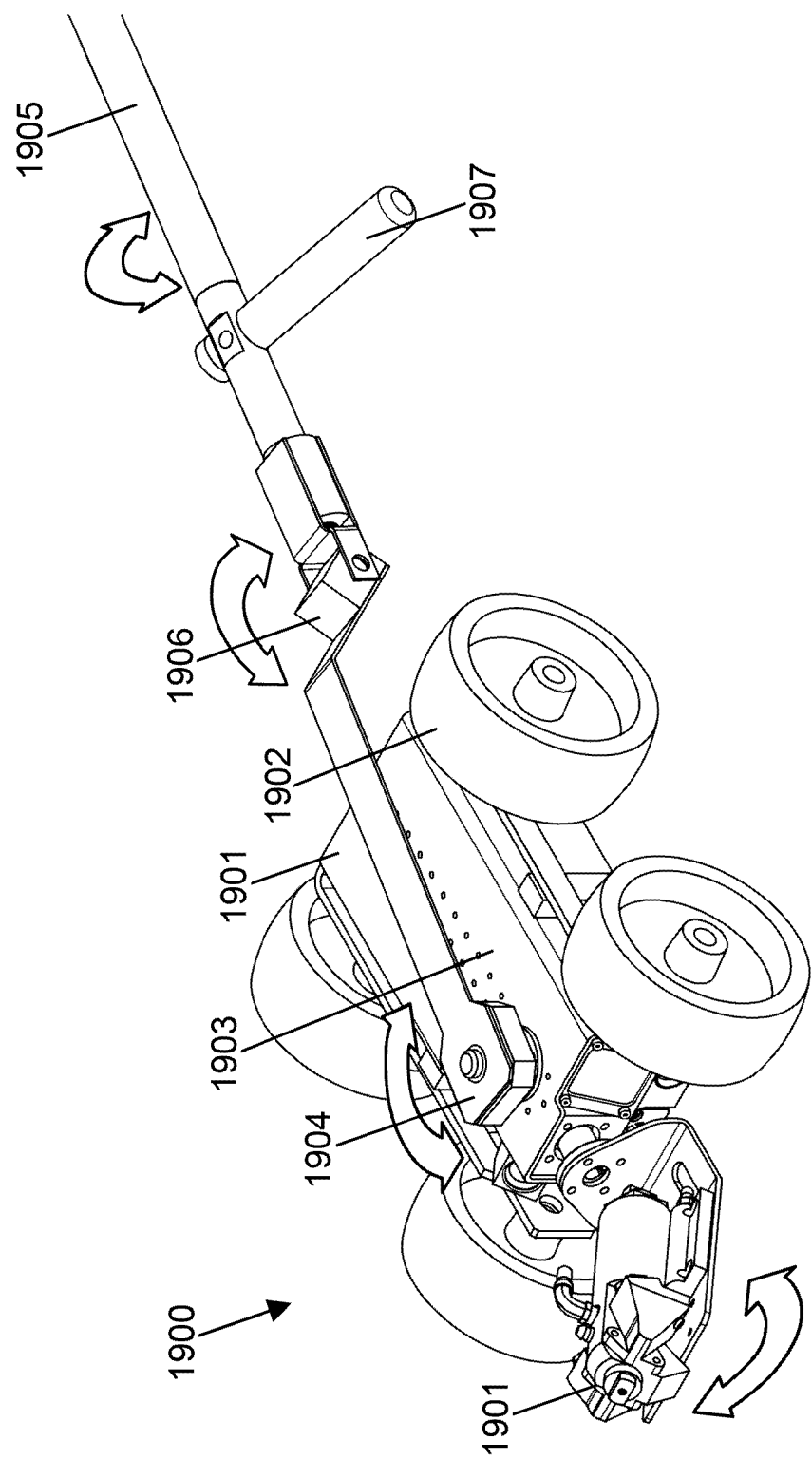
FIG. 71 illustrates a spray device according to an embodiment of an aspect of the present invention.

FIG. 71 illustrates a spray device according to an embodiment of an aspect of the present invention. In this embodiment, the spray device 1900 comprises a chassis 1901 provided with four freely-rotatable wheels 1902. Holes 1903 are provided on the upper surface of the chassis 1901 for connection to a mounting connector 1904 of a control handle 1905. The mounting connector 1904 is connected to the control handle 1905 via a pivot joint 1906. A spray nozzle 1907 is mounted at the front of the chassis 1901 and is motorised to provide a required spray pattern. As indicated by the large arrows in FIG. 71, the chassis 1901 is able to pivot relative to the mounting connector 1904 about a substantially vertical axis. Similarly, the control handle 1905 is able to pivot relative to the mounting connector 1904 about a substantially horizontal axis by virtue of the pivot joint 1906. A fulcrum 1907 is provided on the control handle 1905. Rotation of the control handle 1905 about its axis changes the angular position of the fulcrum 1907.

As shown in FIGS. 72A to 72C, the distribution of the holes 1903 along the length of the chassis 1901 allow the mounting connector 1904 to be mounted to the chassis 1901 in a range of positions to aid in driving the spray device across different terrain. The mounting connector 1904 can be fitted to the chassis 1901 at the front (FIG. 72A) so that the driving force from the control handle 1905 is in front of the centre of mass of the chassis. This configuration simplifies the control required from the operator when driving the spray device on terrain that would otherwise cause the vehicle direction to drift when driven from the rear. Other intermediate mounting positions along the length of the chassis are also possible including mounting the pivot at the centre of mass for a terrain-led control scheme (FIG. 72B) or at the rear of the chassis 1901 (FIG. 72C).

In a variation of the embodiment of FIG. 71, a second mounting connector may be attached to the chassis 1901 at a position spaced from the first mounting connector 1904, for example in a direction transverse to the front-to-back direction of the chassis 1901. The second mounting connector 1904 connects to a second control handle 1905. In this way, the position of the spray device 1900 can be controlled by independently varying the force and direction of the two control handles. The control handles can be lengthened via a telescopic mechanism (not shown) or by adding additional modular lengths to the handle(s).

Figure 73A:
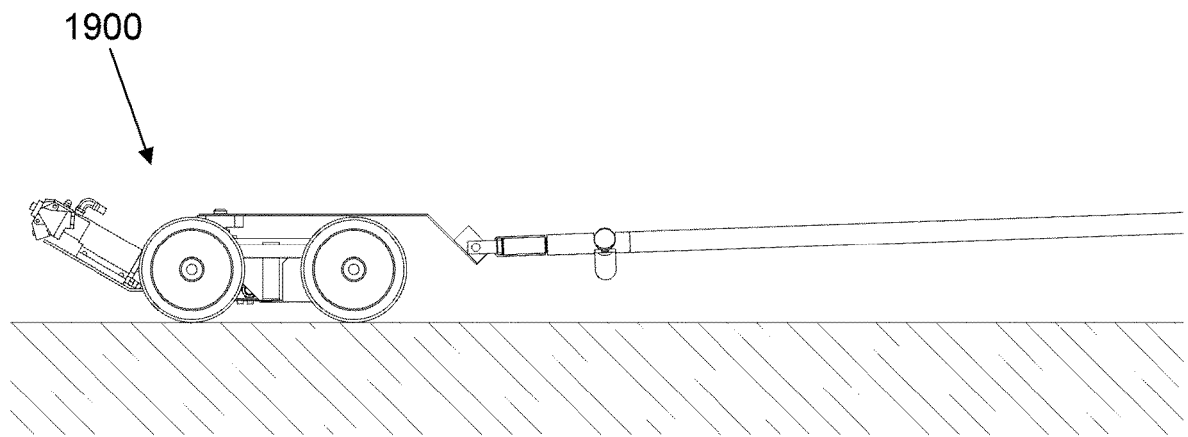
FIGS. 73A to 73C illustrate the operation of a fulcrum of the spray device of FIG. 71.
Figure 73B:
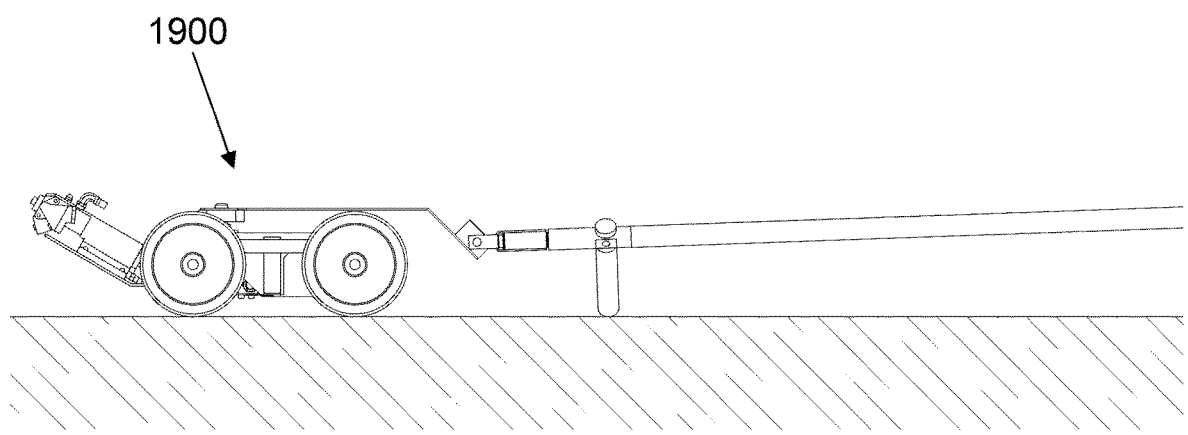
Figure 73C:
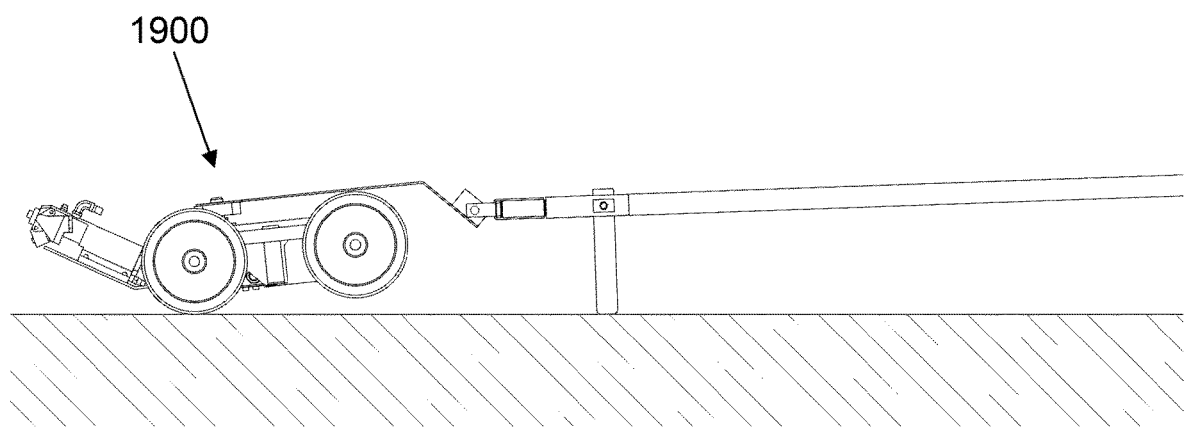

FIGS. 73A to 73C illustrate the operation of the fulcrum 1907 of the spray device 1900 of FIG. 71. As shown in FIGS. 73A to 73C, the control handle 1905 can be rotated along its length relative to the chassis. In this way, the fulcrum 1907 can be caused to engage with the ground to raise the rear wheels (FIG. 73C). This reduced the sideways ground friction of the wheels on the ground making it easy to reposition or redirect the spray device 1900.

The electromechanical arm and spray gun of the present disclosure may be used in a variety of applications, for example in the spraying of underfloor insulation or loft and roof insulation, i.e. applying insulation in hard to reach loft and ceiling voids. The arm can also be used for the remote application of sound insulation in voids and cavities, for example between floors of converted period flats. The arm and spray gun can also be used for the application of preservatives, such as applying anti-fungicides and preservatives to wood and other materials. The arm and spray gun may be used industrially, for example for applying paint, protective coatings, sealant or carrying out other maintenance and repairs to cracked or damaged pipes, storage tanks and other industrial structures. The arm may be used for building inspection and maintenance, including surveying, mapping and investigating hazardous 'crawl spaces' e.g. asbestos surveying or checking wiring; surveying services e.g. mapping pipe work and checking for leaks; and structural surveys. The arm may be used for infrastructure inspection and maintenance, for example surveying sewer or gas pipes, inspecting pressure tanks, etc.

Materials that may be sprayed include polyurethane spray foam, e.g. BASF's Walltite, which is an expanding two part insulation material, blown mineral wool (such as the COATWOOL product available from Saint-Gobain of Suresnes, France) or cellulose insulation with or without a binding agent so it adheres to a surface, spray aerogel insulation coatings, sound insulation material, anti-fungicidal preservatives, coatings and paints.

Although the presently described embodiments have been described in relation to use in an underfloor void, it will be appreciated that the electromechanical arms disclosed may be used in other voids. For example, voids between floors, voids between walls. Typically, the electromechanical arm will be used in voids known as crawl spaces, which refers to all kinds of spaces where it would be difficult to send a person.

In summary, apparatus for spraying a material on a surface comprises at least one elongate member having a distal end and a proximal end, at least one spray nozzle mounted at the distal end of the elongate member for spraying the material in a spray pattern, the spray nozzle being connected to a spray material input at the proximal end of the elongate member, a camera mounted at the distal end of the elongate member and connected to a camera output at the proximal end of the elongate member, the camera being arranged to capture images of the spray pattern, and a control mechanism arranged to control the operation of the spray nozzle from the proximal end of the elongate member.

There is also disclosed herein a modular robot comprising a plurality of mutually connectable modules 2, 4, 5, 7, 8. The modules each comprise a first mechanical connector at a first end of the module and a second mechanical connector at a second end of the module and the first and second mechanical connectors of respective modules are non-permanently interengageable to connect the modules end-to-end to form the modular robot in a desired configuration. Each module comprises a first component, a second component and a motor arranged to move the first component relative to the second component and each module comprises a controller configured to receive a control signal and to control operation of the motor in response to the control signal.

In accordance with an invention disclosed herein there is provided a device for mounting a spray nozzle, the device comprising an elongate member provided at a proximal end with a handle and at a distal end with a mounting for a spray nozzle, wherein the device further comprises a wheeled carriage mounted to the elongate member for supporting the elongate member on a surface, wherein the carriage is fixed relative to the elongate member in the longitudinal direction thereof and the elongate member is rotatable about a longitudinal axis thereof relative to the carriage. The elongate member may be extendable.

In an embodiment, a robot includes at least one of said modules is a bending module wherein said first component comprises said first end and said second component comprises said second end and said first component is pivotally connected to said second component about an axis which is perpendicular to a direction from said first end to said second end, whereby said motor pivots the first component relative to the second component about said axis. Wherein at least one of said modules is an extending module wherein said first component comprises said first end and said second component comprises said second end and said firs component is slidably connected to said second component for relative movement in a direction from said first end to said second end, whereby said motor is arranged to move the first component relative to the second component to increase or decrease the effective length of the extending module. Wherein the first component of the extending module is received within the second component of the extending module. Wherein at least one of said modules is a widening module configured to increase the effective width of the module in a direction perpendicular to a direction from said first end to said second end by relative movement of the first component and the second component. Wherein the first component of the widening module is an extendable arm. Wherein the extendable arm is pivotally mounted to the second component. Wherein the first component is inflatable and the motor causes inflation or deflation of the first component, for example the motor is a pump motor.

Wherein the widening module comprises a deformable member provided between the first component and the second component and the motor is arranged to move the first component towards the second component to compress the deformable member in a longitudinal direction from the first end to the second end of the widening module and thereby increase the effective width of the deformable member in a direction perpendicular to the longitudinal direction. Wherein the extending module and the widening module are arranged to co-operate to propel the robot relative to at least one surface engaged by the widening module.

Wherein at least one of said modules is a twisting module wherein said first component comprises said first end and said second component comprises said second end and said first component is rotatably connected to said second component about an axis in a direction from said first end to said second end, whereby said motor rotates the first component relative to the second component about said axis.

Wherein at least one of said modules is a locomotion module wherein said first component comprises a ground-engaging surface, whereby said motor moves said ground-engaging surface relative to the second component to propel the locomotion module over said surface.

Wherein the ground-engaging surface rotates around the locomotion module about an axis from the first end to the second end of the locomotion module.

Wherein the first mechanical connector and the second mechanical connector are configured to prevent relative rotational movement of the connected modules about an axis from the first end to the second end. Further comprising at least one non-motorised module comprising a said first mechanical connector at a first end of the non-motorised module and a said second mechanical connector at a second end of the non-motorised module.

Wherein the modules each comprise a first electrical connector at a first end of the module and a second electrical connector at a second end of the module and the first and second electrical connectors of respective modules are non-permanently interengageable to electrically connect the modules. Wherein the first and second electrical connectors provide power to the motor and/or the controller. Wherein the first and second electrical connectors provide the control signal to the controller. Wherein the controller is configured to receive the control signal wirelessly.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one or any novel combination, of the steps of any method or process so disclosed.

The invention claimed is:

1. A method of spraying a thermal insulation material on a surface of an underfloor void, the method comprising:
   inserting an elongate member of an apparatus through an opening of the underfloor void, wherein the elongate member has distal and proximal ends, and the apparatus includes:
   the elongate member;
   a spray nozzle mounted at the distal end of the elongate member for spraying the thermal insulation material in a spray pattern, wherein the spray nozzle is connected to a spray material input at the proximal end of the elongate member, and wherein the spray nozzle is mounted for motorised movement relative to the distal end of the elongate member;
   a camera mounted at the distal end of the elongate member and connected to a camera output at the proximal end of the elongate member, wherein the camera is arranged to capture images of the spray pattern; and
   a control mechanism arranged to control operation of the spray nozzle from the proximal end of the elongate member, and arranged to control the motorised movement of the spray nozzle relative to the distal end of the elongate member; and
   spraying the thermal insulation material on the surface of the underfloor void, wherein the apparatus allows an operator to carry out operations within the void while the operator remains outside the void.

2. The method as claimed in claim 1, further comprising rotating the spray nozzle about a longitudinal axis of the elongate member by operation of a handle of the control mechanism, wherein the handle is mechanically connected to the elongate member at the proximal end.

3. The method as claimed in claim 1, further comprising rotating a handle of the control mechanism to cause extension of the elongate member, wherein the handle is mechanically connected to the elongate member at the proximal end.

4. The method as claimed in claim 1, further comprising extending the elongate member telescopically.

5. The method as claimed in claim 1, further comprising extending the elongate member by coupling a modular member to the elongate member.

6. The method as claimed in claim 1, further comprising suspending the elongate member from at least one mounting point via a support for the elongate member.

7. The method as claimed in claim 1, further comprising capturing depth information in the field of view of the camera by a rangefinder mounted at the distal end of the elongate member and connected to a rangefinder output at the proximal end of the elongate member.

* * * * *